United States Patent

Inoue et al.

[11] Patent Number: 5,835,675
[45] Date of Patent: *Nov. 10, 1998

[54] PHOTOGRAPHED IMAGE REPRODUCING APPARATUS

[75] Inventors: Manabu Inoue, Kobe; Hirokazu Yagura, Sakai; Kouji Hamaguchi, Osaka; Shigeru Wada, Kishiwada; Hiroyuki Matsumoto, Wakayama; Katsuyuki Nanba, Osakasayama, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 794,781

[22] Filed: Feb. 3, 1997

Related U.S. Application Data

[63] Continuation of Ser. No. 95,679, Jul. 26, 1993, Pat. No. 5,633,977.

[30] Foreign Application Priority Data

| Jul. 27, 1992 | [JP] | Japan | 4-200028 |
| Jul. 27, 1992 | [JP] | Japan | 4-200029 |
| Jul. 27, 1992 | [JP] | Japan | 4-200030 |
| Jul. 27, 1992 | [JP] | Japan | 4-200031 |
| Dec. 14, 1992 | [JP] | Japan | 4-333331 |
| Dec. 14, 1992 | [JP] | Japan | 4-333332 |

[51] Int. Cl.$^6$ .............. H04N 5/82; H04N 5/91
[52] U.S. Cl. .............. 386/127; 386/46
[58] Field of Search .............. 386/127, 46, 81, 386/107, 117, 118; 348/96, 97, 98, 99; 346/74.5, 74.2; 354/109, 106, 105; H04N 5/82, 5/91

[56] References Cited

U.S. PATENT DOCUMENTS

| 4,482,924 | 11/1984 | Brownstein . | |
| 5,245,372 | 9/1993 | Aoshima | 386/127 |
| 5,258,859 | 11/1993 | Wada et al. . | |
| 5,396,338 | 3/1995 | Sato et al. | 386/96 |
| 5,467,156 | 11/1995 | Ezawa et al. . | |

*Primary Examiner*—Robert Chevalier
*Attorney, Agent, or Firm*—Burns, Doane, Swecker & Mathis, LLP

[57] ABSTRACT

A photographed image reproducing apparatus is used to reproduce photographic images recorded on successive frames of a film having magnetic tracks on which information is writable for each frame. The apparatus includes a read/write device for reading or writing frame information on the magnetic track. The frame information is read or written in one transporting direction while the image is sensed in the other transporting direction. Also, an information reader is provided at an upstream portion while the information writer is provided at a downstream portion to enable the reading and writing to be executed at the same time. The apparatus considerably reduces the reproduction time.

38 Claims, 41 Drawing Sheets

PHOTOGRAPHED IMAGE REPRODUCING APPARATUS

This application is a continuation of application Ser. No. 08/095,679, filed Jul. 26, 1993 now patented (U.S. Pat. No. 5,633,977).

BACKGROUND OF THE INVENTION AND RELATED ART STATEMENT

This invention relates to a photographed image reproducing apparatus for reproducing a photographed image on a developed film on a television monitor.

PCT International Publication No. WO 90/04302 discloses a reproducing apparatus in which: Photographed images recorded on successive frames on a developed film are sensed and converted into a video signal which the photographed images are in turn reproduced on a television monitor in accordance with.

Also, the developed film carries magnetic tracks on which information, such as trimming, zooming instructions, is recorded. The reproducing apparatus which is provided with information reading means for reading information recorded on the magnetic tracks determines an appropriate reproducing way based on the read information. Further, the reproducing apparatus is provided with information writing means for writing new information on the magnetic tracks.

In the reproducing apparatus, however, a photographed image on a selected frame is reproduced after information for the selected frame is read and an appropriate reproducing way is determined. Also, writing of new information for the selected frame is executed after the reproduction of the image for the selected frame is completed. A long time has been inevitably consumed to reproduce an image for one frame.

In view of the above-mentioned problems, it is an object of the present invention to provide a reproducing apparatus which makes it possible to execute reading and writing of frame information and reproducing of images for a shorter time of period.

SUMMARY OF THE INVENTION

Accordingly, the present invention is directed to a reproducing apparatus for reproducing an image recorded on successive frames of a film having a storage medium which information for each frame is readable from and writable on, the reproducing apparatus comprising: sensing means for sensing an image on the film; reading means for reading frame information recorded on the storage medium; transport means for transporting the film in opposite directions; and controller means for controlling the sensing means and reading means so that the sensing means senses an image when the film is transported in one direction, and the reading means reads frame information when the film is transported in the other direction.

With thus constructed reproducing apparatus, the image on the film is picked up in the one transporting direction while the information is read in the other transporting direction. Accordingly, this construction can reduce the reading and image picking up time to a remarkably greater extent comparing to the prior art reproducing apparatus in which the film is transported in one direction to read information for a selected frame, and is then rewound to an initial position, and is transported in the one direction again to pick up an image for the selected frame.

Also, the present invention is directed to a reproducing apparatus for reproducing an image recorded on successive frames of a film having a storage medium which information for each frame is readable from and writable on, the reproducing apparatus comprising: sensing means for sensing an image on the film; writing means for writing frame information on the storage medium; transport means for transporting the film in opposite directions; and controller means for controlling the sensing means and writing means so that the sensing means senses an image when the film is transported in one direction, and the writing means executes the writing when the film is transported in the other direction.

With thus constructed reproducing apparatus, the image on the film is picked up in the one transporting direction while the information is written in the other transporting direction. Accordingly, this construction can reduce the writing and image picking up time to a remarkably greater extent comparing to the prior art reproducing apparatus in which the film is transported in one direction to pick up an image of a selected frame, and is then rewound to an initial position, and is transported in the one direction again to write new information for the selected frame.

Further, the present invention is directed to a reproducing apparatus for reproducing an image recorded on successive frames of a film having a storage medium which first and second information for each frame are readable from and writable on, the reproducing apparatus comprising: reading means for reading first information from the storage medium; writing means for writing second information on the storage medium; and controller means for controlling the reading means and writing means so as to execute reading of the first information and writing of the second information at the same time.

In this reproducing apparatus, the reading and writing are executed at the same time. The time for reading and writing can be considerably reduced.

Further, the present invention is directed to a reproducing apparatus for reproducing an image recorded on successive frames of a film having a storage medium which information for each frame is readable from and writable on, the reproducing apparatus comprising: sensing means for sensing an image on the film; reading means for reading frame information recorded on the storage medium: and controller means for controlling the sensing means and reading means so as to execute sensing of an image and reading of frame information at the same time.

In this reproducing apparatus, the image sensing and information reading are executed at the same time. Accordingly, the time for image sensing and information reading can be reduced to a remarkable extent.

Further, the present invention is directed to a reproducing apparatus for reproducing an image recorded on successive frames of a film having a storage medium which information for each frame is readable from and writable on, the reproducing apparatus comprising: sensing means for sensing an image on the film; writing means for writing frame information on the storage medium; and controller means for controlling the sensing means and writing means so as to execute sensing of an image and writing of frame information at the same time.

In this reproducing apparatus, the image sensing and information writing are executed at the same time. Accordingly, the time for image sensing and information writing can be reduced to a remarkable extent.

Further, the present invention is directed to a reproducing apparatus for reproducing an image recorded on successive frames of a film having a storage medium which information for each frame is readable from and writable on, the reproducing apparatus comprising: sensing means for sensing an image on the film at a predetermined sensing position; transport means for transporting the film in a specified transporting direction; reading means disposed upstream of the sensing position in the transporting direction for reading frame information recorded on the storage medium; and writing means disposed downstream of the sensing position in the transporting direction for writing frame information on the storage medium.

In this reproducing apparatus, the reading means is disposed upstream of the sensing position while the writing means is disposed downstream of the sensing position. Accordingly, the reading and writing of frame information can be executed in only one transporting the film.

Further, the present invention is directed to a reproducing apparatus for reproducing an image recorded on successive frames of a film having successive storage mediums which information for the respective frames is readable from and writable on, the frame information including first information and second information, the reproducing apparatus comprising: reading means for reading first and second information for one frame recorded on the corresponding storage medium; changing means for changing second information read by the reading means; writing means for writing first information read by the reading means and second information changed by the changing means on the storage medium corresponding to the one frame; and controller means for controlling the reading means so as to read first and second information for another frame recorded on the corresponding storage medium at the same time when the writing means executes the writing.

With thus constructed reproducing apparatus, information for one frame is read while changed information for another frame is written. Accordingly, the reading and writing of frame information can be reduced.

Further, the present invention is directed to a reproducing apparatus for reproducing an image recorded on successive frames of a film having successive storage mediums which information for the respective frames is readable from and writable on, the frame information including first information and second information, the reproducing apparatus comprising: reading means for reading first information for one frame recorded on the corresponding storage medium; setting means for setting second information for the one frame; writing means for writing first and second information on the storage medium corresponding to the one frame; and controller means for controlling the reading means so as to read first information for another frame recorded on the corresponding storage medium at the same time when the writing means executes the writing.

With thus constructed reproducing apparatus, information for one frame is read while newly set information for another frame is written. Accordingly, the reading and writing of frame information can be reduced.

Furthermore, the present invention is directed to a reproducing apparatus for reproducing an image recorded on successive frames of a film having successive storage mediums which information for the respective frames is readable from and writable on, the frame information including first information and second information, the reproducing apparatus comprising: transport means for transporting the film in a specified transporting direction; reading means disposed at an upstream portion in the transporting direction for reading first and second information for one frame recorded on the corresponding storage medium; changing means for changing second information read by the reading means; and writing means disposed at a downstream portion in the transporting direction for writing first information read by the reading means and second information changed by the changing means on the storage medium corresponding to the one frame.

In this reproducing apparatus, the reading means is disposed at an upstream portion while the writing means is disposed at a downstream portion. Accordingly, the reading of information for one frame and writing of changed information for the one frame can be executed in only one transporting the film.

Moreover, the present invention is directed to a reproducing apparatus for reproducing an image recorded on successive frames of a film having successive storage mediums which information for the respective frames is readable from and writable on, the frame information including first information and second information, the reproducing apparatus comprising: transport means for transporting the film in a specified transporting direction; reading means disposed at an upstream portion in the transporting direction for reading first information for one frame recorded on the corresponding storage medium; setting means for setting second information for the one frame; and writing means disposed at a downstream portion in the transporting direction for writing first and second information on the storage medium corresponding to the one frame.

In this reproducing apparatus, the reading means is disposed at an upstream portion while the writing means is disposed at a downstream portion. Accordingly, the reading of information for one frame and writing of newly set information for the one frame can be executed in only one transporting the film.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
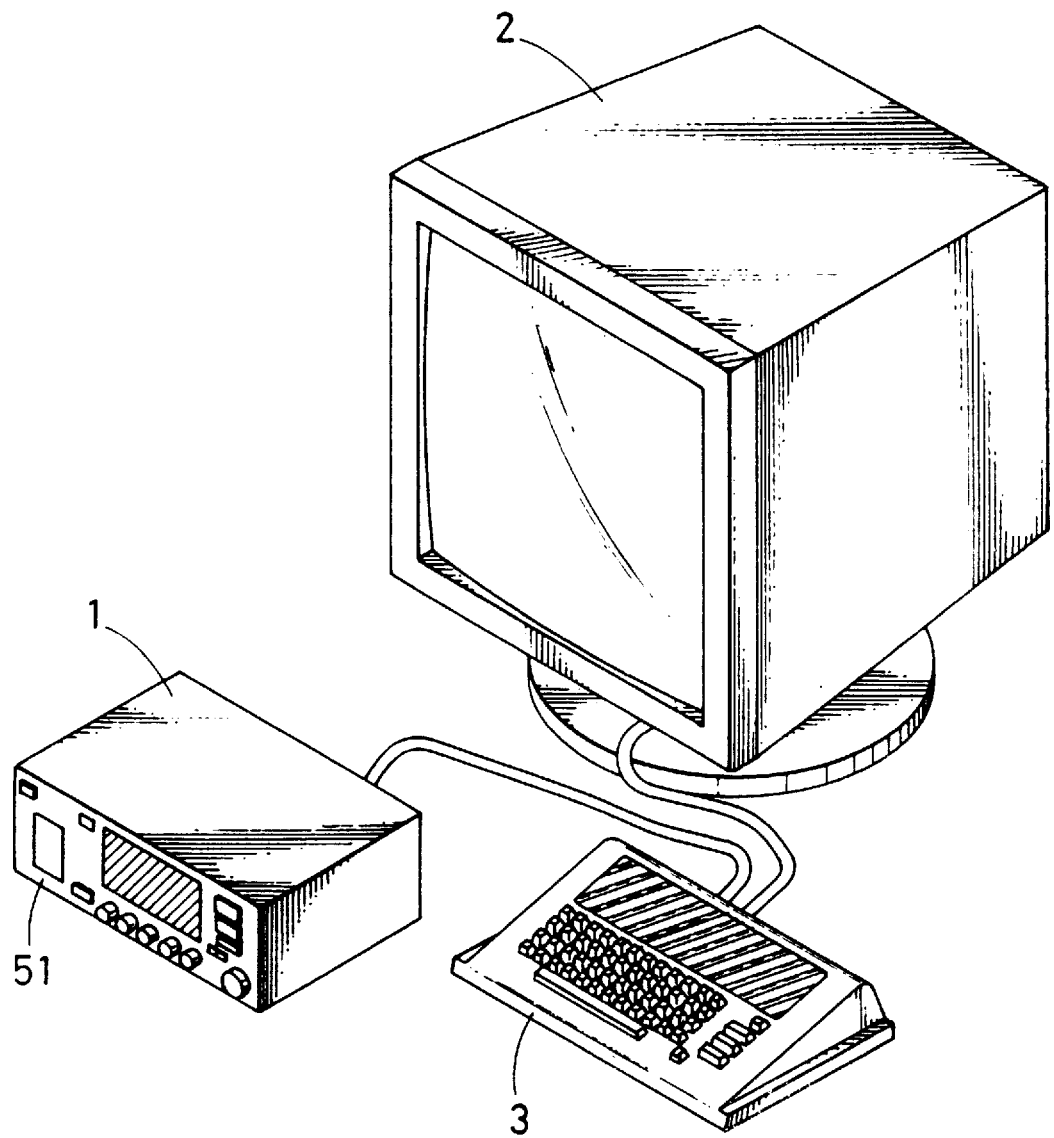
FIG. 1 is a perspective view showing a photographed image reproducing apparatus as a first embodiment.

There will be described a photographed image reproducing apparatus as a first embodiment of the invention. FIG. 1 is a perspective view of a used state of a photographed image reproducing apparatus or a film player according to the invention which allows an already photographed film to be viewed on a screen of a TV monitor. Basically, when being connected with a TV monitor 2, the photographed image reproducing apparatus 1 allows photographed frames of images of the film to be viewed. Further, by being connected with an information input equipment 3, the photographed image reproducing apparatus 1 is allowed to rewrite information or write new information.

Figure 2:
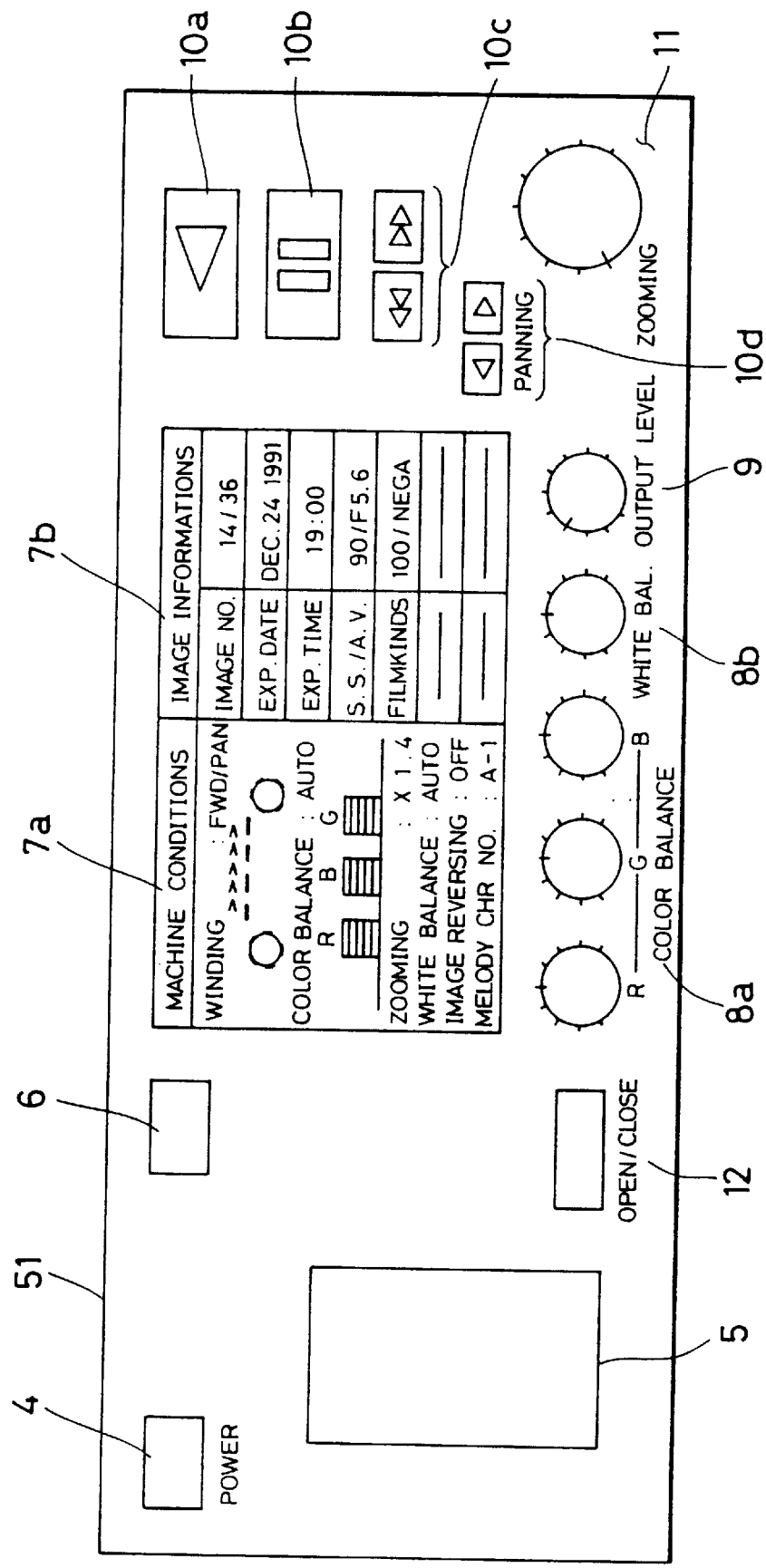
FIG. 2 is a front view showing an operation panel of the first photographed image reproducing apparatus.

FIG. 2 is a diagram showing an operation panel 51 of the photographed image reproducing apparatus 1 shown in FIG. 1. The operation panel 51 includes a power button 4, a cartridge insertion/eject table 5, a light receiver 6, an information indicator 7, a color control 8, a volume control 9, a frame feed control 10, and a magnification control 11. The cartridge insertion/eject table 5 located at the left in the drawing of FIG. 2 is movable between a projected position and a contained position by manipulating an operation button 12. When the table 5 is at the projected position, the cartridge is mounted or ejected. The light receiver 6 located at the upper right from the table 5 in the drawing of FIG. 2 enables a remote control together with an unillustrated remote controller which is an accessory of the photographed image reproducing apparatus 1.

The information indicator 7 located at the center of the panel 51 includes an operative state indicator 7a for indicating an operative state of the photographed image reproducing apparatus 1 and a frame information indicator 7b for indicating an information on a frame whose image is reproduced. Items indicative of the operative state includes a transport state, panning state, color balance, magnification, white balance, absence or presence of image processing such as image inversion, and types of music to be played. As information on the frame to be reproduced, there are a frame number, photographing date, photographing time, shutter speed, aperture value, and type of film. Knobs provided below the indicator 7 constitute the color control 8 and the volume control 9. The color control 8 includes a color balance control knob 8a and a white balance control knob 8b. Buttons located at a right end side of the operation panel 51 constitute a frame transport control which includes a reproduction button 10a, stop button 10b, quick transport buttons 10c, and panning button 10d. A knob located at the lower right of the panel 51 is adapted for adjusting the magnification of the image to be reproduced.

Figure 3:
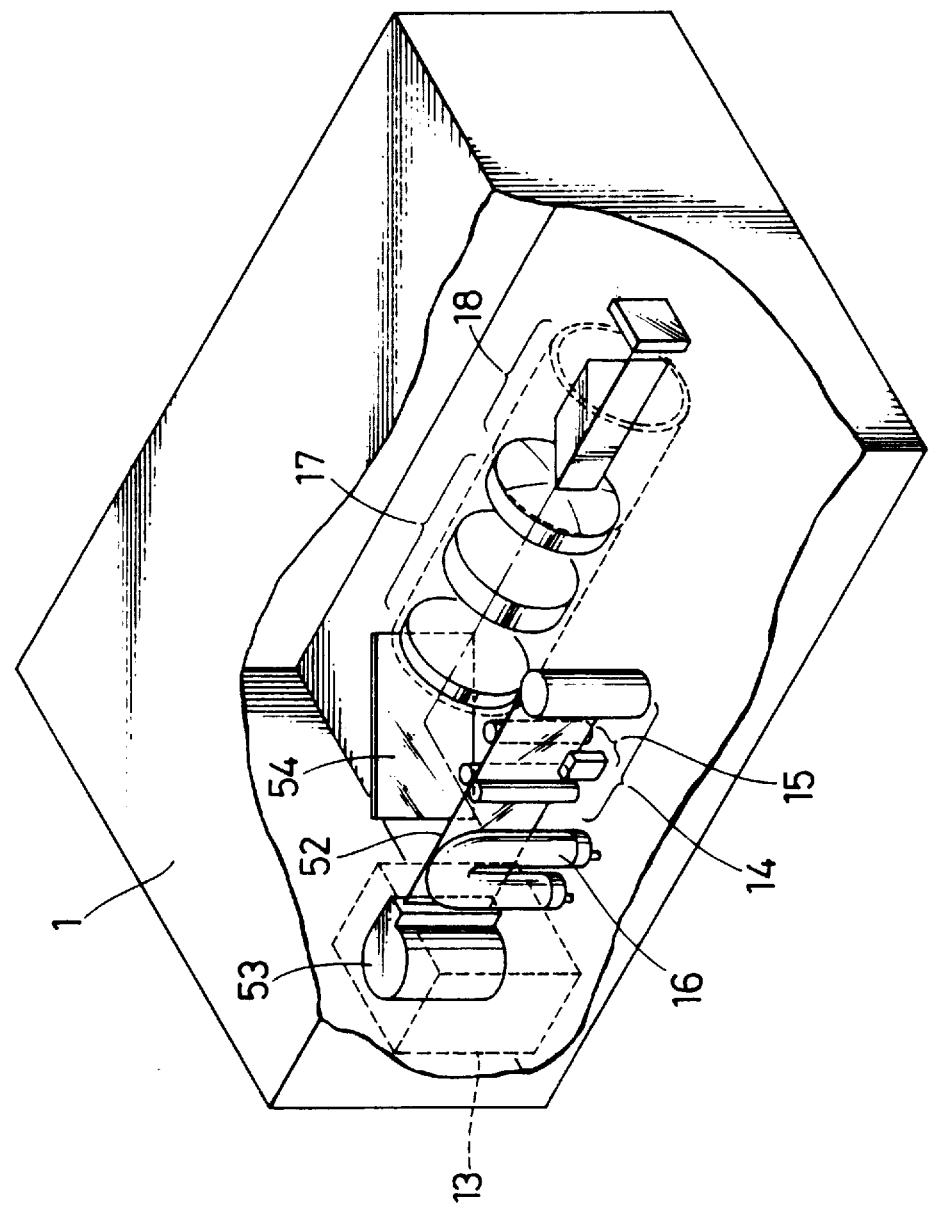
FIG. 3 is a perspective view showing an interior of the first photographed image reproducing apparatus.

FIG. 3 shows an internal construction diagram of the photographed image reproducing apparatus 1. The internal construction is roughly divided into two blocks: a transport assembly and an optical assembly. These are arranged such that a direction of an optical axis of the optical assembly is parallel with a film transport direction. The transport assembly includes a cartridge mounting portion 13, a film transport 14, and a magnetic head controller 15. The optical assembly includes a light source 16, a magnification varier 17, an image rotating device 18, and an image pick-up device 19. The cartridge mounting portion 13 moves controllably a cartridge chamber 56 to the projected position and the contained position. The film transport 14 controls transport of a film 52 contained in a mounted cartridge 53. More specifically, the film transport 14 carries out the following operations: to dispense the film 52 from the cartridge 53 and take up the dispensed film by a spool 27; to transport the film 52 frame by frame: to pan the film 52; and to rewind the film 52 taken up by the spool 27 into the cartridge 53. The magnetic head controller 15 moves the film 52 toward or away from a magnetic head 40 controllably when information provided on the film 52 is read or written. The light source 16 is used to project an image on the film 52 onto the image pick-up device 19. The magnification varier 17 drives controllably a lens group so as to change the magnification when the image on the film 52 is projected onto the image pick-up device 19. The image rotating device 18 rotates controllably a prism about the optical axis of the optical assembly to rotate the image in order to reproduce the image suitably on the screen of the TV monitor 2 in the case where the frame is discriminated to have been photographed while holding the camera a vertical posture based on the information corresponding thereto. The image pick-up device 19 converts an information of an image on the film which is photographed through the lens into an electrical signal. As a photoelectric conversion element is used an area image sensor.

Figure 4:
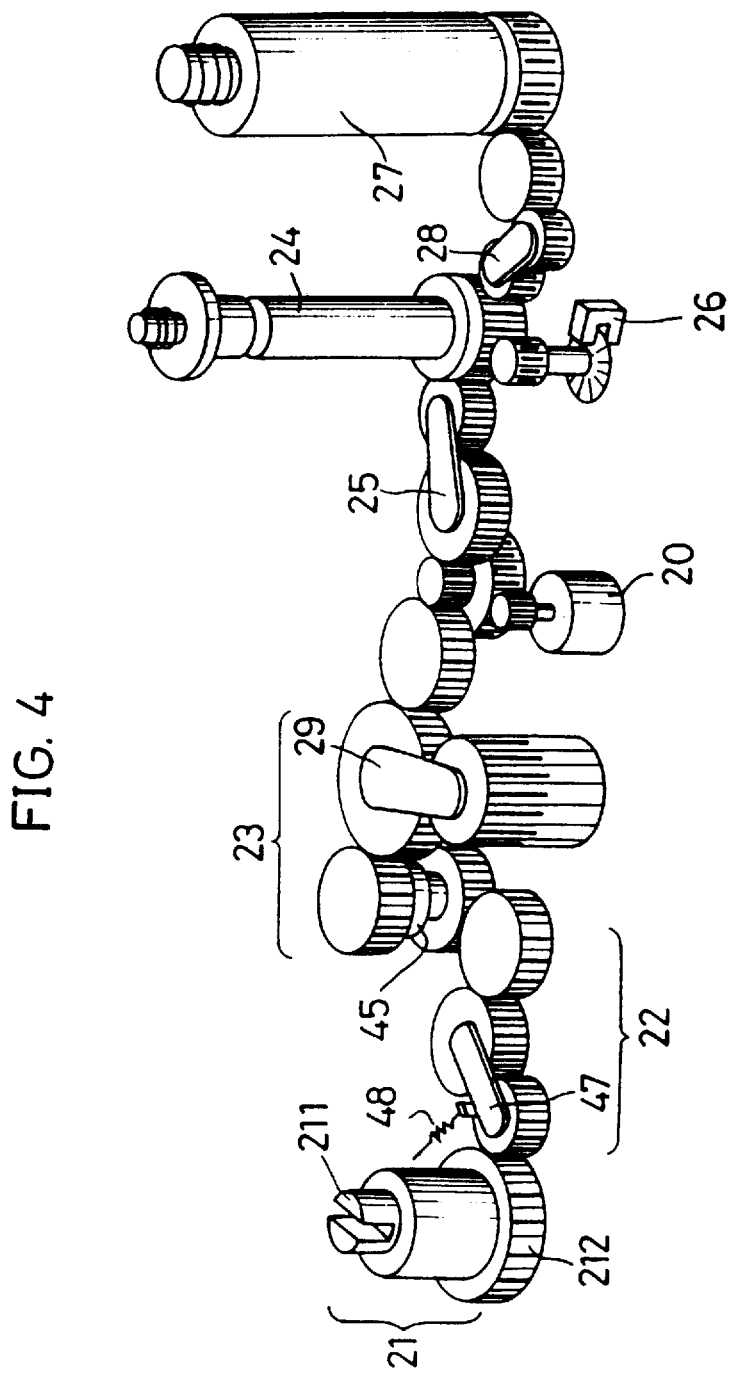
FIG. 4 is a diagram showing a drive transmission mechanism of a film transport of the first photographed image reproducing apparatus.

The respective blocks, namely the transport assembly and the optical assembly, will be described in detail hereafter. FIG. 4 is a diagram showing a drive system of the film transport 14. The film transport 14 includes a drive motor 20 serving as a source of driving force, a driver portion 21, a connecting mechanism 22, a speed difference absorbing mechanism 23, a drive roller 24 for transporting the film 52, a first planetary clutch 25, a speed detector 26, the spool 27, and a second planetary clutch 28. The driver portion 21 is supported rotatably by the cartridge mounting portion 13 so as to be coupled with the cartridge 53. The connecting mechanism 22 connects or disconnects the driver portion 21 with or from the drive system according to the mounting operation of the cartridge mounting portion 13. The speed different absorbing mechanism 23 is adapted for absorbing a speed difference between the driver portion 21 and the drive roller 24 so as to prevent the loosening of the film 52. The first planetary clutch 25 disconnects the drive motor 20 from the drive roller 24. The speed detector 26 detects a rotating speed of the drive roller 24. The spool 27 takes up the film 52 dispensed from the cartridge 53. The second planetary clutch 28 disconnects the drive roller 24 from the spool 27 according to a rotating direction of the drive roller 24.

The drive motor 20 is a step motor which is suitable for carrying out a feedback control. The driver portion 21 dispenses the film 52 in the cartridge 53 when the drive motor rotates clockwise in the drawing of FIG. 4 (forward direction), while rewinding the film 52 into the cartridge 53 when the drive motor rotates counterclockwise in the drawing of FIG. 4 (reverse direction). The connecting mechanism 22 includes a planetary gear 47, a spring 48 for biasing the planetary gear 47 against the driver portion 21, and an unillustrated member for restricting the position of the planetary gear 47 so as to bring the same into engagement with the driver portion 21. With the connecting mechanism 22, even if the drive system is not appropriately engaged with the driver portion 21 which has been moved from the projected position to the contained position, the drive system and the driver portion 21 are brought into normal engagement again immediately after the drive motor 20 is driven. The speed difference absorbing mechanism 23 includes a third planetary clutch 29 and a one-way clutch for coupling a sun gear of the clutch 29 with a gear the clutch 29 engages. The third clutch 29 is connected with an output gear when the drive motor 20 rotates in the reverse direction.

The one-way clutch 45 is disengaged only when a rotating speed becomes greater at an output side. Thus, the driving force is not transmitted to the driver portion 21 only when the film 52 is pulled by the drive roller 24 at faster than a speed at which it is dispensed by the driver portion 21 even when the drive motor is rotating forward. In other cases, the driving force is transmitted to the driver portion 21 independently of the rotating direction of the drive motor 20. The drive roller 24 nips the film 52 together with the driven roller 38 (see FIG. 7). The drive roller 24 transports the film 52 to the spool 27 smoothly when the drive motor coupled with the first planetary clutch 25 rotates forward, while rotates idly without causing any resistance against the film 52 at the time of reverse rotation of the drive motor 20 when the clutch 25 is disengaged.

The speed detector 26 includes an encoder rotatable together with a gear rotatable in association with the drive roller 24 and a photointerrupter for monitoring the rotation of the encoder. The speed detector 26 detects the rotating speed of the drive roller 24 which constantly rotates or is rotated along the transport of the film 52, and the drive motor 20 is feedback controlled based on the detection result of the detector 26 so as to control the transport speed of the film 52.

The second planetary clutch 28 is connected with the spool 27 when the drive motor 20 rotates forward, while being disconnected therefrom due to the rotation of the drive roller 24 according to the transport of the film 52 when the drive motor 20 rotates in the reverse direction. The spool 27 includes a drive portion for transmitting the driving force from the drive motor 20 and a take-up shaft for the film 52 which is coupled with the drive portion coaxially and frictionally. The film 52 is wound on the spool 27 while the spool 27 is rotated constantly faster than the drive roller 24. This prevents the film 52 from slacking.

Figure 5:
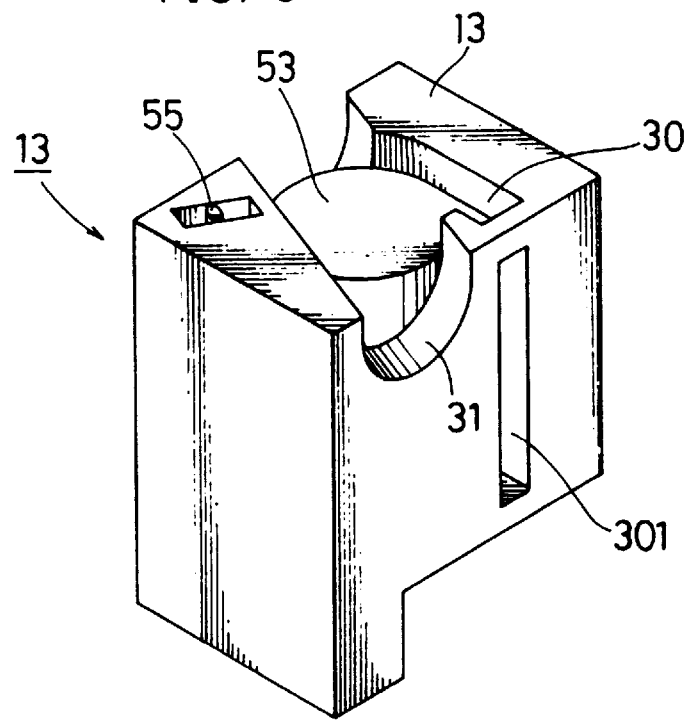
FIG. 5 is a perspective view showing a cartridge mounting portion of the first photographed image reproducing apparatus.
Figure 6:
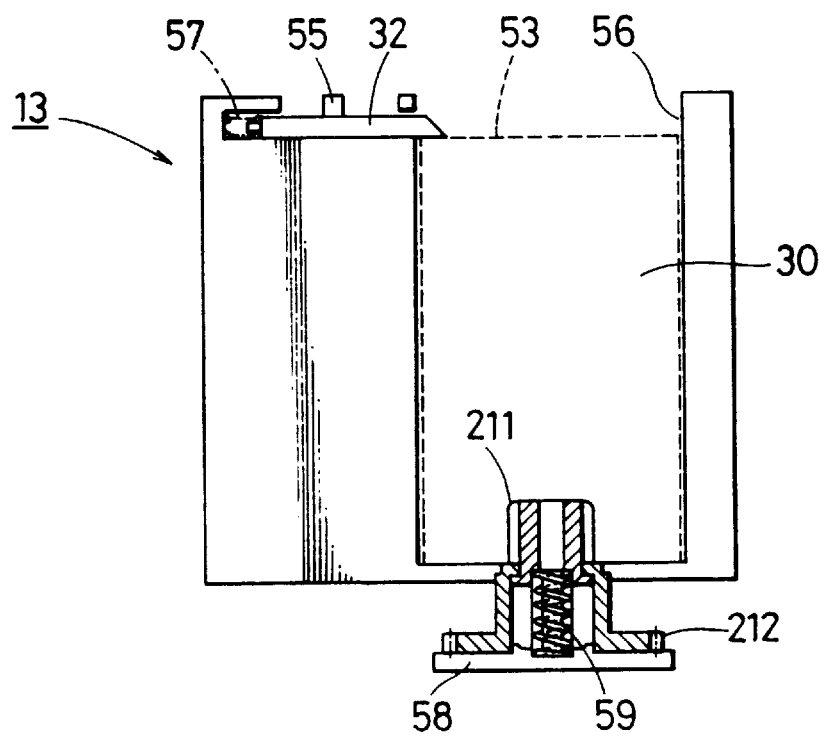
FIG. 6 is a sectional view showing the cartridge mounting portion.

FIGS. 5 and 6 are perspective and sectional views of the cartridge mounting portion 13. On a top surface of the cartridge mounting portion 13 are seen a cartridge chamber 30 in which the cartridge 53 is mounted. U-shaped eject grooves 31 defined such that a portion of the cartridge 53 is exposed in a state where it is mounted, and a part of a cartridge stopper 32 for maintaining and releasing the mounted state of the cartridge 53. On a side surface of the cartridge mounting portion 30 is defined a film aperture 301. The cartridge stopper 32 is biased so that a leading end portion thereof projects from the side wall of the cartridge chamber 30. The stopper 32 retracts, being pushed by the cartridge 53, when the cartridge 53 is mounted, and projects again when the cartridge 53 is completely mounted so as to hold the cartridge 53. From a bottom wall of the cartridge chamber 30 is projecting a driver 211, which rotates together with a driver gear 212 to transmit the driving force of the drive motor 20. Although the driver 211 is constantly biased in a projecting direction, it is slidable in its axial direction. For example, if the driver 211 is not appropriately in engagement with the cartridge 53 when the cartridge 53 is mounted, it retracts outside the cartridge chamber 30. However, when the drive motor 20 starts rotating and the driver 211 comes to a position where it is engageable with the cartridge 53, it projects again.

Figure 7:
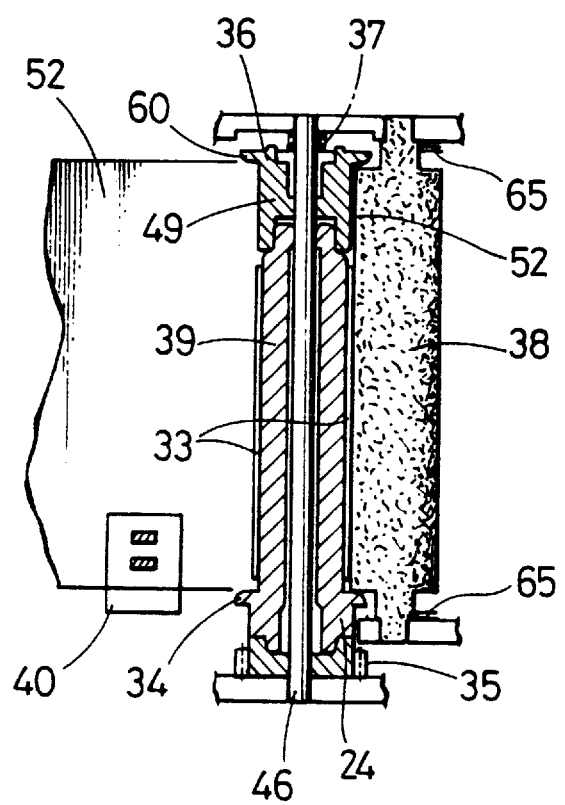
FIG. 7 is a sectional view showing a construction of a drive roller and a driven roller provided in the first photographed image reproducing apparatus.

FIG. 7 is a sectional view showing the construction of the drive roller 24 and the driven roller 38. The drive roller 24 includes a drive portion 39 and an edge follow portion 36. The drive portion 39 is located at a side of the film 52 where the information is recorded (a lower side of the film 52), and is supported rotatably on a rotatable shaft 46. The drive portion 39 includes a rubber surface 33 for eliminating the slippage with the film 52, a flange 34 for restricting a lower edge of the film 52, and a gear 35 for transmitting the driving force of the drive motor 20. The edge follow portion 36 is located at an upper side of the film 52, and is rotatable coaxially with the drive portion 39 and slidable upward and downward within a specified range. The edge follow portion 36 includes a roller 49 having a diameter smaller than the rubber surface 33 so as to slip actively with the film 52, a flange 60 for restricting an upper edge of the film 52, and a spring 37 for biasing the edge follow portion 36 downward. The driven roller 38 is positioned opposed to the drive roller 24 so as to hold the film 52 therebetween, and is biased constantly against the film 52. With the drive and driven rollers 24, 38 thus constructed, the film 52 can be transported directly and the edges of the film 52 can be aligned so as to stabilize the tracking.

Figure 8:
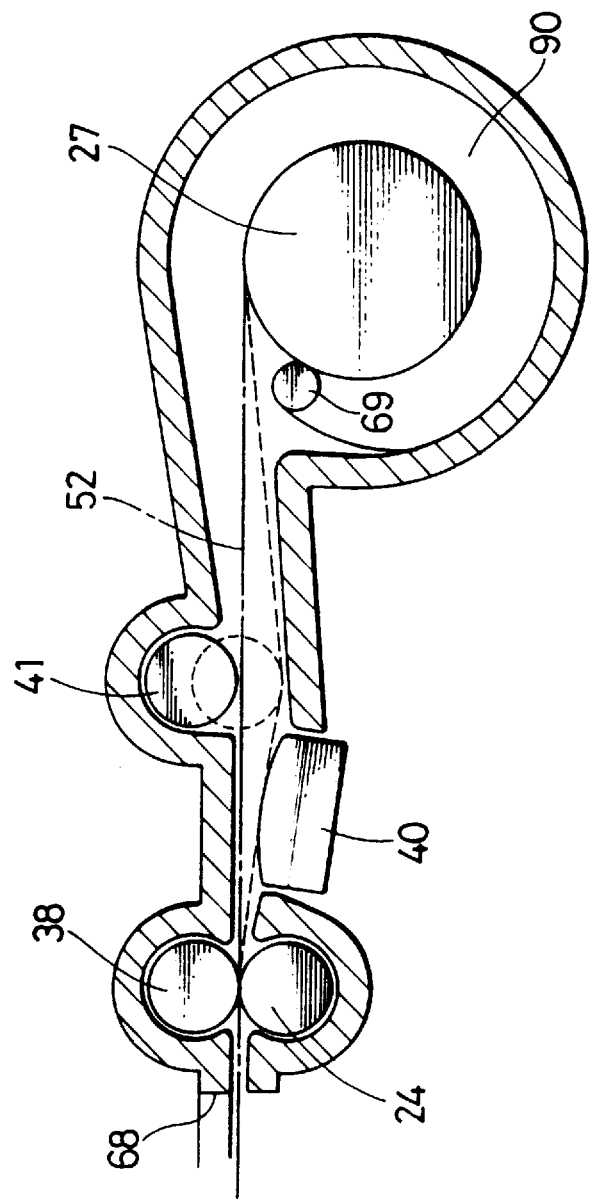
FIG. 8 is a diagram in section showing a film moving mechanism provided in the first photographed image reproducing apparatus for moving a film into contact with and away from a magnetic tape.
Figure 9:
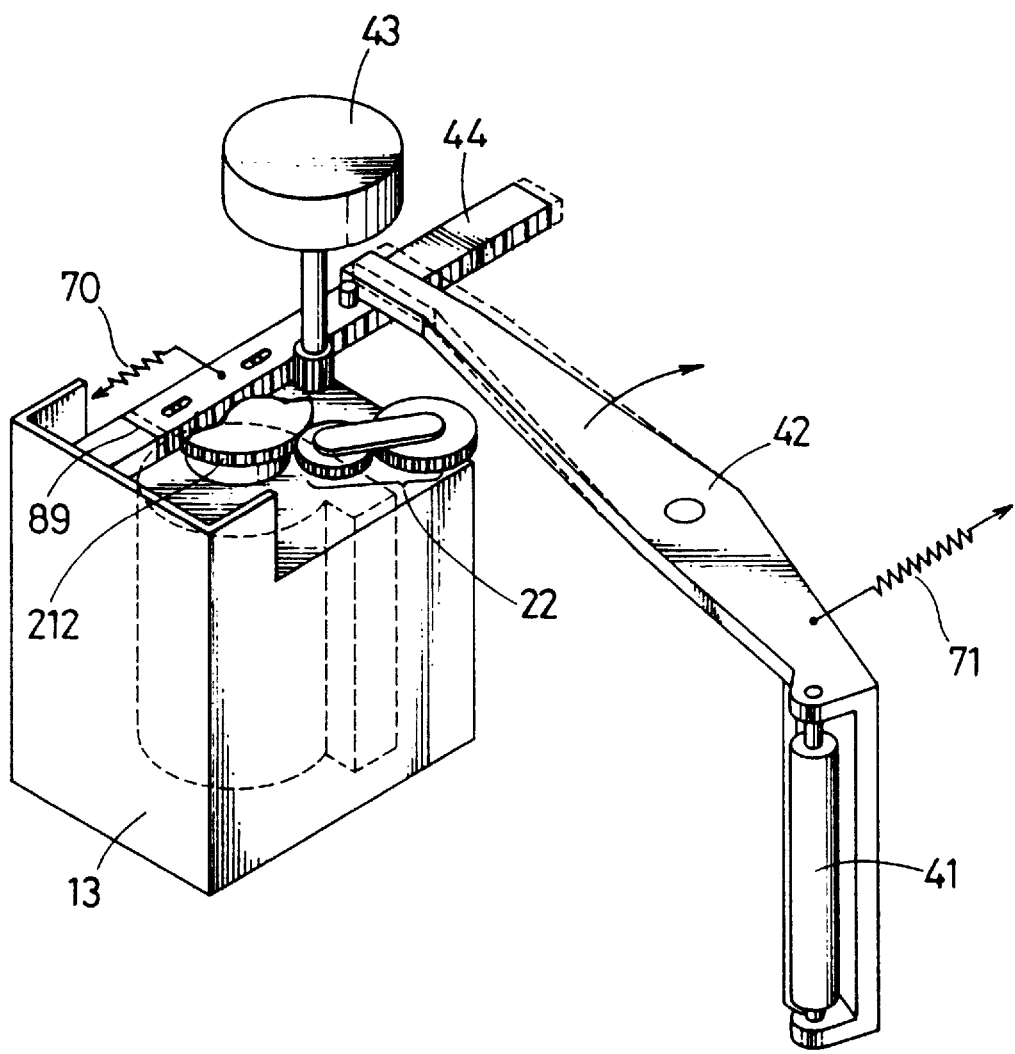
FIG. 9 is a perspective view showing the film moving mechanism.

FIGS. 8 and 9 are conceptual and construction diagrams showing a mechanism for moving the film 52 toward and away from the magnetic head 40. FIG. 9 shows a state where the cartridge mounting portion 13 is contained in the photographed image reproducing apparatus 1. Between the drive roller 24 and the spool 27 are arranged the magnetic head 40 and a film pressing roller 41 almost in juxtaposition with each other. This arrangement aims at stabilizing the tracking despite an approach of the magnetic head 40 to the drive roller 24 and also at maintaining the film 52 maximally plane despite the loosening thereof caused by movement of the film pressing roller between pressing and retracted position. The film pressing roller 41 is held rotatably in a roller lever 42 which is pivotally supported by the main body of the photographed image reproducing apparatus 1 through a shaft. The pivotal movement of the lever 41 moves the roller 41 between the pressing position where the film 52 is pressed against the magnetic head 40 and the retracted position. Since the roller 41 is at the retracted position, the film 52 is spaced apart from the magnetic head 40. This prevents unnecessary scratches from being made on the film 52 inadvertently when the information is not read or written through the magnetic head 40. The lever 42 is moved pivotally according to the movement of the cartridge mounting portion 13. A mount motor 43 for driving the cartridge mounting portion 13 is coupled through a gear with a rack 44 which is provided on the top surface of the loading portion 13 and is slidable in the moving direction of the loading portion 13. The rack 44 is normally biased against a contact face 89 of the cartridge mounting portion 13 by a spring 70 so that it moves together with the loading portion 13. Against the biasing force, the rack 44 moves further than the contained position of the cartridge mounting portion 13 and a projection on an upper surface thereof comes to contact with the roller lever 42 to pivot the same in an arrow direction shown in FIG. 9. The roller 41 projects or retracts depending on the movement of the rack 44.

There will be described an operation of each element in accordance with an operation procedure of the photographed image reproducing apparatus 1.

When the photographed image reproducing apparatus 1 is powered on, the color balance and the white balance are set automatically to auto-modes and an image inversion mode is automatically turned off. When the operation button 12 is pressed in this state, the mount motor 43 rotates so as to move the cartridge mounting portion 13 to the projected position and the mounting portion 13 projects from the front panel through the rack 44 provided at the bottom surface thereof. When the mounting portion 13 projects by a specified amount, it is detected by an unillustrated position detection switch and the mount motor 43 is stopped. In this state; a special push-out type cartridge 53 containing an already developed film therein is mounted in the cartridge chamber 30.

First of all, a bottom end face of the cartridge 53 presses a tapered portion of the cartridge stopper 32 projecting inward from the side wall of the cartridge chamber 30, and the cartridge stopper 32 retracts away from the cartridge chamber 30. Then, the bottom end face of the cartridge 53 comes to contact with the driver 211 and comes in engagement therewith. If the cartridge 53 is not appropriately in engagement with the driver 211, the driver 211 is pushed and retracts outside the cartridge chamber 30. Immediately before the bottom end face of the cartridge 53 comes to contact with the bottom wall of the cartridge chamber 30, the cartridge stopper 32 projects again toward the cartridge chamber 30, thereby completing the mounting operation. The cartridge stopper 32 also refrains the driver 211 from pushing up the cartridge 53 when the cartridge 53 is not appropriately in engagement with the driver 211.

When the operation button 12 is pressed again, the mount motor 43 rotates in such a direction as to move the cartridge mounting portion 13 to the contained position in the photographed image reproducing apparatus 1. The unillustrated position detection switch detects that the cartridge loading 13 is completely contained in the photographed image reproducing apparatus 1, and the mount motor 43 is stopped. The force from the spring 70 which acts to bias the rack 44 against the cartridge mounting portion 13 is stronger than a load acting while the loading portion 13 is moved to the contained position, and thus the rack 44 and the loading portion 13 moves together. Further, when the driver gear 212 and the connecting mechanism 22 are not appropriately in engagement with each other while the cartridge mounting portion 13 is moving to the contained position, the connecting mechanism 22 retracts against the biasing force centering on the sun gear.

When the mount motor 43 is stopped, the drive motor 20 starts rotating forward. At this time, the driver gear 212 and the planetary gear 47 of connecting mechanism 22, or the driver 211 and the cartridge 53 which have not been engaged come to engagement with each other. Further, the first and second planetary clutches 25, 28 are coupled with the drive roller 24 and the spool 27 respectively, and the third planetary clutch 29 is disengaged from the driver 211. As a result, the driver, 211, the drive roller 24, and the spool 27 all rotate clockwise in the drawing of FIG. 4. The driver 211 dispenses the film 52 contained in the cartridge 53, and the dispensed film 52 is nipped between the drive roller 24 and the driven roller 38 through an aperture 68.

The driven roller 38 is spaced apart from the drive roller 24 by the thickness of the film 52 against the biasing force from the spring 70. The drive roller 24 nips the film 52 together with the driven roller 38, and transports the film 52 at a faster speed taking advantage of a frictional force caused by the biasing force. Since the film 52 rotates the driver 211 from this time on, the output gear rotates faster than the input gear in the speed difference absorbing mechanism 23 provided between the driver 211 and the drive motor 20. As a result, the one-way clutch 45 for coupling these two gears is disengaged and accordingly the film 52 is not pulled inadvertently.

When the film 52 passes between the drive and driven rollers 24, 38, the spacing between the flange 34 of the drive portion 39 and the flange 60 of the edge follow portion 36, which is slightly narrower than the width of the film 52 in the usual state, is widened against the biasing force of the spring 37. With this arrangement, the film 52 is allowed to absorb variation in its width using the flange 34 of the drive portion 39 as a reference position so as to stabilize the tracking. The film 52 transported by the drive roller 24 passes the magnetic head 40 and the following film pressing roller 41. At this time, the magnetic head 40 and the film pressing roller 41 are both away from the passing film 52 so that the film 52 can be wound onto the spool 27 easily.

The transported film 52 enters into a spool chamber 90 and starts winding around the spool 27. The rotating speed of the spool 27 is greater than the speed at which the drive roller 24 transports the film 52 and accordingly the spool 27 constantly tends to pull the film 52. However, when a load greater than a specified level is exerted, the spool 27 is disconnected from the drive system due to a frictional mechanism thereof. Thus, the film 52 is wound at a speed not greater than it is transported by the drive roller 24 without being loosened.

When an unillustrated counter for counting the number of perforations defined on the film 52 to detect an amount of transport of the film 52 counts a specified transport amount by which the film 52 is completely wound on the spool 27, the mount motor 43 rotates in such a direction as to rewind the film 52 into the cartridge 53. Then, the rack 44 of the cartridge mounting portion 13 moves against the biasing force applied thereto, and the projection on the top surface thereof comes to contact with the roller lever 42, causing the same to pivot. Thereby, the film pressing roller 41 presses the film 52 against the magnetic head 40 located outside the transport passage of the film 52. The magnetic head 40 reads consecutively the information written on the film 52 for each frame thereof. The read information is temporarily stored in a memory unit in the photographed image reproducing apparatus 1.

Hereafter will be described the aforementioned prewind system.

After the counter counts all the frames, the drive motor 20 is temporarily stopped and then rotated in the reverse direction (counterclockwise). The first planetary clutch 25 rotates counterclockwise and is disengaged. The third planetary clutch 29 rotates clockwise and is engaged, causing the one-way clutch 45 of the speed difference absorbing mechanism 23 to slip always. Thereby, the driver 211 rotates clockwise to rewind the film 52 into the cartridge 53. As the film 52 moves, the second planetary clutch 28 rotates clockwise and is disengaged, thereby disconnecting the spool 27 from the drive system. Since a tension is applied to the film 52 due to the friction of the spool 27, the film 52 is not loosened.

When the counter detects that the last frame has reached the aperture 68 (see FIG. 12), the drive motor 20 is stopped. Then, the mount motor 43 is driven in such a direction as to move the cartridge mounting portion 13 to the projected position so that the rack 44 is moved to the contact face 89 of the loading portion 13. Thereby, the roller lever 42 which moves following the rack 44 pivots counterclockwise and the film pressing roller 41 retracts outside the transport passage of the film 52 to prevent the film 52 from being scratched during the reproduction. In this manner, an initial load of the film 52 is completed.

The film 52 is transported frame by frame during the reproduction by rotating the drive motor in the reverse direction to rewind the film 52 into the cartridge 53. The drive motor 20 is stopped in accordance with the detection of the perforations of the film 52 by the counter. At this time, the respective clutches are left in initial load completion states.

In the case of the frame of image to be sensed being a panoramic photography, the drive motor 20 is rotated in the reverse direction after the panoramic photography frame is brought at the position corresponding to the aperture 68. The respective clutches are brought into initial load start states and the film 52 is taken up by the spool 27. At this time, the film 52 is rewound by a specified amount so that an image on one edge of the frame is reproduced at a specified magnification over the screen while detecting a transport amount of the film 52 through the speed detector 26. After the magnification of a taking lens 72 is adjusted, it is started to sense the frame of image and the drive motor 20 is rotated forward. The respective clutches are again brought into the initial load completion states. At this time as well; the transport speed of the film 52 is detected by the speed detector 26 for detecting a rotated amount of the drive roller 24 which rotates according to movement of the film 52, so that the drive motor 20 is controlled to transport the film 52 always at a constant speed. When the film 52 is transported until the other edge of the frame is seen on the screen, the drive motor 20 is rotated in the reverse direction and a panning operation is carried out repeatedly within a predetermined time.

When the operation button 12 is pressed while the frame of image is reproduced, the drive motor 20 is rotated forward (the clutches are brought into the initial load completion states). After the counter detects the last edge of the film, the drive motor 20 is kept rotated for a specified time so as to rewind the film 52 completely into the cartridge 53. When the film 52 is completely rewound into the cartridge 53, the drive motor 20 is stopped. Subsequently, the mount motor 43 is rotated in the projection direction so as to project the mounting portion 13 from the front face of the photographed image reproducing apparatus 1. When the unillustrated position detection switch detects that the mounting portion 13 has been moved to the projected position, the motor 43 is stopped. The cartridge 53 is ejected by undoing the cartridge stopper 32 provided at the top of the mounting portion 13 and by picking up the cartridge 53 with two fingers slid into the U-shaped grooves defined on the side walls of the mounting portion 13.

Figure 10:
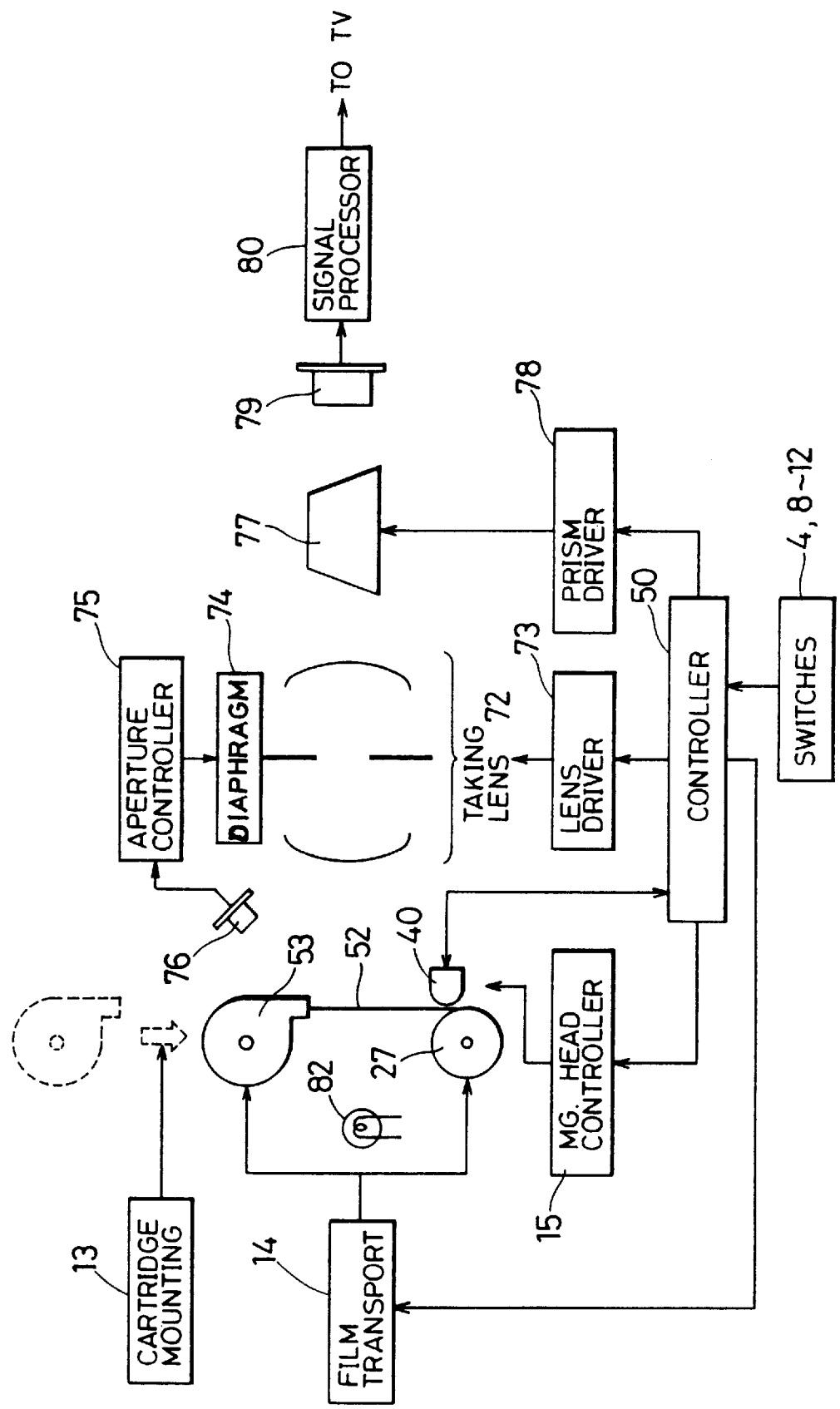
FIG. 10 is a block diagram showing an essential portion of a controller of the first photographed image reproducing apparatus.

There will be described an essential portion of a controller of the photographed image reproducing apparatus 1 according to the invention next with reference to FIG. 10. A light measurement sensor 76 is fixed at a position where it does not shield beams of light representative of the sensed (picked up) image. The sensor 76 measures the brightness on the sensed surface of the film 52 illuminated by a light source 82, and outputs its data to an aperture controller 75. The aperture controller 75 controls a light amount through a diaphragm 74 lest a light amount incident upon an image pick-up sensor 79 should be too much or too little following variations in the light source and the film density, and causes a suitable amount of light to be incident upon the image pick-up sensor 79.

A controller 50 reads states of the switches 4, 8 to 12, and sends control signals to the respective blocks. The controller 50 causes the film transport 14 to dispense the film 52 from the cartridge 53 and to take the same up by the spool 27 when the film 52 is loaded. It may be appropriate to play a music while reproducing images. In this case, it may be preferable to carry out panning by transporting the film 52 frame by frame and then continuously at a specified speed. Upon the completion of the reproduction, the controller 50 instructs the film transport 14 to rewind the film 52 into the cartridge 53. Further, the controller 50 causes the magnetic head controller 15 to press the magnetic head 40 against the film 52 while the film 52 is transported so as to read or write the information from or on the film 52. The read information is transferred from the magnetic head 40 to the controller 50. Furthermore, the controller 50 sends a control signal to a lens driver 73 so that the lens driver 73 drives the taking lens 72 to attain the magnification determined based on the read information.

The controller 50 also sends a control signal to a prism driver 78 so that an erect image is reproduced on the screen of the TV monitor 2 in accordance with the read information concerning whether the image is photographed while holing the camera in vertical or horizontal posture. A signal processor 80 converts an image signal output from the image pick-up sensor 79 into a TV signal (NTSC) and outputs the same to the TV monitor 2.

Figure 12:
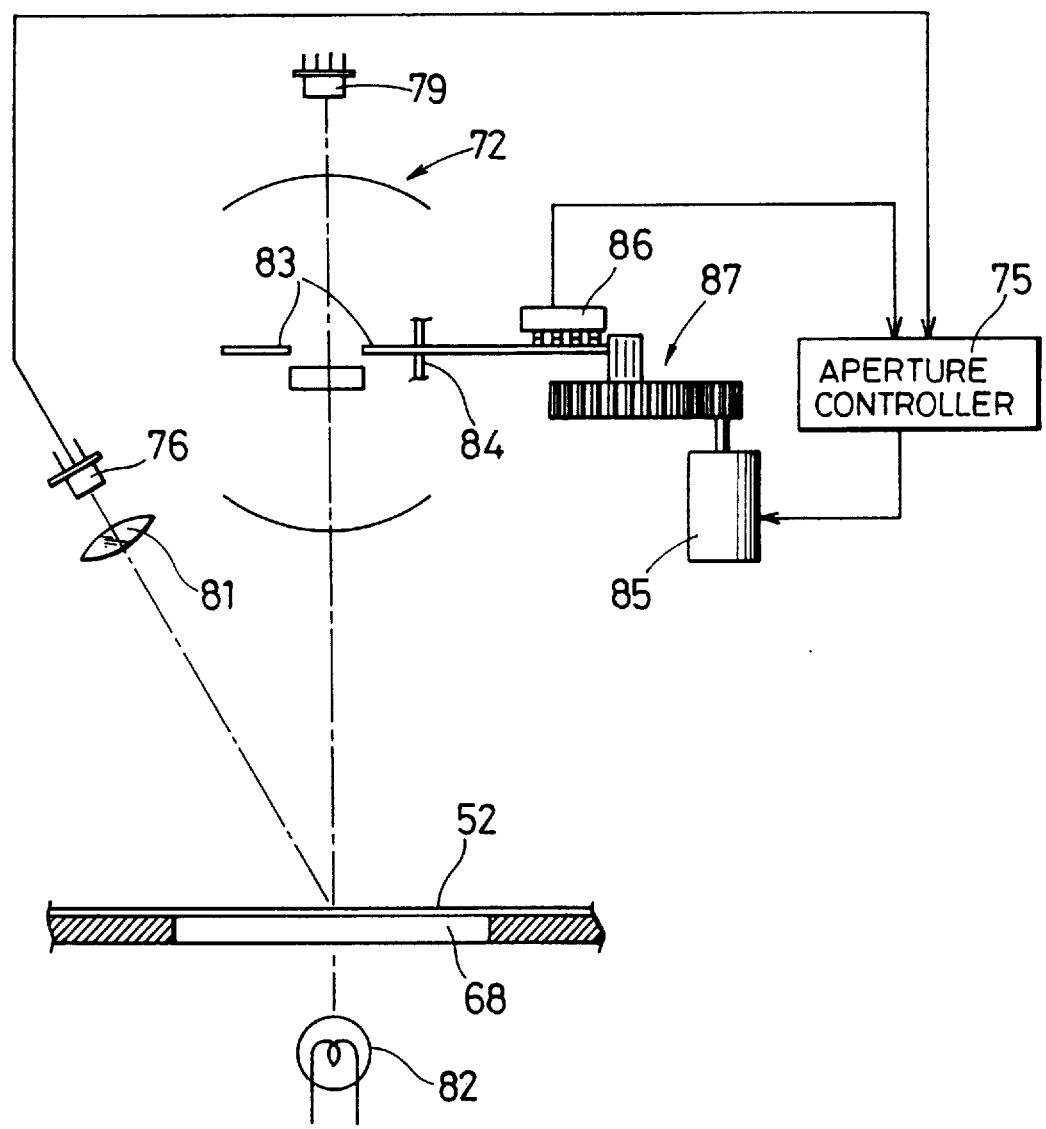
FIG. 12 is a schematic diagram of light measurement and an aperture controller.

The light measurement and aperture controls will be described next with reference to FIG. 12. The light source 82 illuminates the film 52 through the aperture 68. The light measurement sensor 76 is fixed at the position where it does not shield the beams of the light representative of the picked up image, and measures through a light measurement lens 81 the brightness of a portion of the film 52 exposed during the photographing operation. In a negative film, the film density is high when the film is over-exposed during the photographing operation, and a small amount of light reaches the light measurement sensor 76. Conversely, the film density is low when the film is under-exposed during the photographing operation, and a great amount of light reaches the light measurement sensor 76.

The aperture controller 75 determines such an aperture value that allows a suitable light amount to be incident upon the image pick-up sensor 79 based on the light amount measured by the light measurement sensor 76. The light amount is regulated by an aperture plate 83. The aperture plate 83 is a circular disk having opening portions for restricts the beams of light transmitting therethrough and regulating the light amount, patterns for detecting the position, and a gear 87 at a peripheral portion thereof. The aperture plate 83 is rotatable about a rotatable shaft 84. A motor 85 is driven to rotate the aperture plate 83 through a deceleration gear 87. The aperture controller 75 selects the opening portion which provides the aperture value obtained based on the output of the light measurement sensor 76, and controls the motor 85 so that the opening portion is positioned on an optical axis for the picked up image. At this time, the position of the opening portion is detected using the detection patterns on the aperture plate 83 and a contact piece 86.

Figure 11:
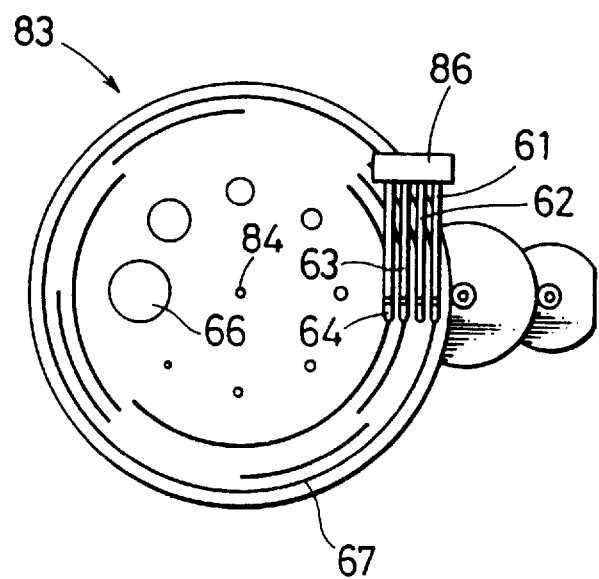
FIG. 11 is a plan view showing an aperture plate.

FIG. 11 is a plan view showing the aperture plate 83. Detection patterns 67 are formed by masking an insulating material on a conductive material. In the drawing, black portions show portions where the conductive material is exposed. The detection patterns 67 are located on four circumferences centering on the rotatable shaft 84. The conductive material is exposed entirely over the most outward circumference. The other three circumferences are patterned so as to correspond to eight opening portions each. Pattern switching portions and the opening portions are symmetrical with respect to the rotatable shaft 84. The contact piece 86 consists essentially of four plate springs 61, 62, 63, 64 so that it comes to contact with the respective patterns. The contact piece 86 is fixed so as to be in contact with the patterns at positions symmetrical to the optical axis of the picked up image with respect to the rotatable shaft 84.

The aperture controller 75 detects a conductive state of the most outward plate spring with the other three to detect a rotated amount of the aperture plate 83. The aperture controller 75 also causes the center of the opening portion to coincide with the optical axis by stopping the rotation at a pattern switching portion.

Figure 13:
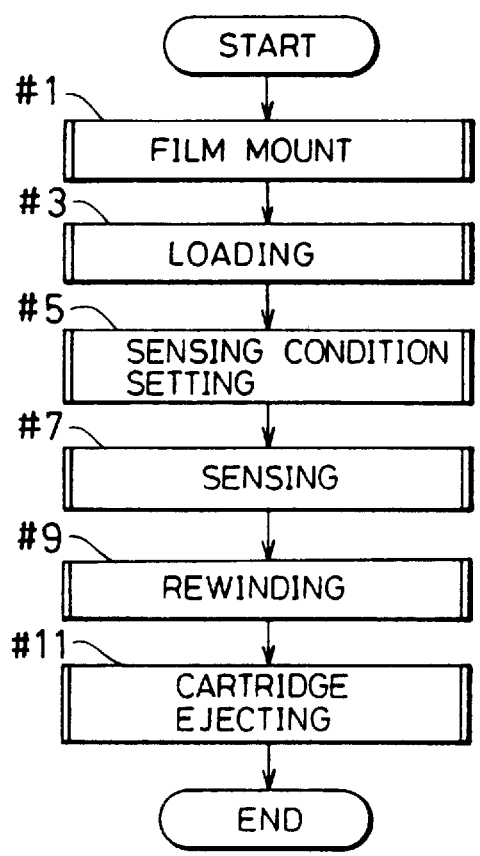
FIG. 13 is a flow chart showing a main operation of the first photographed image reproducing apparatus.

Hereafter, an operation of the photographed image reproducing apparatus 1 according to the invention will be described with reference to flow charts. FIG. 13 is a schematic flow chart showing a main operation of the photographed image reproducing apparatus 1. When the power button 4 is pressed, the film cartridge 53 containing the already developed film 52 therein is mounted (Step #1). When the film 52 is mounted, the loading is carried out (Step #3) and a sensing condition is determined using the information recorded on the mounted film 52 (Step #5). The images on the film 52 are sensed, subjected to the signal processing, and reproduced in accordance with the sensing condition determined in Step #5 (Step #7). Upon the completion of the picking operation, the film 52 is rewound into the cartridge 53 (Step #9) and the cartridge 53 is ejected (Step #11).

Figure 14:
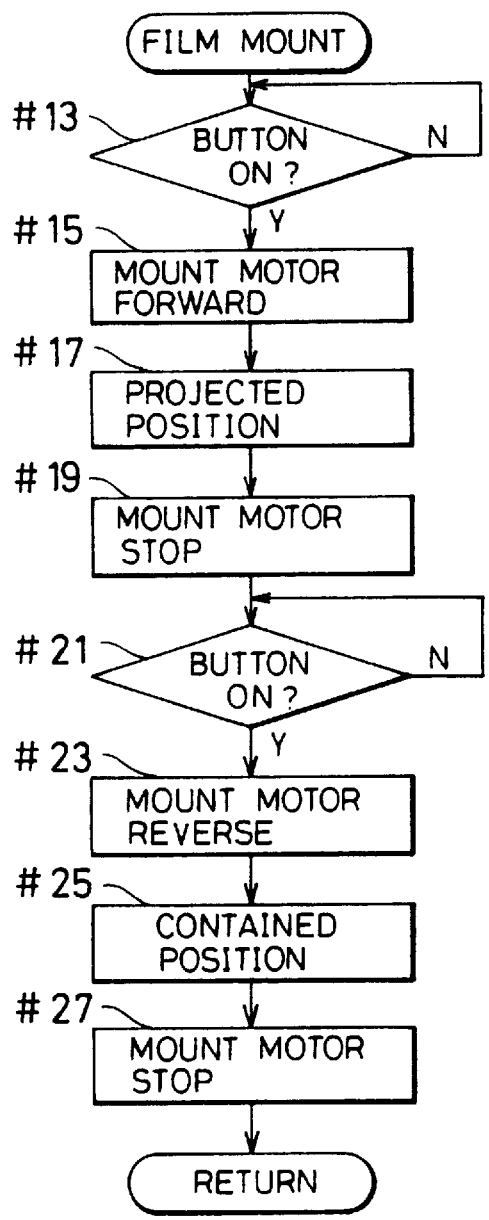
FIG. 14 is a flow chart showing a subroutine "Film Mounting"

FIG. 14 is a flow chart showing a subroutine "Film Mount" shown in Step #1 of FIG. 13. Since it is already described how the driving of the mount motor 43 moves the parts mechanically, no description will be given thereon.

The cartridge mounting portion 13 waits until the operation button 12 is pressed on (Step #13). When the button 12 is pressed on, this routine proceeds to Step #15 in which the mount motor 43 is rotated forward to move the mounting portion 13 to the projected position. When the mounting portion 13 projects by a specified amount (projected position) by the driving of the mount motor 43, the mount motor 43 is stopped (Steps #17, #19). After the film cartridge 53 is mounted, the mount motor 43 is rotated in a reverse direction to move the mounting portion 13 to the contained position when the operation button 12 is pressed again (Steps #23 and #25) and the motor is stopped (Step #27).

Figure 15:
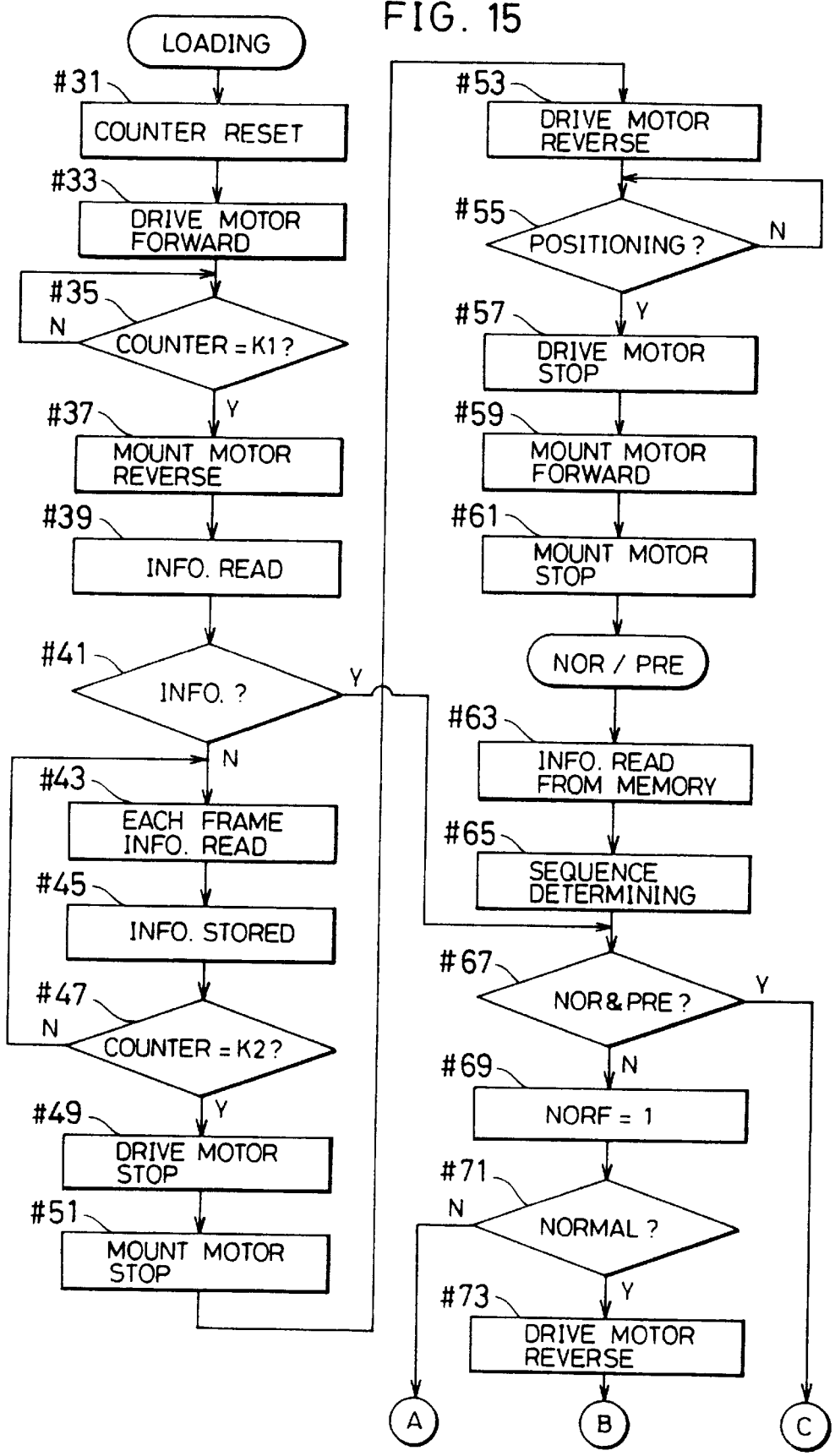
FIGS. 15, 16 are flow charts showing a subroutine "Loading"
Figure 16:
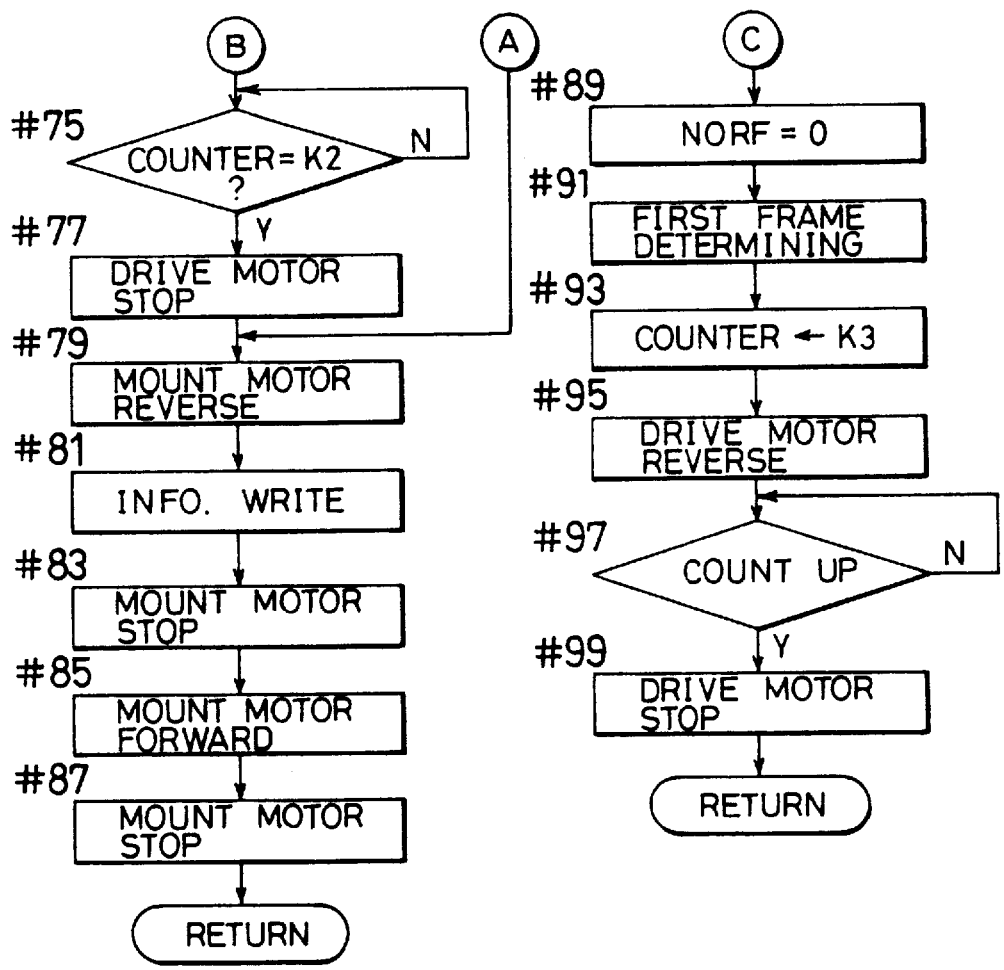

FIG. 15 is a flow chart showing a subroutine "Loading" shown in Step #3 of FIG. 13. Similar to the subroutine "Film Mount," no detailed description will be given on the mechanical movement since it is already described.

A counter used to detect the position of the film 52 is reset (Step #31), and the drive motor 20 is rotated forward to dispense the film 52 from the cartridge 53 (Step #33). It is waited in Step #35 until the film 52 is wound up by a predetermined amount and a count value reaches a predetermined value K1. By winding up the film 52 by the predetermined amount, the information stored on a lead portion 91 (see FIG. 27) of the film 52 is allowed to be read. When the count value becomes equal to K1, the mount motor 43 is rotated in the reverse direction to bring the film 52 into contact with the magnetic head 40 (Step #37). The information stored on the lead portion 91 is read by the magnetic head 40 (Step #39) and it is discriminated whether a specified information is stored on the lead portion 91 (Step #41). The specified information is an information concerning whether the film 52 contained in the cartridge 53 was used with a camera of the normal wind type (in which a film is wound up frame by frame) or with the one of the prewind type (in which all the frames are wound up at first and the photographing operation is conducting while rewinding the film), or whether the film 52 was used with both types of cameras. This routine proceeds to Step #43 if no information is stored in the lead portion 91, while proceeding to Step #67 if any such information is stored therein.

The information for each frame is read as the film 52 is transported (Step #43) and the read information is stored in an unillustrated memory provided in the apparatus 1 (Step #45). The information is read until the count value reaches a predetermined value K2 which means that all the frames have been wound up (Step #47), and this routine proceeds to Step #49 when the count value becomes equal to K2. Then, the drive motor 20 is stopped temporarily (Step #49), and the mount motor 43 is stopped (Step #51). Thereafter, the drive motor 20 is rotated in the reverse direction (Step #53) and the film 52 is rewound to position the last frame at the aperture 68 using the counter (Step #55). When the last frame is positioned at the aperture 68, the drive motor 20 is stopped (Step #57) and the mount motor 43 is rotated forward to bring the film 52 away from the magnetic head 40 (Step #59). When the film 52 moves away from the magnetic head 40, the mount motor 43 is stopped (Step #61).

In the following Steps, it is discriminated whether the film was used with the camera of the normal wind type or of the prewind type. Firstly, the date information out of the information for the respective frames read in Step #43 is read from the memory. A sequence of photographing is determined based on the read date information (Step #65). Subsequently, it is discriminated whether the film was used with the cameras of both the normal and prewind wind types based on the determined sequence of photographing (Step #67). This routine proceeds to Step #89 if the discrimination result is in the affirmative, while proceeding to Step #69 if it is in the negative.

In Step #69, a flag NORF indicative of whether the film was used with the cameras of both the normal wind and prewind types is set at "1". Then, it is discriminated whether the film has been used with the camera of the normal wind or prewind type (Step #71). This routine proceeds to Step #73 if the film was used only with the camera of the normal wind type, while proceeding to Step #79 if the film was used only with the camera of the prewind type. If the film was used with only the camera of the normal-wind type, the drive motor 20 is rotated in the reverse direction to rewind the film 52 (Step #73) since the film 52 is completely wound up in the present state. It is then waited until the count value becomes equal to K2 (Step #75), and the drive motor 20 is stopped (Step #77) when the count value becomes equal to K2. Thereafter, in order to write an information in the lead portion 91, the mount motor 43 is rotated in the reverse direction, thereby bring the film 52 into contact with the magnetic head 40 (Step #79). An information concerning the state of the film 52 (normal wind or prewind) is written on a magnetic medium provided in the lead portion 91. By doing this, the state of the film 52 can be read from the magnetic medium in the lead portion 91 during a next reproducing operation in Step #41, obviating the need to discriminate the sequence of photographing. Upon the completion of the writing operation, the mount motor 43 is stopped (Step #83). Then, the mount motor 43 is rotated forward to move the film 52 away from the magnetic head 40 (Step #85) and is stopped when the film 52 moves away from the magnetic head 40 (Step #87).

There will be next described a case where the film is discriminated to have been used with the cameras of both the normal wind and prewind types in Step #67. Firstly, the flag NORF is set at "0" (Step #89). In Step #91, it is determined which frame should be reproduced first, i.e. which is the first photographed frame, based on the discrimination result in Step #65. Then, a count value K3 which is equivalent to an amount of film transport up to the first frame is set in the counter (Step #93). Since the film 52 is completely wound up in the present state, the drive motor 20 is rotated in the reverse direction to rewind the film 52 (Step #95). It is waited until the count value reaches K3 (Step #97), and thereafter the drive motor 20 is stopped (Step #99) since the film 52 is transported by the specified amount.

Figure 17:
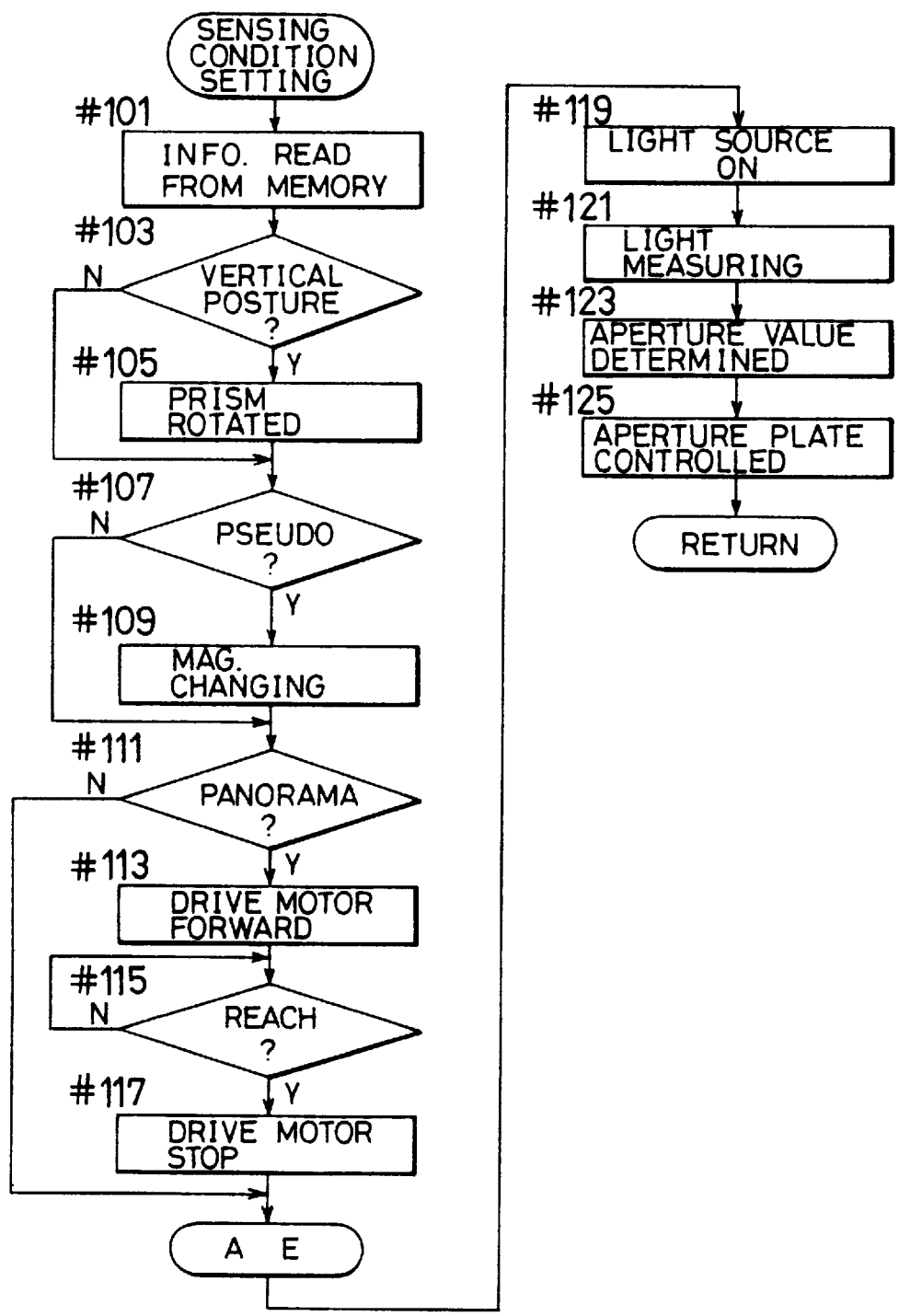
FIG. 17 is a flow chart showing a subroutine "Sensing Conduction Setting"

FIG. 17 is a flow chart showing a subroutine "Sensing Condition Setting" shown in Step #5 of FIG. 13. Firstly, the information corresponding to the frame to be sensed is read from the memory (Step #11). This routine proceeds to Step #15 if it is discriminated based on the read information that the frame of image is photographed while holding camera in vertical posture in Step #13, while proceeding to Step #17 if the discrimination result is in the negative. Then, the prism 77 is rotated so as to reproduce the vertic ally framed image into an erect image (Step #15). In Step #17, it is discriminated where the image is photographed while executing pseudo zooming. This routine proceeds to Step #111 if the discrimination result is in the negative, while proceeding to Step #19 if it is in the affirmative. In Step #19, the taking lens is driven to change the magnification. Then, in Step #111, it is discriminated whether the image was photographed in a panoramic mode. This routine proceeds to Step #119 if the discrimination result is in the negative, while proceeding to Step #113 if it is in the affirmative. In Step #113, the drive motor 20 is rotated forward. It is waited until the film 52 is transported by a specified amount (Step #115) and then the drive motor 20 is stopped (Step #117). This is because the image photographed in the panoramic mode is reproduced, for example, from a center portion thereof.

There then follows an automatic exposure (AE) operation. The light source 82 is turned on (Step #119) and the brightness of the light incident upon the light measurement sensor 76 through the film 52 is measured (Step #121). An aperture value is determined based on an output from the light measurement sensor 76 (Step #123) and the motor 85 is controllably driven to rotate the aperture plate 83 so that the aperture value determined in Step #123 can be obtained (Step #125).

Figure 18:
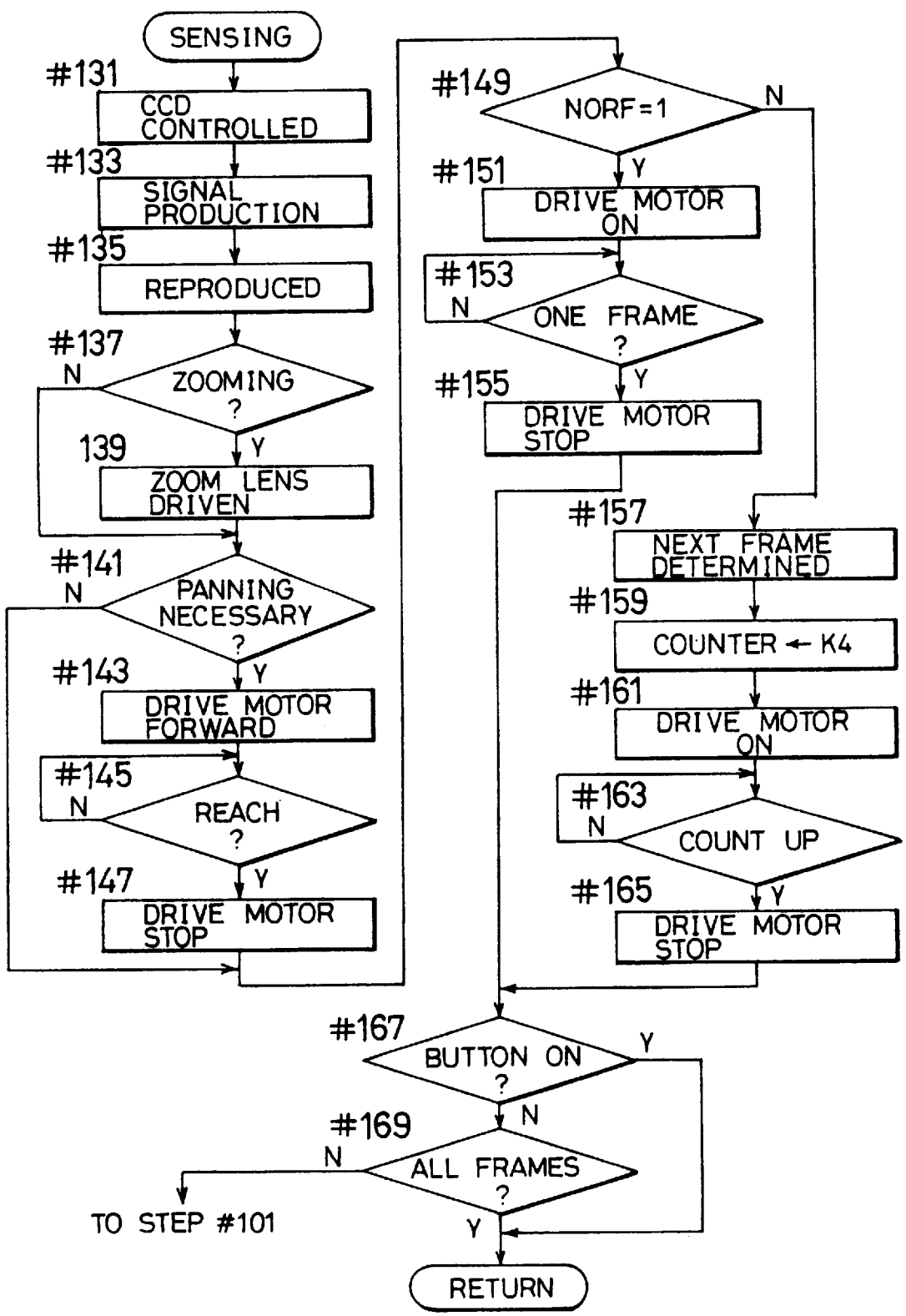
FIG. 18 is a flow chart showing a subroutine "Sensing"

FIG. 18 is a flow chart showing a subroutine "Sensing" shown in Step #7 of FIG. 13. Firstly, the CCDs are controlled to store electric charges (Step #131) and the stored electric charges are read and processed into a signal (Step #133). The image data processed into the signal is reproduced on the screen of the TV monitor 2 (Step #135). It is discriminated whether the zooming has been executed during the reproduction (Step #137). If the zooming is necessary, the zoom lens is driven (Step #139). It is then discriminated whether the panning is necessary to reproduce the image photographed in the panoramic mode or the like (Step #141). If the panning is necessary, this routine proceeds to Step #143 in which the drive motor 20 is rotated forward to transport the film 52. It is waited until the film 52 is transported by a specified amount (Step #145), and then the drive motor 20 is stopped (Step #147). It will be appreciated that the images are sensed, processed into signals, and reproduced during the zooming and panning operations.

Subsequently, it is discriminated whether the flag NORF is set at "1" (Step #149). This routine proceeds to Step #151 if the flag NORF is set at "1", while proceeding to Step #157 unless otherwise. In Step #151, the drive motor 20 is driven to transport the film 52 until a next frame to be reproduced comes up. The drive motor 20 is rotated forward when the film 52 was used with the camera of the normal wind type while being rotated in the reverse direction when the film 52 was used with the camera of the prewind type. It is waited until the film 52 is transported by one frame (Step #153) and then the drive motor 20 is stopped (Step #155).

Unless the flag NORF is set at "1" in Step #149, a frame to be reproduced next is determined based on the date information on the assumption that the film 52 was used with cameras of both the normal and prewind types (Step #157). A count value K4 which is equivalent to a film transport amount until the frame to be reproduced next is set in the counter (Step #159) and the drive motor 20 is driven (Step #161). The rotation of the drive motor 20 is determined according to the transport direction. It is waited until the count value of the counter reaches K4 (Step #163), and then the drive motor 20 is stopped (Step #165).

Subsequently, it is discriminated whether the operation button 12 has been operated during the reproduction (Step #167). If the button 12 has been operated, this routine proceeds to a subroutine "Rewinding". If the button 12 has not been operated, this routine proceeds to Step #169 in which it is discriminated whether all the frames have been reproduced. This routine proceeds to the subroutine "Rewinding" if all the frames have been reproduced while returning to the subroutine "Sensing Condition Setting" (Step #101) if there still remains a frame to be reproduced.

Figure 19:
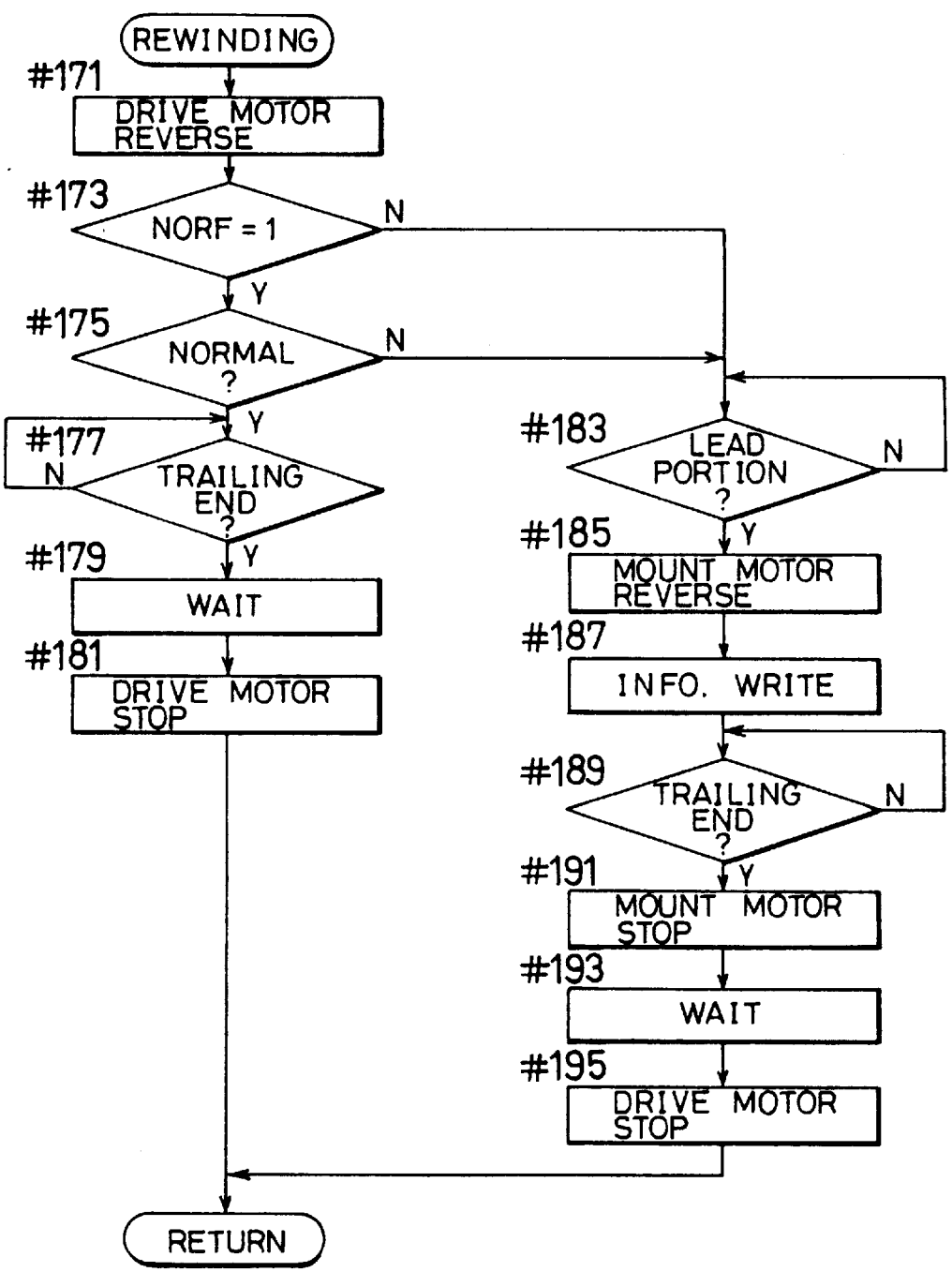
FIG. 19 is a flow chart showing a subroutine "Rewinding"

FIG. 19 is a flow chart showing the subroutine "Rewinding" shown in Step #9 of FIG. 13. Firstly, the drive motor 20 is rotated in the reverse direction (Step #171) to rewind the film 52 into the cartridge 53. It is then discriminated whether the flag NORF is set at "1" (Step #173). If the flag NORF is set at "1", this routine proceeds to Step #175. Unless the flag NORF is set at "1", this routine proceeds to Step #185 on the assumption that the film 52 was used with cameras of both the normal wind and prewind types. In Step #175, it is discriminated whether the film 52 was used with the camera of the normal wind or prewind type. If the film 52 was used with the camera of the normal wind type, this routine proceeds to Step #177 since this film information is already written on the lead portion 91. On the contrary, if the film 52 was used with the camera of the prewind type, this routine proceeds to Step #183 in order to write the film information on the lead portion 91. This is same with the case where the film 52 is used with the camera of both the normal wind and prewind types.

If the discrimination result is in the affirmative in Step #175, this routine waits until the trailing end of the film is detected (Step #177) and then waits until the film 52 is completely contained in the cartridge 53 (Step #179). The drive motor 20 is stopped (Step #181) and this subroutine returns.

If the discrimination result is in the negative in Steps #173 or #175, it is waited until the lead portion 91 is detected (Step #183) and the mount motor 43 is rotated in the reverse direction to bring the film 52 into contact with the magnetic head 40 (Step #185). The film information concerning what type of camera the film 52 was used with is written in the lead portion 91 of the film 52 (Step #187). It is then waited until the trailing end of the film 52 is detected (Step #189) and the mount motor 43 is stopped to bring the film 52 away from the magnetic head 40 (Step #191). It is waited until the film 52 is completely contained in the cartridge 53 (Step #193); the drive motor is stopped (Step #195); and this subroutine returns.

In the foregoing description, an information concerning the wound state of the film 52 is given as the film information to be written on the lead port ion 91. However, other information including a reproducing method may be recorded on the lead portion 91. Further, the film information is written before the reproducing operation when the film was used with the camera of the normal wind type. However, even in this case, the film information may be written when the film is rewound (after the reproducing operation) similar to the case where the film was used with the camera of the prewind type so as to shorten a time before the reproducing operation. Furthermore, the information may be written not on the lead portion 91, but on a magnetic track provided on the film 52 for the photographed image reproducing apparatus.

Figure 20:
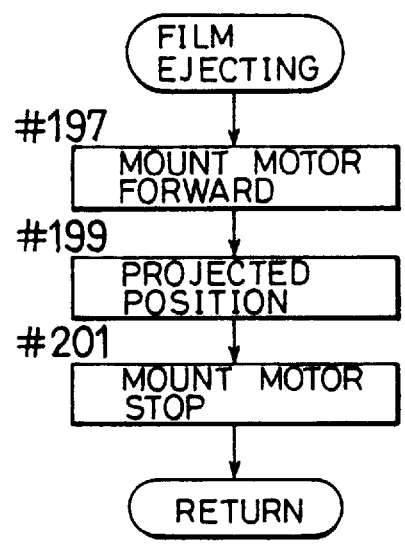
FIG. 20 is a flow chart showing a subroutine "Cartridge Ejecting"

FIG. 20 is a flow chart showing a subroutine "Film Eject" shown in Step #11 of FIG. 13. Since the mechanical operations caused by the driving of the mount motor 43 are as described above, no description will be given thereon. Firstly, the mount motor 43 is rotated forward to move the cartridge mounting portion 13 to the projected position (Step #197). The motor 43 is stopped (Step #199) when the mounting portion 13 is moved to the projected position. When the operation button 12 is operated in this state, the mounting portion 13 is contained and the above operation is repeated.

Figure 21:
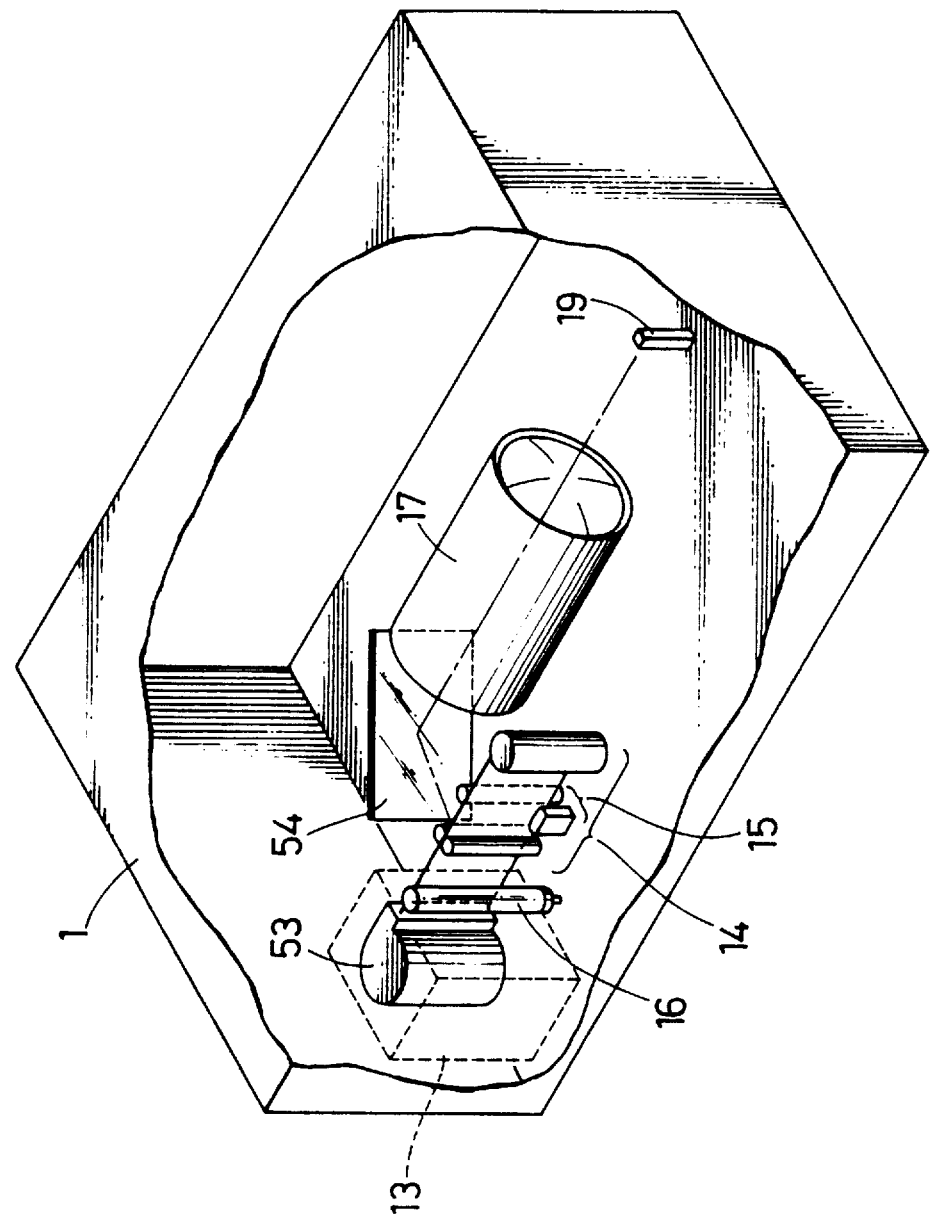
FIG. 21 is a perspective view showing a second photographed image reproducing apparatus incorporating a line image sensor therein.
Figure 22:
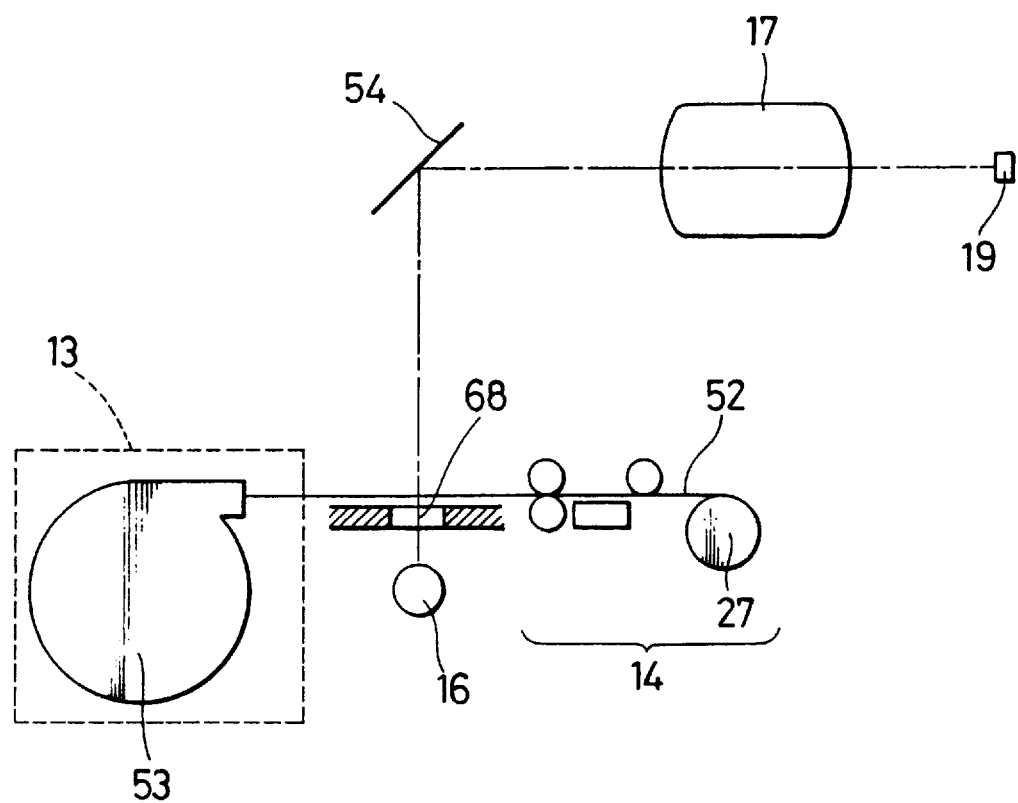
FIG. 22 is a sectional view showing an essential portion of the second photographed image reproducing apparatus.

The foregoing description is given on the case where the area image sensor is used as a photoelectric conversion element of the image pick-up device 19. There is next described a case where a line image sensor is used as such. FIG. 21 is a perspective view showing the photographed image reproducing apparatus 1 provided internally with a line image sensor. Compared to the photographed image reproducing apparatus 1 having the area image sensor in FIG. 3, the prism 18 is dispensed with. This is because, in scanning a whole image with the line image sensor, an image data resulting from each scan is stored in a separate memory and the whole image is reproduced after storing all the image data for the whole image. Accordingly, the image can be rotated by controllably designating addresses of the image data when the image data are output from the memory. Further, since the line image sensor is used, a pulled amount of the film 52 can be decreased, for example, to the width of the line image sensor plus the width of the magnetic head). This will be explained with reference to FIG. 22. As shown in FIG. 22, the width of the aperture 68 for allowing the light from the light source 16 to pass is decreased compared to the case where the area image sensor is used. The width of the aperture 68 is set at a value equivalent to the width of the line image sensor. This results in a smaller area to install the film transport 14, thereby enabling the downsizing of the entire apparatus.

The case where the line image sensor is used will be described with reference to the flow chart shown in FIG. 13. The following description discusses only the points where this case differs from the case where the area image sensor is used. For that matter, no description will be given on the mechanisms to mount the cartridge and to transport the film.

Figure 23:
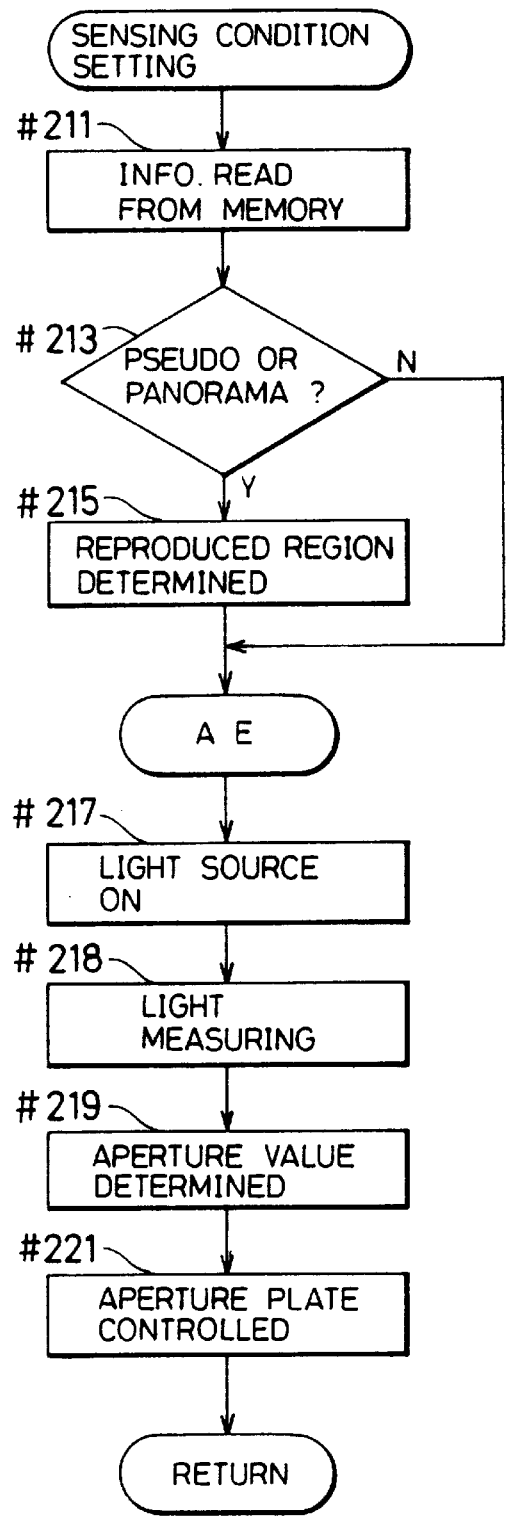
FIG. 23 is a flow chart showing a subroutine "Sensing Condition Setting" for the second photographed image reproducing apparatus.

FIG. 23 is a flow chart showing the subroutine "Sensing Condition Setting" shown in Step #5 of FIG. 13 when the line image sensor is used. Firstly, the information corresponding to the frame to be sensed is read from the memory (Step #211). It is then discriminated whether this frame has been photographed in a pseudo or panoramic mode (Step #213). If the frame has been photographed in the pseudo or panoramic mode (YES in Step #213), the film 52 is transported in accordance with the photographing mode and a region to be reproduced is determined (Step #215). Although this routine then proceeds to the AE operation, no description will be given thereon since the contents thereof is identical to the one shown in FIG. 7.

Figure 24:
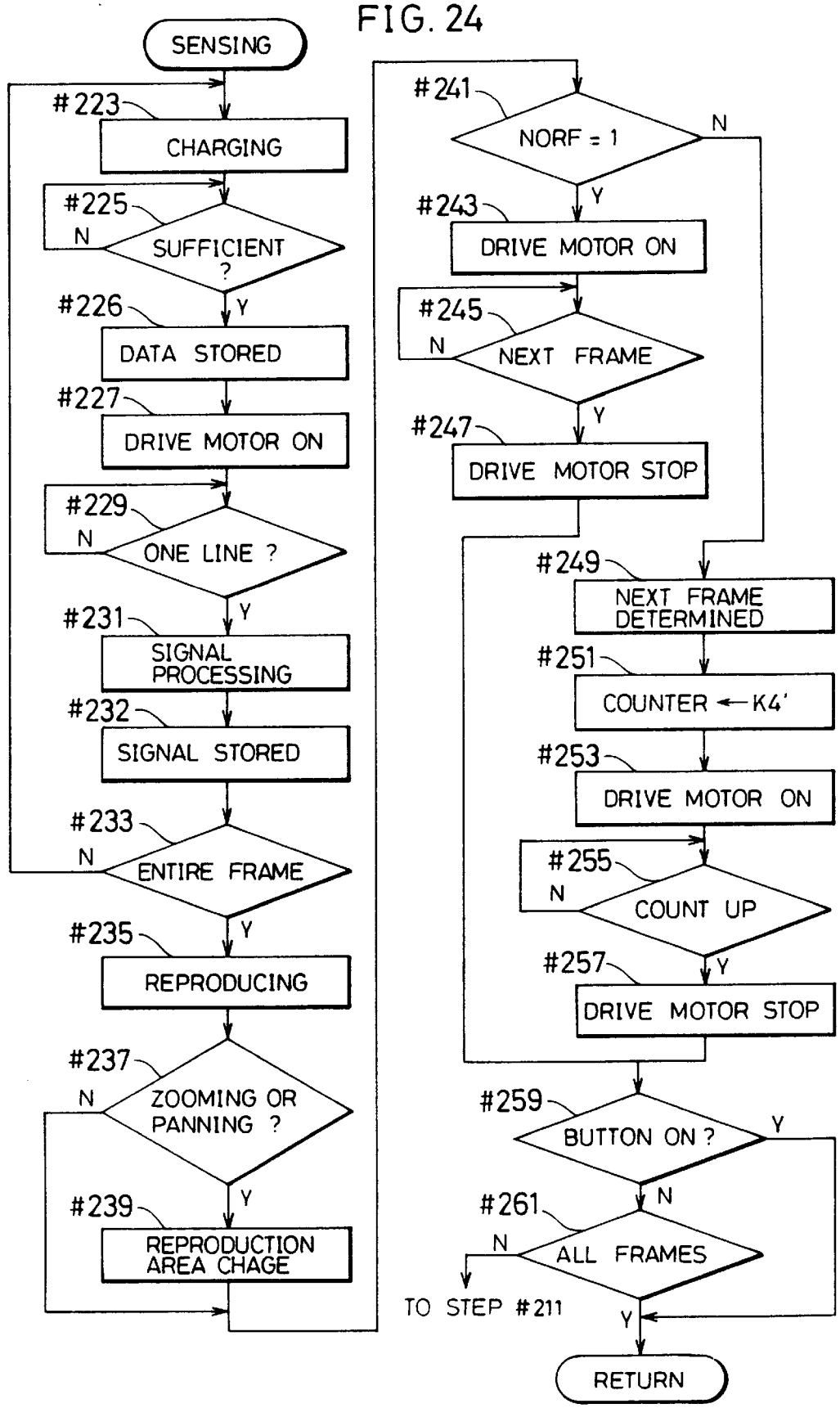
FIG. 24 is a flow chart showing a subroutine "Sensing" for the second photographed image reproducing apparatus.

FIG. 24 is a flow chart showing a subroutine "Sensing" shown in Step #7 of FIG. 13. Firstly, electric charging is carried out using the line image sensor (Step #223) and it is waited until sufficient electric charges are obtained (Step #225). The electric charges are stored in a memory (Step #226). The drive motor 20 is then started (Step #227) and it is waited until the film 52 is transported by one line of the line image sensor (Step #229). When the film 52 is transported by one line, this routine proceeds to Step #231. The frame of image is scanned by transporting the film 52. However, the line image sensor may be moved instead. Whether the drive motor 20 should be stopped after transportation of the film 52 by one line is determined based on relationship between the film transport time and the electric charge storing time. In Step #231, the read data is processed into a signal and stored temporarily in an unillustrated memory (Step #232). Subsequently, it is discriminated whether the frame of image has been entirely scanned (Step #233). This routine returns to Step #223 if the discrimination result is in the negative, while proceeding to Step #235 if it is in the affirmative. In Step #235, the image data processed into the signal is reproduced on the screen of the TV monitor 2. It is then discriminated whether any of the following two is necessary: the zooming due to the fact that the zooming is executed during the reproduction; and the panning in order to reproduce the image photographed in the panoramic mode or the like (Step #237). If the discrimination result is in the affirmative, the addresses of the memory are controlled to change a reproduction area of the frame (Step #239). It is then discriminated whether the flag NORF is set at "1" (Step #241). The routine proceeds to Step #243 if the flag NORF is set at "1", while proceeding to Step #249 unless otherwise. The drive motor 20 is started to transport the film 52 (Step #243); it is waited until a next frame to be reproduced comes (Step #245); and the drive motor 20 is stopped (Step #247). Unless the flag NORF is set at "1" in Step #241, a next frame to be reproduced is determined based on the date information on the assumption that the film 52 was used with cameras of both the normal wind and prewind types (Step #249). Subsequently, a count value K4' is set in the counter (Step #251). The count value K4' is equivalent to a film transport amount until the next frame to be reproduced, and is different from the count value K4 set in the case of the area image sensor because a film transport amount for one frame should be added or subtracted depending upon the position of the line image sensor. Subsequently, the drive motor 20 is started (Step #253). Based on the film transport direction, the rotating direction of the motor 20 is determined. It is waited until the count value reaches K4' (Step #255) and then the drive motor is stopped (Step #259). It is then discriminated whether the operation button 12 has been operated during the reproduction (Step #259). This routine proceeds to the subroutine "Rewinding" if the discrimination result is in the affirmative, while proceeding to Step #261 if it is in the negative. In Step #262, it is discriminated whether all the frames have been reproduced. This routine proceeds to the subroutine "Rewinding" if the discrimination result is in the affirmative, while returning to Step #211 (subroutine "Sensing Condition Setting") shown in FIG. 23 if it is in the negative.

Figure 25:
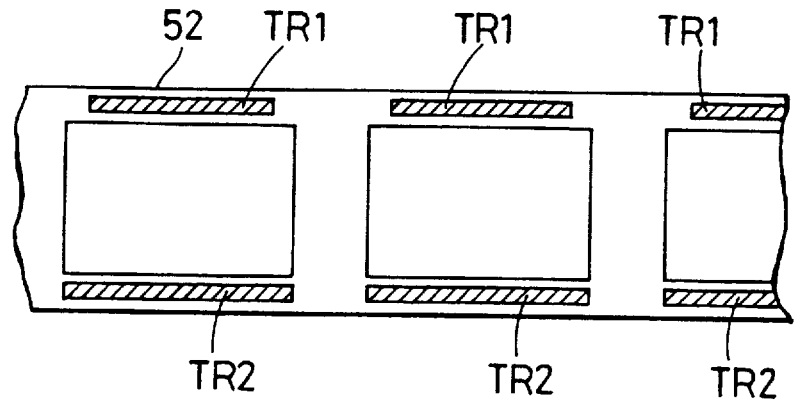
FIGS. 25 to 27 are diagrams each showing positions of magnetic tracks on a film.
Figure 26:
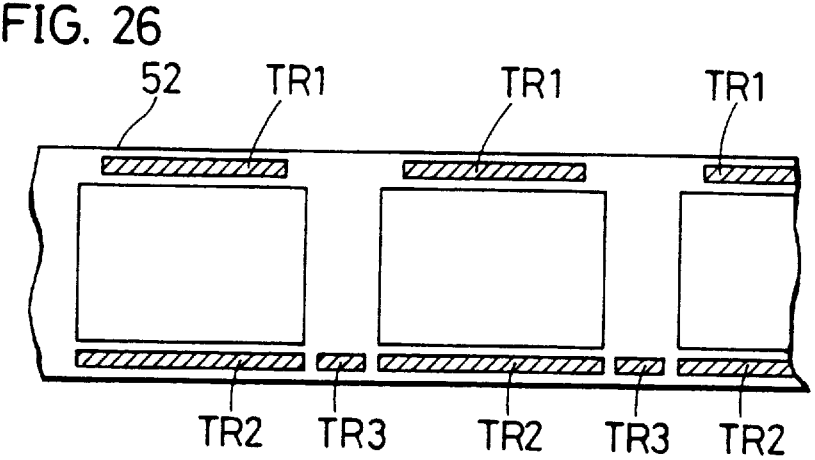
Figure 27:
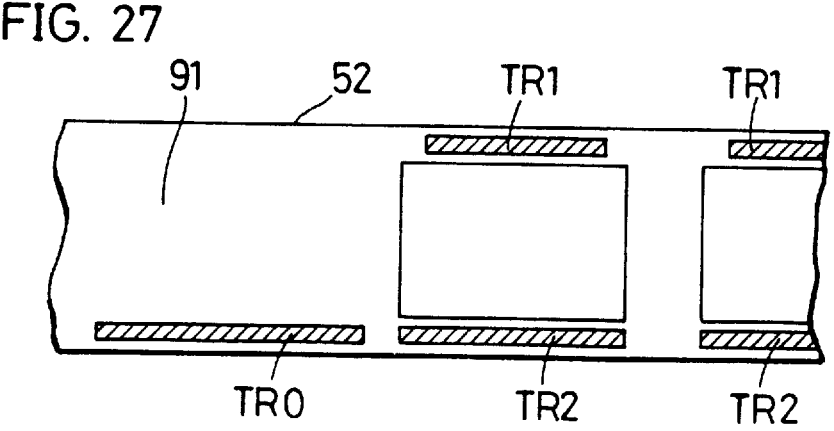

FIGS. 25 to 27 are diagrams showing magnetic tracks provided on the film 52. Although the information determined in the photographed image reproducing apparatus 1 according to the invention is recorded on the lead portion 91 of the film 52 in the foregoing embodiment, it may be recorded on any other position. In FIG. 27, such information is recorded on a magnetic track TR0 provided in the lead portion 91 (foregoing embodiment). In this figure, indicated at TR1 is a magnetic track used to read and write the information at a processing laboratory and at TR2 a magnetic track used to read and write the photographing information in a camera.

FIG. 25 shows a film in which the information determined in the photographed image reproducing apparatus 1 is recorded on the magnetic track TR2 for the camera. More specifically, in the case shown in FIG. 25, a camera information is read in the photographed image reproducing apparatus 1 and is written on the magnetic track TR2 after the photographing condition or the like is determined.

FIG. 26 shows another arrangement of magnetic tracks on the film 52, in which a magnetic track TR3 for the photographed image reproducing apparatus 1 is provided between two adjacent magnetic tracks TR2. The magnetic tracks TR3 may be provided at other positions. For example, they may be provided above or below the tracks TR2 or TR1.

Figure 28:
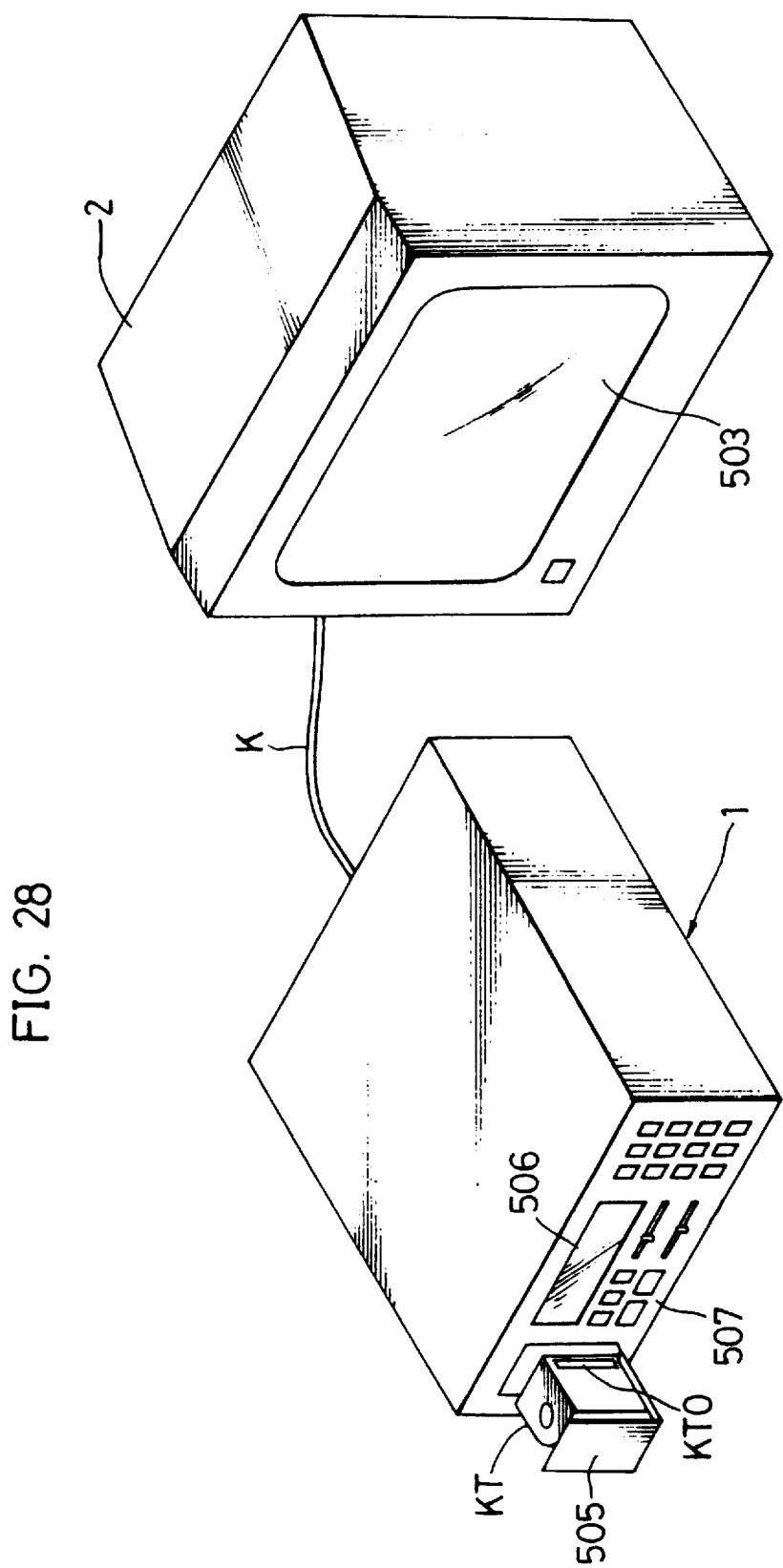
FIG. 28 is a perspective view showing an exterior of a third photographed image reproducing apparatus of the invention.

FIG. 28 is a perspective view showing an exterior of a third photographed image reproducing apparatus of the invention. Similarly to the foregoing embodiments, the third photographed image reproducing apparatus 1 is connected to a television (TV) monitor 2 through a cable K and adapted for reproducing on a screen 503 of the TV monitor 2 images formed on an already developed film.

On a front face of the photographed image reproducing apparatus 1 are arranged a cartridge insertion/eject table 505, a display portion 506, and an information input portion 507. The table 505 inserts a film cartridge KT into the photographed image reproducing apparatus 1 so as to mount the same in a cartridge mounting portion 508.

Figure 29:
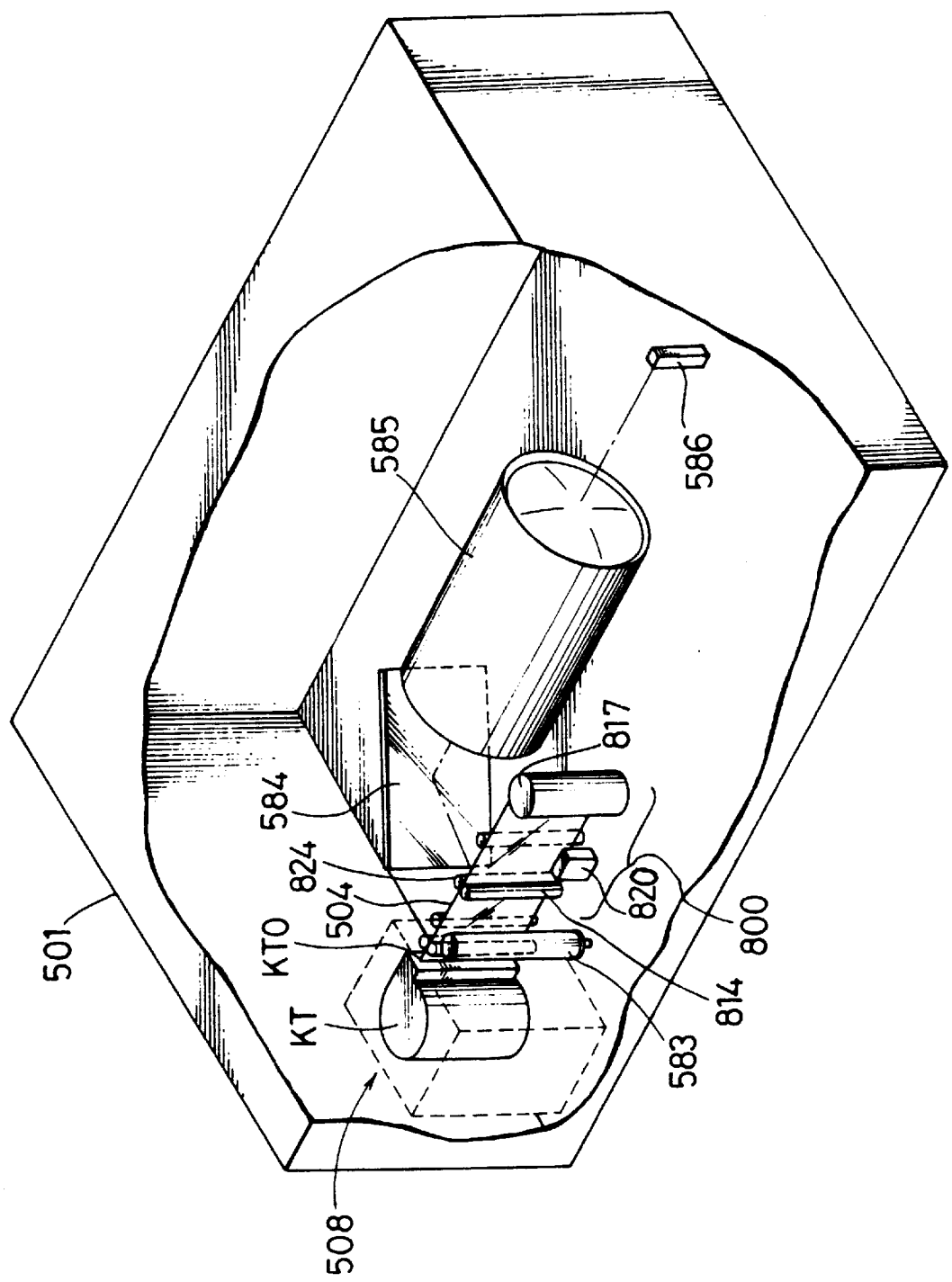
FIG. 29 is a perspective view showing an interior construction of a film cartridge mounting portion of the third reproducing apparatus.
Figure 30:
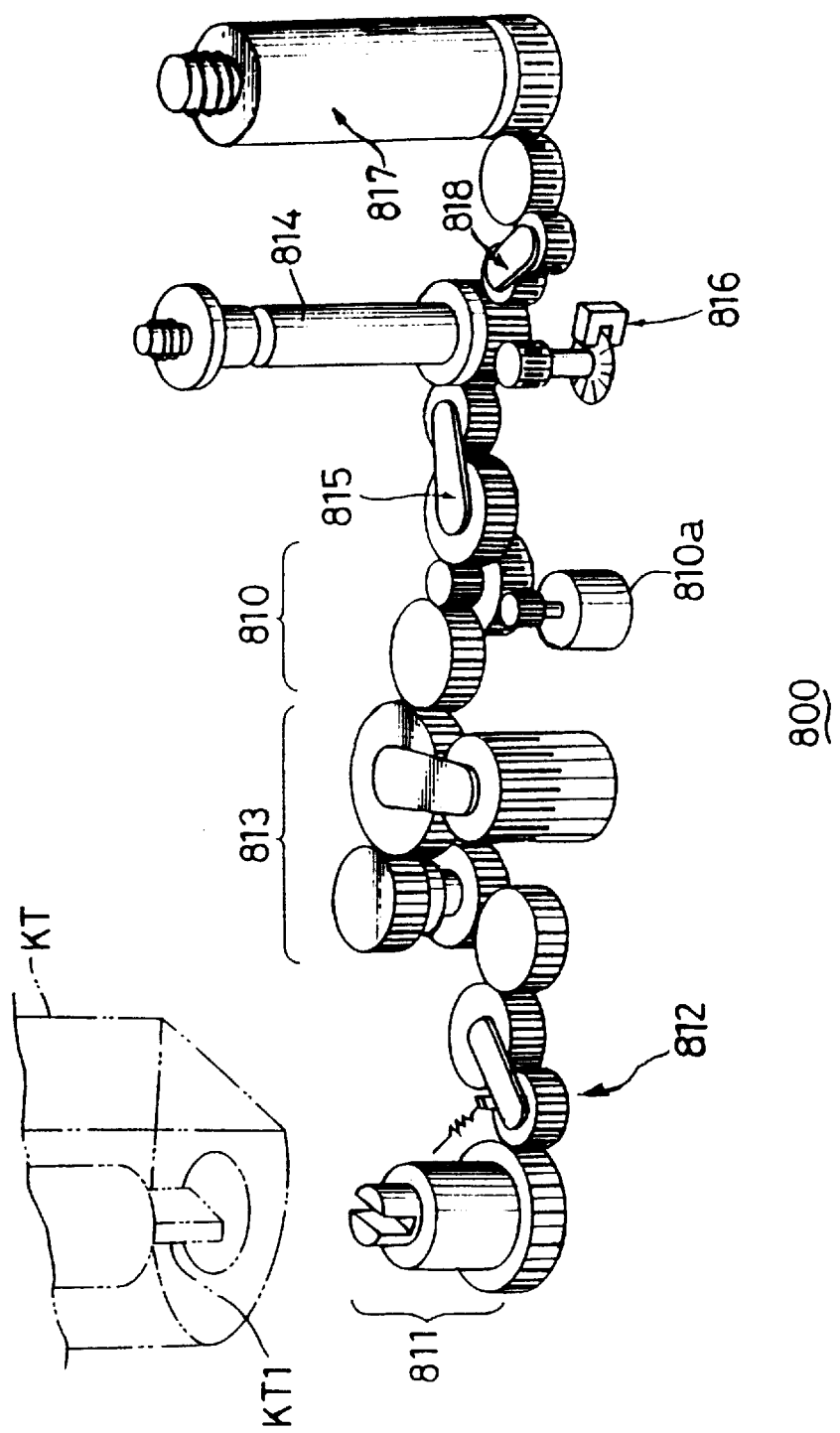
FIG. 30 is a perspective view showing a drive transmission mechanism in a film transport of the third reproducing apparatus.

In the film cartridge KT is supported an unillustrated take-up shaft rotatably between upper and lower lids. A developed film 504 (see FIG. 29) is contained in the film cartridge KT while being rolled around the take-up shaft and having one end thereof connected to the take-up shaft. Further, a film outlet KT0 is formed on an appropriate position on a side face of the film cartridge KT. The film 504 is dispensed or rewound through this film outlet KT0. The take-up shaft is engageable with a driver portion 811 of film transport 800.

Figure 33:
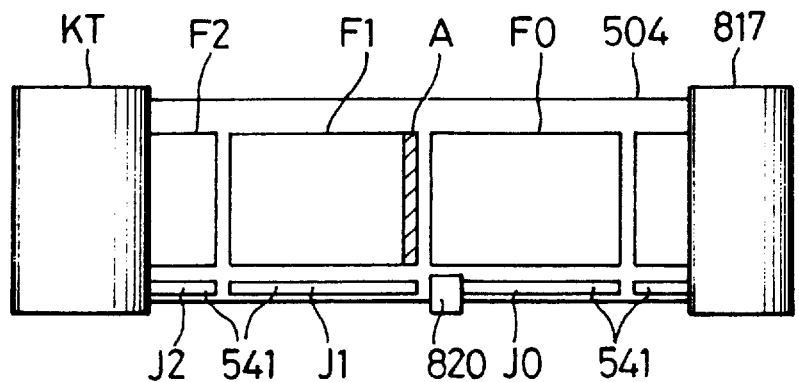
FIG. 33 is a diagram showing an operation state of the third reproducing apparatus.

As shown in FIG. 33, at a bottom edge portion of the film 504, there are magnetic tracks (storage media) 541 arranged in a longitudinal direction of the film 504 in correspondence to respective frames. On each magnetic tracks 541 is recorded information including photographing date and place, an exposure condition, and photography information such as trimming instruction in case of pseudo photography.

The display portion 506 displays the photographing date of the image being reproduced on the screen 503 of the TV monitor 2, the photographing information such as a magnification, or an operative state of the photographed image reproducing apparatus 1. The information input portion 507 includes a plurality of operation switches which are manipulated to conduct color adjustment and instruct a reproducing method such as rotation to the image being reproduced.

A construction of the cartridge mounting portion 508 is basically identical to that of the foregoing embodiments. Specifically, the cartridge mounting portion 508 includes the film transport 800, a magnetic head 820, a light source 583, a mirror 584, a magnification varier 585, and an image pick-up device 586.

The film transport 800 includes the driver 811 and a spool 817. The film transport 800 dispenses the film 504 from the film cartridge KT loaded in the cartridge mounting portion 508 so that the film 504 is taken up by the spool 817, or rewinds the film 504 taken up by the spool 817 into the film cartridge KT.

The magnetic head 820 is arranged in a position opposed to the magnetic tracks 541 on the film 504. The head 820 reads the information recorded on the magnetic tracks 541 such as the photographing information of the respective frames while the film is transported and records color correction carried out to the images of the respective frames and a reproducing method such as zooming.

The light source 583 includes a light emitter such as a halogen lamp, a fluorescent lamp, and a xenon lamp, and projects a light beam onto the film 504 dispensed from the film cartridge KT. The mirror 584 introduces the light beam having passed through the film 504 to the magnification varier 585. The magnification varier 585 adjusts a light amount emitted to the image pick-up device 586 by adjusting a diaphragm (not shown) according to a detection result of an unillustrated light measurement sensor, and changes the magnification by driving an unillustrated taking lens according to the operation of a zoom button (not shown) of the information input portion 507 or the like. The image pick-up device 586 is composed of a line image sensor.

As shown in FIG. 33, the magnetic head 820 is arranged so that, in the case where the leading position of one frame is located in a sensing region A of the image pick-up device 586, it is positioned at a trailing end of the magnetic track corresponding to the frame right downstream of that frame.

A construction of the film transport 800 is, also, basically identical to that of the foregoing embodiment. Specifically, the film transport 800 has a drive transmission mechanism similar to the mechanism shown in FIG. 4 which includes a drive portion 810, the driver portion 811, a connecting mechanism 812, a speed difference absorbing mechanism 813, a drive roller 814, a planetary clutch 815, a speed detector 816, the spool 817 and a planetary clutch 818.

The drive portion 810 includes a drive motor 810a including a step motor which is feedback controlled according to a detection signal from the speed detector 816 so as to rotate at a specified speed. The drive roller 814 holds the film 504 in cooperation with a driven roller 824 (see FIG. 29), and transports the film 504 to the spool 817 upon the receipt of the driving force of the drive motor 810a through the planetary clutch 815.

Figure 31:
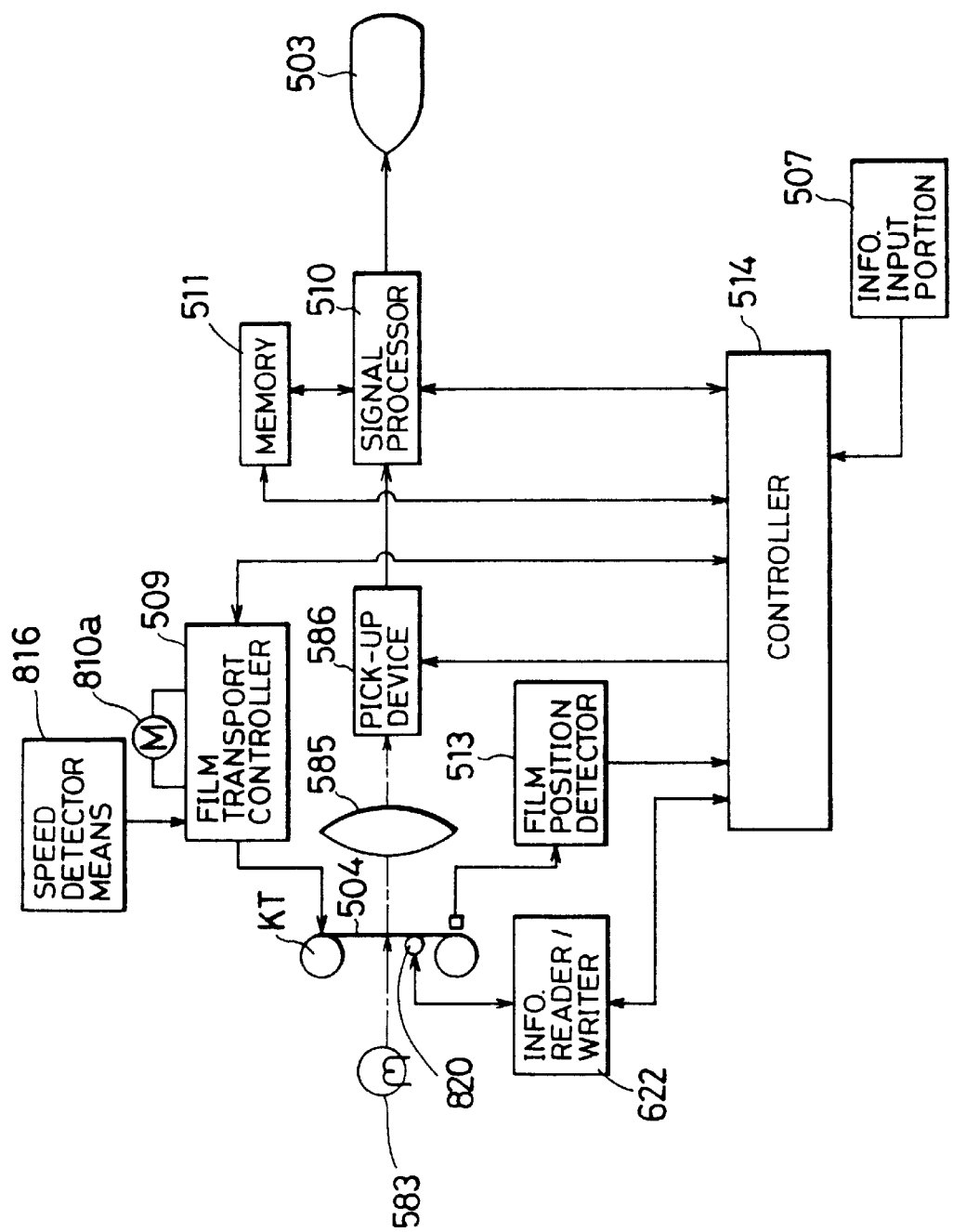
FIG. 31 is a block diagram showing a control system of the third reproducing apparatus.

A control system of the third photographed image reproducing apparatus will be described with reference to a block diagram shown in FIG. 31.

The film transport controller 509 causes the drive motor 810a to rotate forward (in a direction to dispense the film 504) or reversely (in a direction to rewind the film 504) in accordance with a control signal from a controller 514 so as to transport or rewind the film 504. Further, in the case where the image pick-up device (line image sensor) 586 is sensing images on the film 504, the film transport controller 509 controls the drive motor 810a so that the film 504 is transported at such a specified speed as to allow the image pick-up device 586 to scan the frames of image on the film 504.

A signal processor 510 causes image information from the image pick-up device 586 to be stored sequentially in a memory 511. Upon the completion of each scanning for one frame of the film 504, the signal processor 510 reads the image information corresponding to this frame from the memory 511 and introduces the same to the screen 503 of the TV monitor 2 to be reproduced.

An information reader/writer 512 causes the magnetic head 820 to read the information such as the photographing information stored in the magnetic track 541, and outputs the read information to the controller 514 and the signal processor 510. The information reader/writer 512 also writes the information such as a reproducing method set or changed by means of the information input portion 507 on the magnetic track 541. The information read from the magnetic track 541 is recorded thereon as it is when the information is not changed. Further, the information reader/writer 512 discriminates a trailing end of the information stored in the magnetic track 541 in accordance with a specified code.

A film position detector 513 includes a photointerrupter consisting essentially of light emitting and light receiving elements, and detects perforations defined at specified positions of the respective frames of the film 504. The detector 513 detects whether the film 504 has been transported to a position suitable to sense an image in a certain frame of the film 504. The controller 514 is provided internally with a CPU and a memory, and controls respective parts of the photographed image reproducing apparatus 1. The controller 514 causes the film 504 to be transported up to the position to sense the image in each frame based on the detection result of the film position detector 513.

Figure 32:
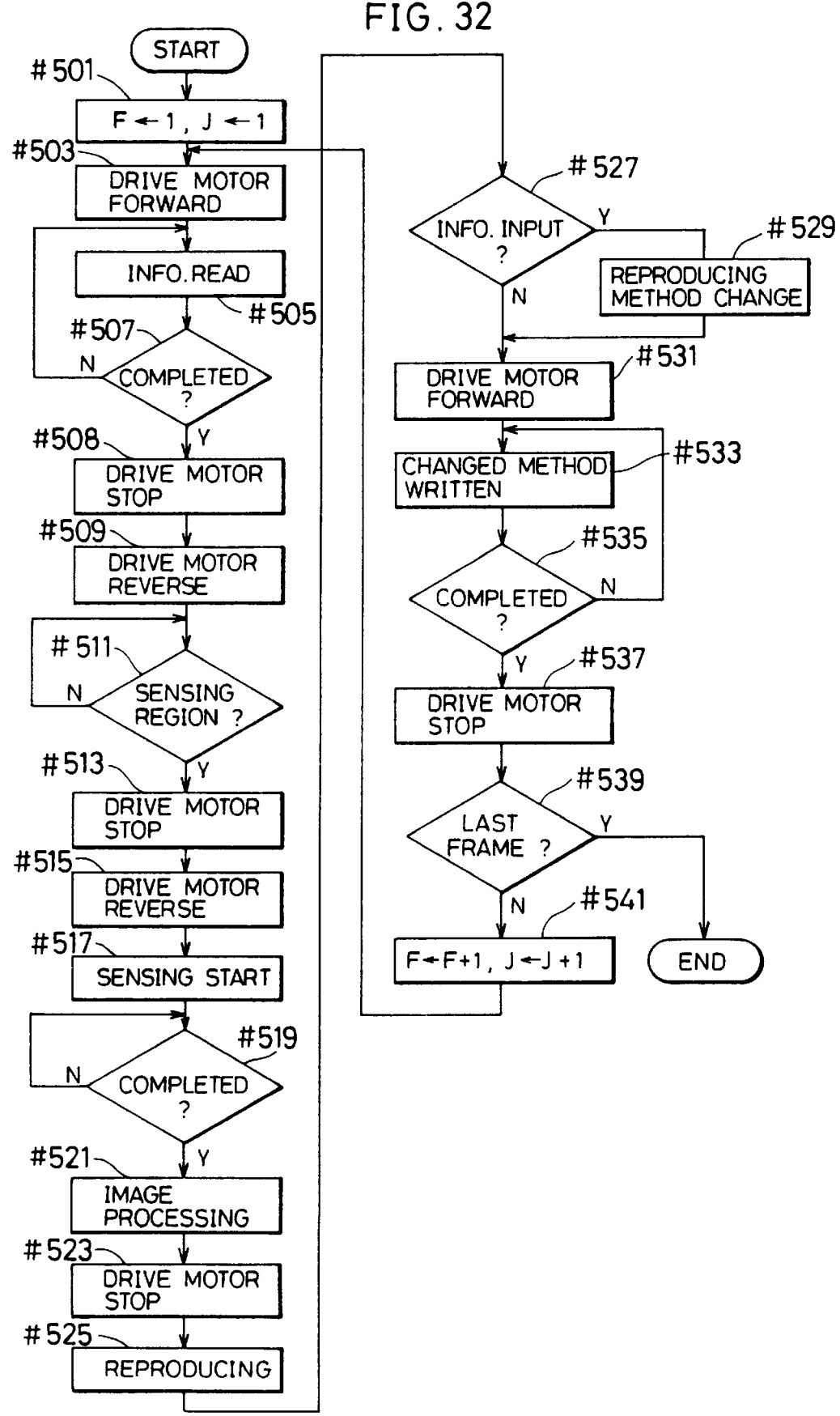
FIG. 32 is a flow chart showing an operation of the third reproducing apparatus.

There will be described an operation of the third photographed image reproducing apparatus with reference to a flow chart shown in FIG. 32 and operation diagrams shown in FIGS. 33 to 39. It will be appreciated that the film 504 includes a plurality of frames. In FIGS. 33 to 39, the sensing region A is indicative of a region on the film 504 sensed by the image pick-up device 586. As shown in FIG. 33, when the sensing region A is located at a leading end of a frame F1 with respect to the dispensing direction, the magnetic head 820 is located at a trailing end of a magnetic track J0 corresponding to a frame F0 with respect to the dispensing direction. The description will be given on the frames F0 to F2 for the sake of convenience.

The film cartridge KT is placed on the cartridge insertion/eject table 505 and inserted into the photographed image reproducing apparatus 1, and thereby the film 504 is mounted in the cartridge mounting portion 508. Firstly, a variable F indicative of a frame number of the film 504 and a variable J indicative of a number of the magnetic track 541 are both set at "1" (Step #501). Subsequently, the information are read sequentially from the magnetic tracks 541 corresponding to the respective frames from the first frame; the images in the respective frames are sensed; and information are written on the magnetic tracks 541 corresponding to the frames whose images have been sensed.

Figure 34:
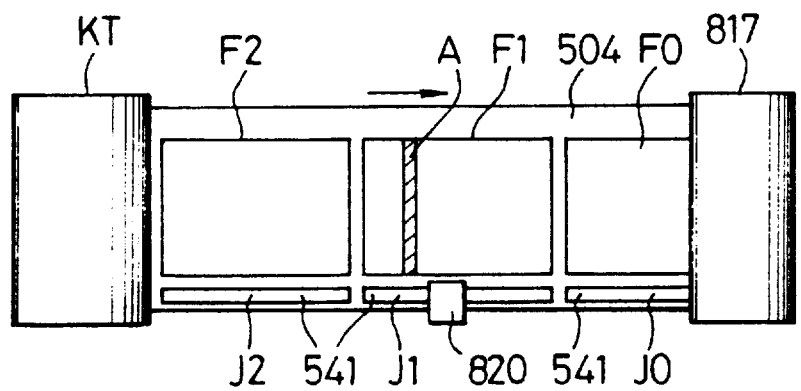
FIG. 34 is a diagram showing an operation state of the third reproducing apparatus where information is read from a magnetic track.
Figure 35:
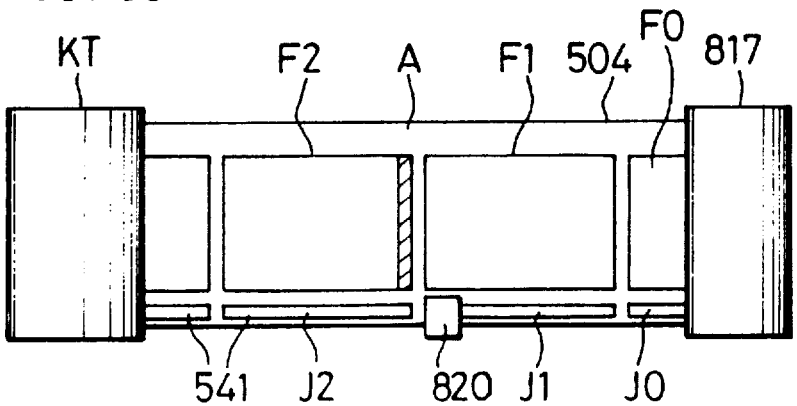
FIG. 35 is a diagram showing an operation state of the third reproducing apparatus where information reading is completed.

When this routine returns to Step #503 after the variables F, J becomes F1, J1 respectively in Step #541, the drive motor 810a rotates forward (Step #503) and the film 504 is transported in an arrow direction (dispensing direction) as shown in FIGS. 33 and 34 and the magnetic head 820 starts reading the information stored on the magnetic track J1 corresponding to the frame F1 (Step #505). When the trailing end of the magnetic track J1 reaches the magnetic head 820 as shown in FIG. 35 and the information reading is completed (YES in Step #507), the drive motor 810a is stopped temporarily and is rotated in the reverse direction (Steps #508, #509). Thereafter, when the film 504 is rewound based on the detection result of the film position detector 513 until the sensing start position of the frame F1, i.e. the trailing end of the frame F1 (left end in the drawing), reaches the sensing region A of the image pick-up device 586 (YES in Step #511), the drive motor 810a is stopped (Step #513).

Figure 36:
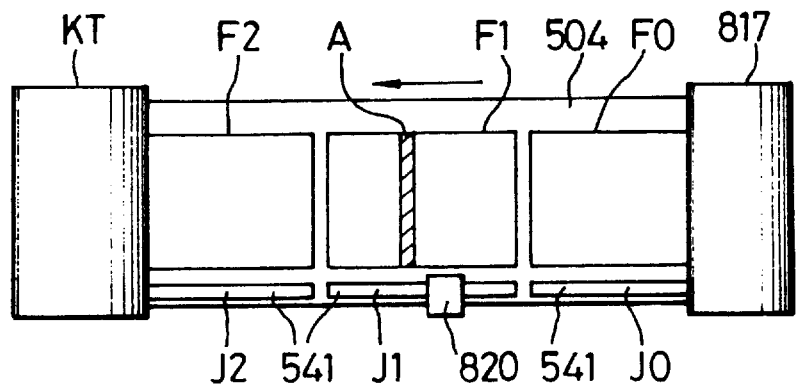
FIG. 36 is a diagram showing an operation state of the third reproducing apparatus where a frame of image is completely sensed.
Figure 37:
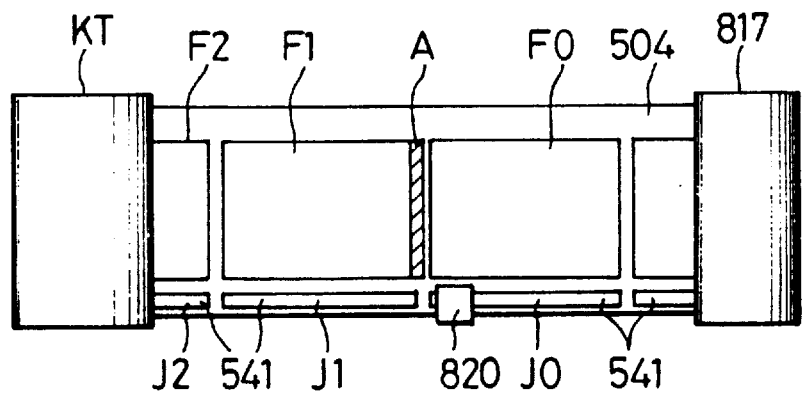
FIG. 37 is a diagram showing an operation state of the third reproducing apparatus where image forming is completed.
Figure 38:
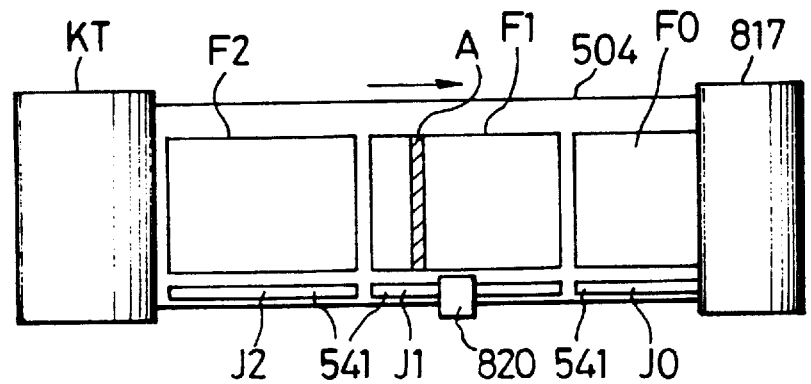
FIG. 38 is a diagram showing an operation state of the third reproducing apparatus where the information is written on the magnetic track.

Subsequently, the drive motor 810a is rotated in the reverse direction to transport the film 504 in an arrow direction in FIG. 36 (in the rewinding direction), and the image pick-up device 586 starts sensing the image in the frame F1 (Steps #515, #517). Upon the completion of the reading of the image in the frame F1 as shown in FIG. 37 (YES in Step #519), the sensed image is processed in accordance with the information read from the magnetic track J1 (Step #521). For example, if the frame F1 is photographed while holding the camera in a vertical posture, the image information is stored in the memory 511 after being converted into a horizontally frame image which is normal photographing posture.

Subsequently, the drive motor 810a is stopped (Step #523), and the image information corresponding to the frame F1 is read from the memory 511 and reproduced on the screen 503 of the TV monitor 2 (Step #525). At this time, the leading end of the magnetic track J1 is located at the position of the magnetic head 820.

In the case where the information on the color adjustment and/or the reproducing method such as the rotation is input by means of the information input portion 507 based on the reproduced image of the frame F1 (YES in Step #527), the reproducing method for the image is changed according to the input information (Step #529). Then, the forward rotation of the drive motor 810a is started (Step #531); the film 504 is transported in an arrow direction of FIG. 38 (in the dispensing direction); and the changed reproducing method is written on the magnetic track J1 (Step #533). It will be appreciated that the image in the frame whose reproducing method has been changed is reproduced according to the changed content thereafter.

On the other hand, if no information is input (NO in Step #527), the information read from the magnetic track J1 is written on the magnetic track J1 as it is. It may be also appropriate not to write the information on the magnetic track J1 again when no information is input in Step #527.

Figure 39:
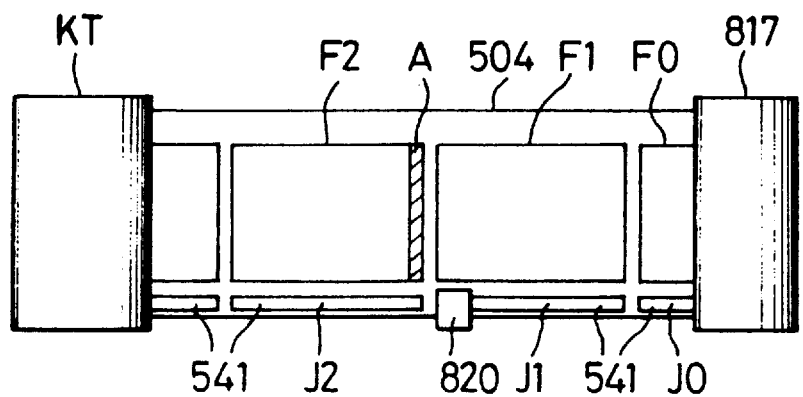
FIG. 39 is a diagram showing an operation state of the third reproducing apparatus where information writing is completed.

When, for example, the trailing end of the magnetic track J1 reaches the magnetic head 820 as shown in FIG. 39 and the information writing operation on the magnetic track J1 is completed (YES in Step #535), the drive motor 810a is stopped (Step #537).

Subsequently, it is discriminated whether the frame carrying the presently reproduced image is the last frame of the film 504 based on the value of the variable F (Step #539). If this frame is not the last one (NO in Step #539), the variables F, J are incremented by one each (Step #541) and this routine returns to Step #503 and subsequent steps in which a processing is carried out to reproduced an image in a next frame F2. When the operations of Steps #503 to #537 are carried out for all the frames of the film 504 (YES in Step #539), this routine ends.

As described above, in the third photographed image reproducing apparatus, a line image sensor is used as an image pick-up device 586 and the information are read from and written on the magnetic tracks 541 through a single magnetic head 820. Accordingly, the photographed image reproducing apparatus of the third reproducing apparatus can be fabricated at a reduced cost compared to those having an area image sensor, or separate magnetic heads each specially provided for reading and writing information. Further, the reciprocal transportation of the film 504 allows the information corresponding to the respective frames of the film 504 to be read and written when the film 504 is transported in one direction and allows the images to be reproduced when the film 504 is transported in the other. Thus, the photographed images can be reproduced within a shorter time.

Figure 40:
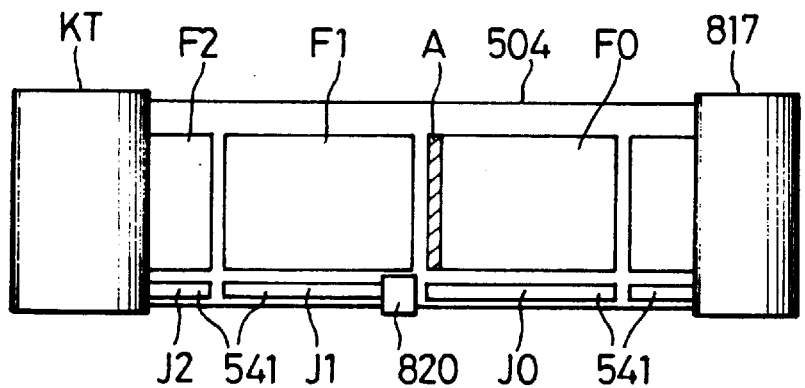
FIG. 40 is a diagram showing another arrangement of an sensing region and a magnetic head.

The positional relationship between the sensing region A of the line image sensor as the image pick-up device 586 and the magnetic head 820 is not limited to the one shown in FIG. 33. The sensing region A and the magnetic head 820 may be arranged at the same position with respect to the transport direction of the film 504. In this case, the sensing region A is located at the trailing end of the frame upon the completion of the reading of the magnetic track 541 by the magnetic head 820. Accordingly, the reading of the image in this frame can be started right away in this state. Further as shown in FIG. 40, the magnetic head 820 may be arranged such that the leading end of the frame F1 is positioned at the magnetic head 820 when the trailing end of the frame F0 is located in the sensing region A.

Figure 41:
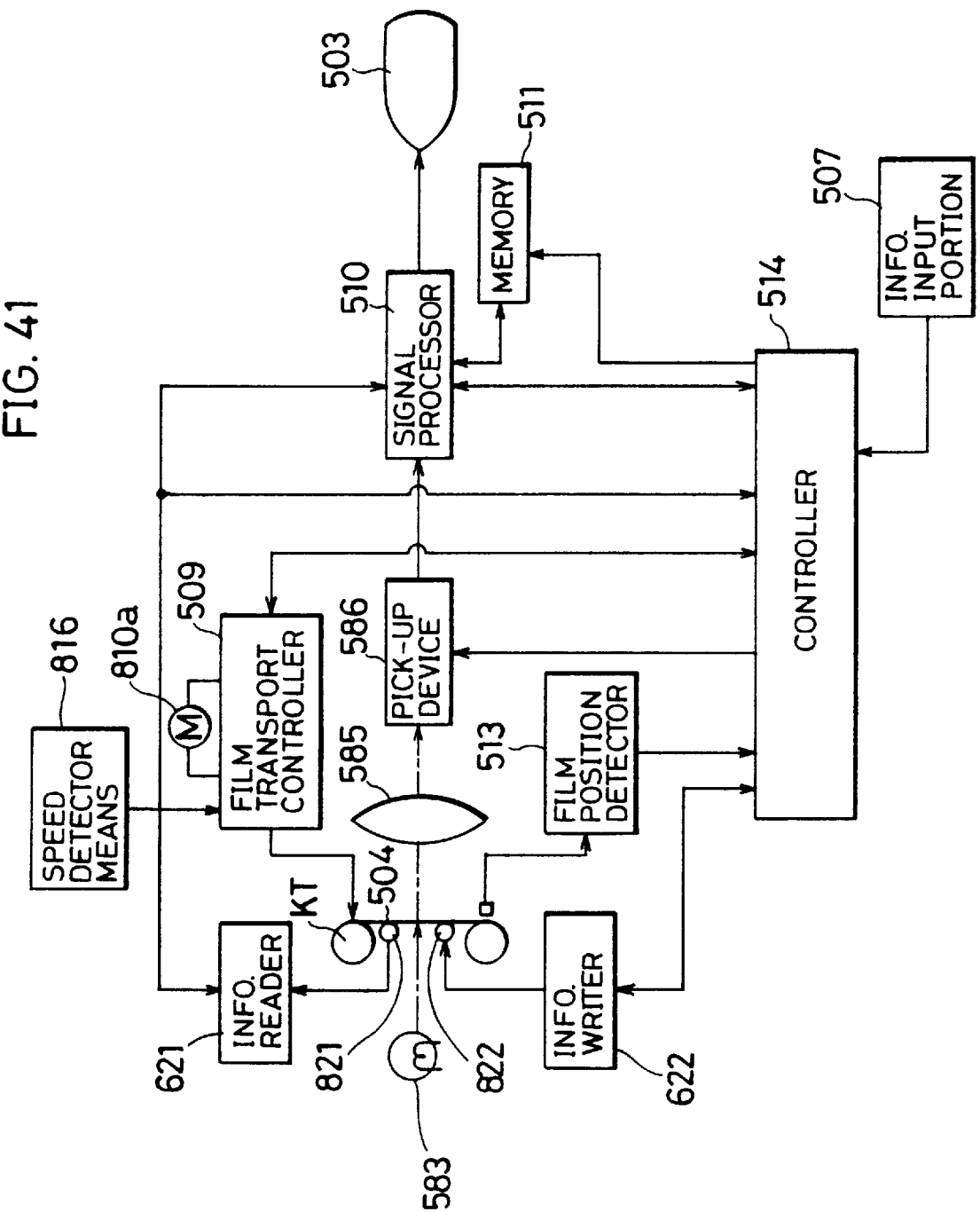
FIG. 41 is a block diagram showing a control system of a fourth photographed image reproducing apparatus of the invention.
Figure 42:
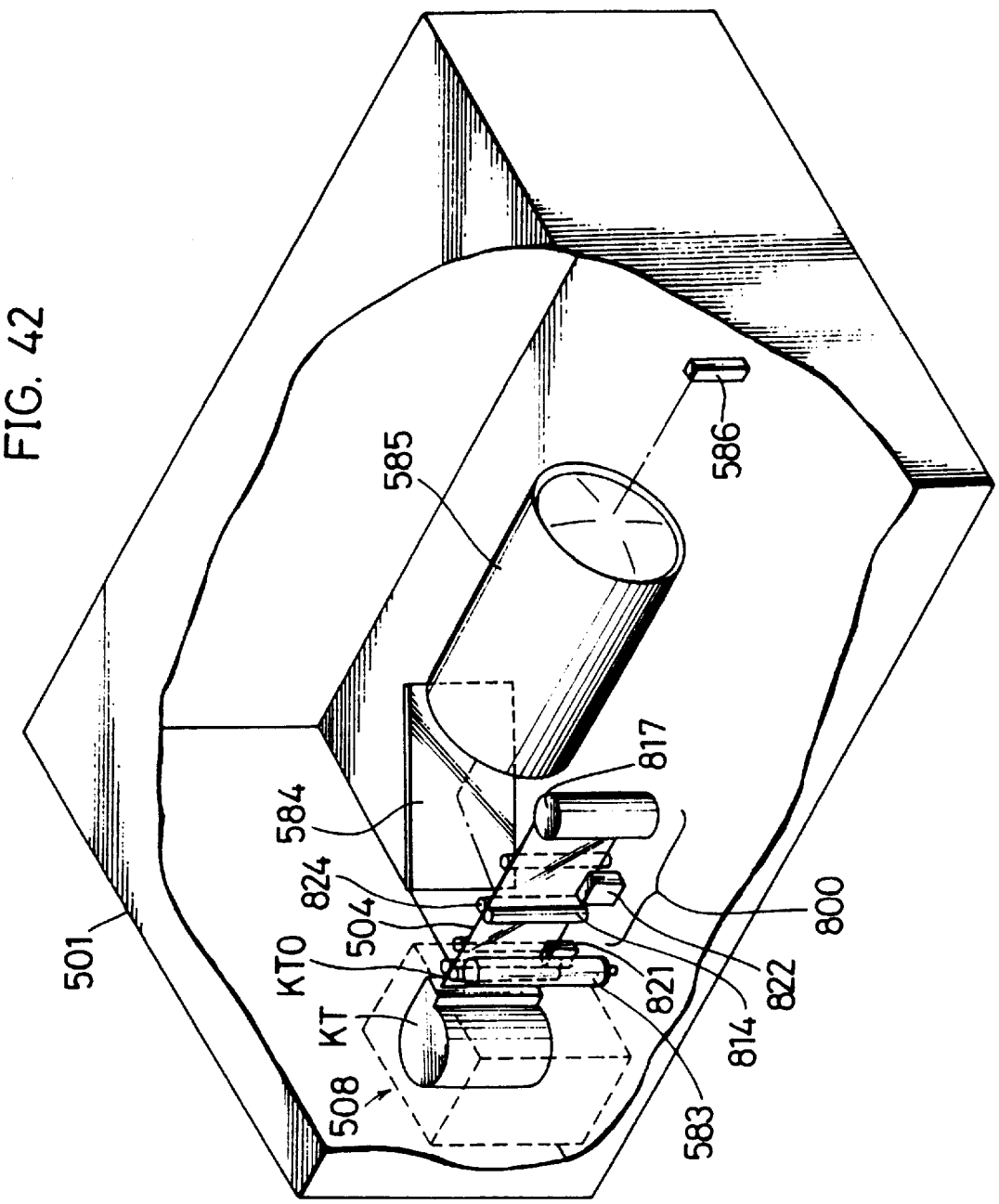
FIG. 42 is a perspective view showing an interior construction of a film cartridge mounting portion of the fourth reproducing apparatus.

There will be described a fourth photographed image reproducing apparatus according to the invention next with reference to FIGS. 41 and 42. It will be appreciated that like or identical reference numerals designate elements having like or identical functions in FIGS. 29 and 31.

In the fourth reproducing apparatus, a magnetic head 821 exclusively for reading information, a magnetic head 822 exclusively for writing information, an information reader 621, and an information writer 622 are provided in place of the magnetic head 820 and the information reader/writer 512.

Figure 47:
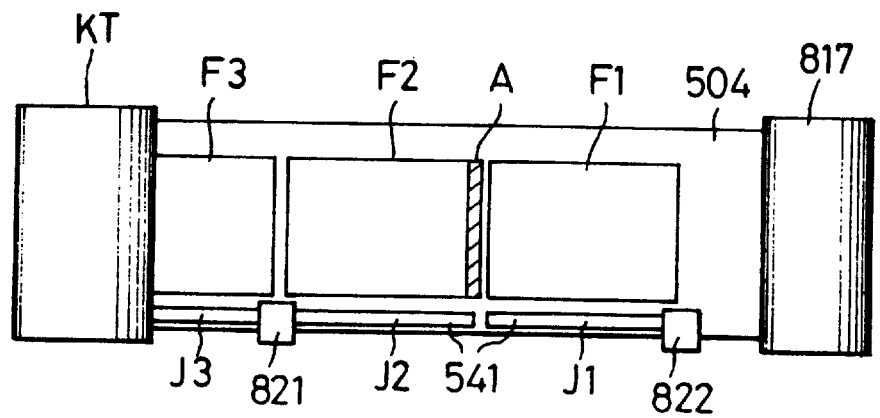
FIG. 47 is a diagram showing an operation state of the fourth reproducing apparatus where information reading and writing and image sensing are completed.

The information reader 621 causes the magnetic head 821 to read information stored on magnetic tracks 541 and outputs the read information to a signal processor 510 and a controller 514. The information writer 622 writes information such as a reproducing method on the magnetic tracks 541 through the magnetic head 822. As shown in FIG. 47, the magnetic head 821 is arranged more upstream with respect to a dispensing direction than a sensing region A of an image pick-up device 586 by one frame. On the other hand, the magnetic head 822 is arranged more downstream with respect to the dispensing direction than the sensing region A by one frame. With this arrangement, when a leading end of a frame F2 is located in the sensing region A of the image pick-up device 586, a leading end of a magnetic track J3 corresponding to a next frame F3 is located at the position of the magnetic head 821 and a leading end of a magnetic track J1 corresponding to a preceding frame F1 is located at the position of the magnetic head 822.

Figure 43:
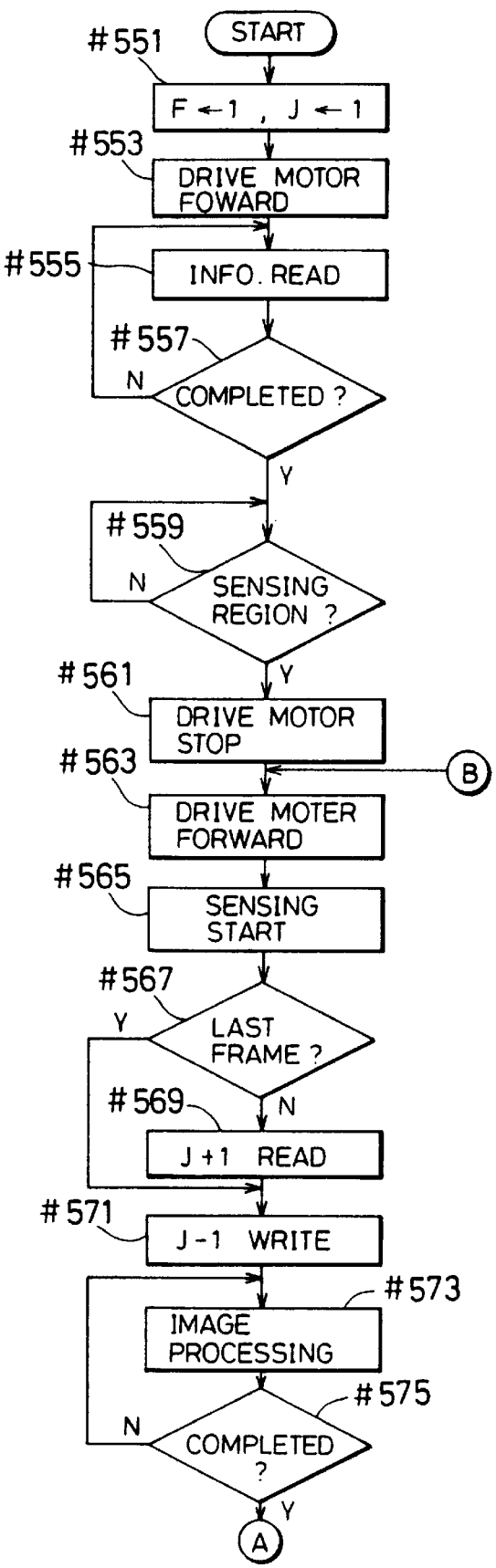
FIGS. 43, 44 are flow charts showing an operation of the fourth reproducing apparatus.
Figure 44:
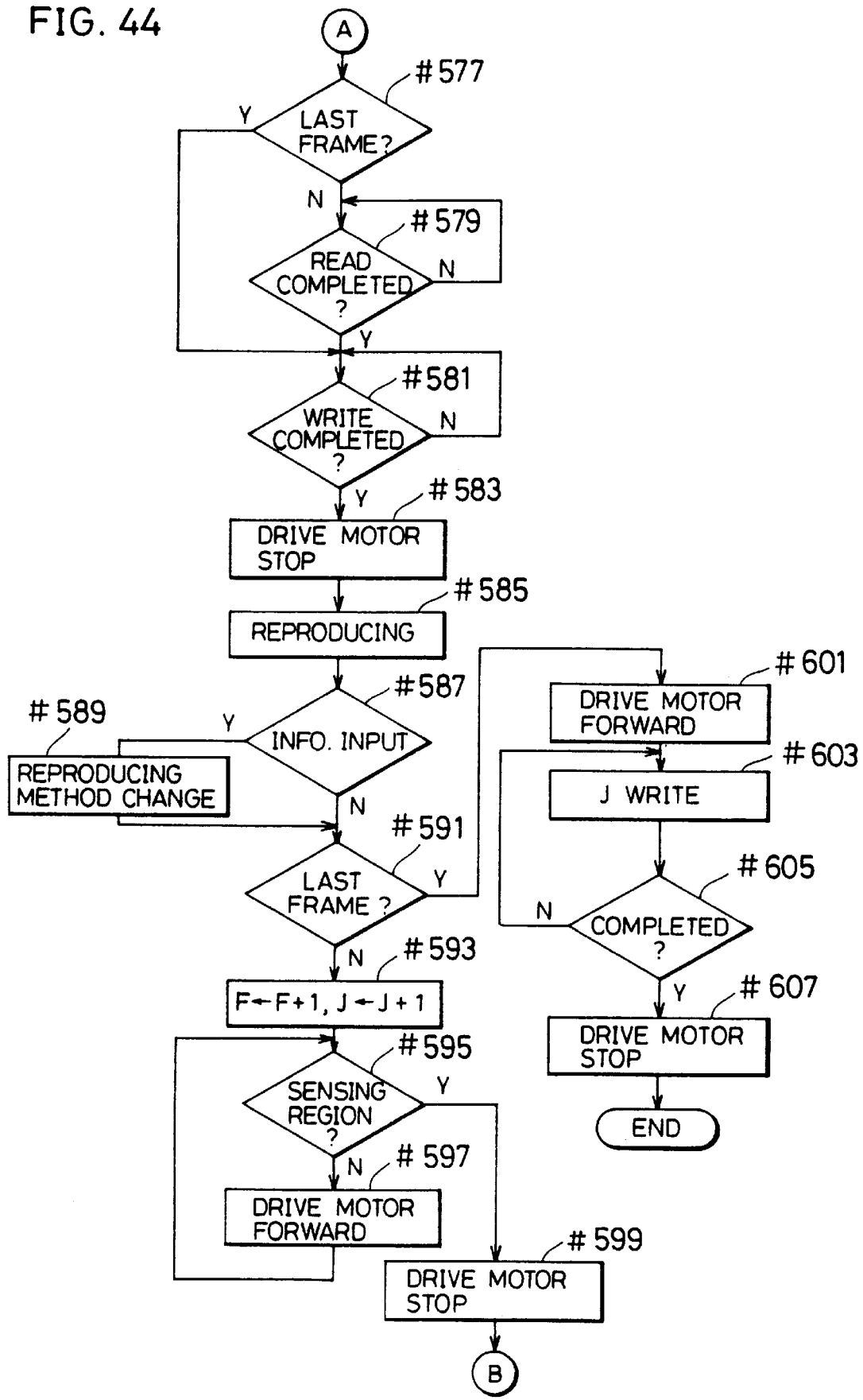

There will be described an operation of the fourth reproducing apparatus next with reference to flow charts shown in FIGS. 43, 44 and action diagrams shown in FIGS. 45 to 48. In the following description, it is assumed that a first frame is F1, a second frame F2, and a third frame F3.

A film cartridge KT is placed on a cartridge insertion/eject table 505 and inserted into the photographed image reproducing apparatus 1, and thereby the film 504 is mounted in a cartridge mounting portion 508. Then, a variable F indicative of a frame number of the film 504 and a variable J indicative of a number of the magnetic track 541 are both set at "1" (Step #551).

Subsequently, a drive motor 810a is rotated forward (Step #553) to transport the film 504 in the dispensing direction, and the magnetic head 821 reads information stored on the magnetic track J1 corresponding to the frame F1 which is the first to be reproduced (Step #555). When the information on the magnetic track J1 is completely read (YES in Step #557) and the film 504 is transported until the leading end of the frame F1 reaches the sensing region A of the image pick-up device 586 (YES in Step #559), the drive motor 810a is stopped (Step #561).

Figure 45:
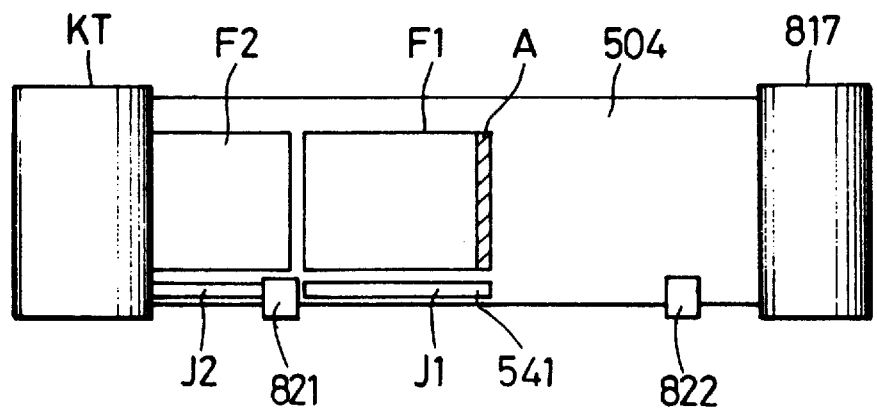
FIG. 45 is a diagram showing an operation state of the fourth reproducing apparatus.
Figure 46:
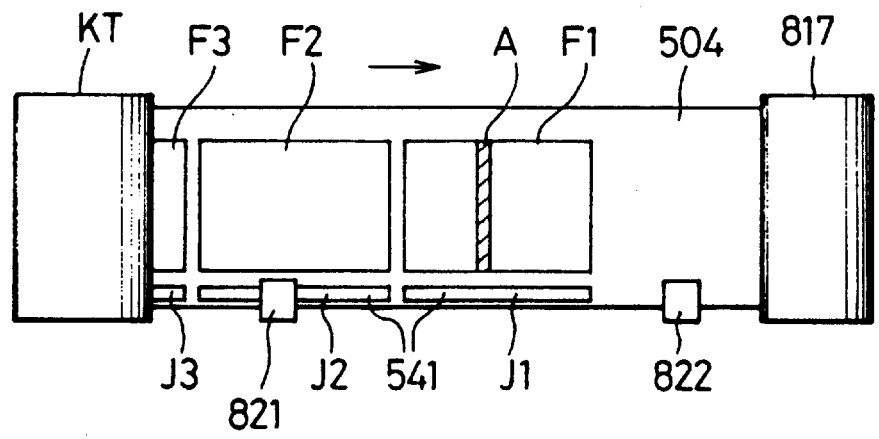
FIG. 46 is a diagram showing an operation state of the fourth reproducing apparatus where information is read and written and a frame of image is sensed.

Then, the drive motor 810a is rotated forward (Step #563) to transport the film 504 from the state shown in FIG. 45 in an arrow direction in FIG. 46 (in the dispensing direction), and thereby the sensing of the image in the frame F1 is started by the image pick-up device 586 (Step #565).

At this time, it is discriminated whether the presently reproduced frame is the last one based on the value of the variable F (Step #567). Since the frame F1 is not the last one (NO in Step #567), the magnetic head 821 starts reading information stored on the magnetic track J2 corresponding to the frame F2 (Step #569). Then, information is written on the magnetic track 541 corresponding to the previously reproduced frame (Step #571). It will be appreciated that the operation of Step #571 is not carried out here since the frame F1 is the first to be reproduced.

The image in the frame F1 is processed in accordance with the information stored in the magnetic track J1 (Step #573) until it is completely sensed by the image pick-up device 586 (NO in Step #575). When the image in the frame F1 is completely sensed (YES in Step #575), it is discriminated whether the frame F1 is the last one (Step #577). Since the frame F1 is not the last one (NO in Step #577), the drive motor 810a is stopped (Step #583) when the information stored in the magnetic track J2 is completely read by the magnetic head 821 (YES in Step #579), and the image corresponding to the frame F1 is reproduced on a screen 503 of a TV monitor 2 (Step #585). In Step #581, it is discriminated whether the information has been completely written on the magnetic track 541 corresponding to the previously reproduced frame. However, since the frame F1 is the first to be reproduced, no operation is, of course, carried out here in Step #581.

Subsequently, it is discriminated whether any information concerning color adjustment and/or a reproducing method such as the rotation is input by means of information input portion 507 (Step #587). If any information has been input (YES in Step #587), the reproducing method is changed according to its information (Step #589). If no information has been input (NO in Step #587), the information read in Step #555 is written on the magnetic track 541 of the corresponding frame as it is or no information writing operation is carried out.

It is then discriminated whether the frame corresponding to the reproduced image is the last one of the film 504 (Step #591). Since the frame F1 is not the last one (NO in Step #591), the variables F, J are each incremented by one (Step #593). If the leading end of the frame F2 has reached the sensing region A (Step #595), the drive motor 810a is rotated forward (Step #597). When the leading end of the frame F2 reaches the sensing region A as shown in FIG. 47 (YES in Step #595), the drive motor 810a is stopped (Step #599).

Figure 48:
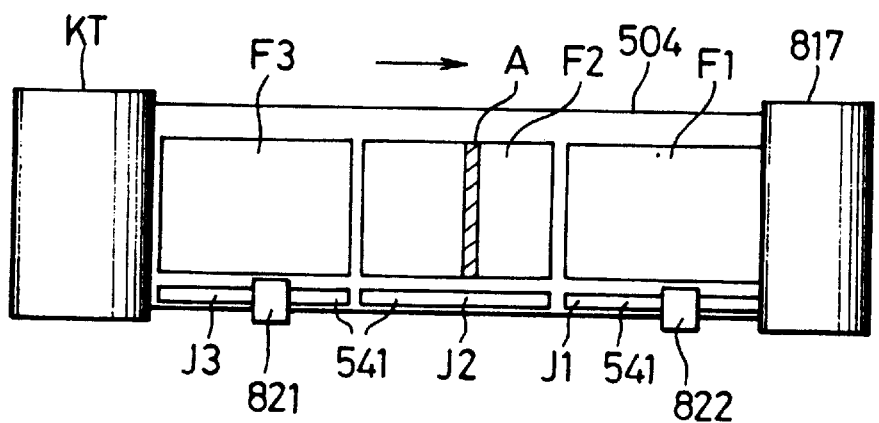
FIG. 48 is a diagram showing an operation state of the fourth reproducing apparatus where information for a next frame is read and written and a frame of image corresponding to this information is sensed.

Thereafter, this routine returns to Step #563 in which the drive motor 810a is rotated forward to transport the film 504 in an arrow direction shown in FIG. 48 (in the dispensing direction), and the sensing of the image in the frame F2 is started (Step #565). Simultaneously, the magnetic head 821 reads information stored on the magnetic track J3 corresponding to the frame F3 (Step #569) and the magnetic head 822 writes on the magnetic track J1 the information such as the reproducing method concerning the frame F1 (Step #571). Thereafter, the operations of Steps #573 to #599 are carried out similarly to the preceding run. However, it is waited in Step #581 until the information is completely written on the magnetic track J1.

On the other hand, if the presently sensed frame is discriminated to be the last one in Step #567, the operations of Steps #569 and #579 are skipped and the information is written on the magnetic track 541 corresponding to the frame right before the last one. If the frame is discriminated to be the last one (YES in Step #591), the drive motor 810a is rotated forward (Step #601) and the information is written on the magnetic track 541 corresponding to the last frame (Step #603). Upon the completion of the information writing operation (YES in Step #605), the drive motor 810a is stopped (Step #607) and this routine ends.

As described above, the magnetic head unit includes the magnetic head 821 exclusively for reading the information and the magnetic head 822 exclusively for writing the information. The magnetic head unit is constructed such that, when a sensing start position of one frame is located in the sensing region A of the image pick-up device 586, the magnetic head 821 is located at a reading start position of the magnetic track 541 corresponding to a next frame and the magnetic head 822 is located at a writing start position of the magnetic track 541 corresponding to a previous frame. Accordingly, the photographed image in the one frame can be read by the image pick-up device 586 simultaneously with the reading and writing of the information stored on the magnetic tracks 541 corresponding to the previous and next frames. This enables to shorten a processing time required to read the information, to sense the image, and to write the information. In this embodiment, the information are read from and written on the magnetic tracks 541 corresponding to the frames which are located before and after the frame whose image is sensed. However, it may be also suitable to arrange the magnetic heads 821, 822 more upstream and downstream with respect to the dispensing direction than the presently sensed frame by two or more frames respectively. In this case, the information read by the magnetic head 821 is stored until the image of the corresponding frame is sensed.

Figure 49:
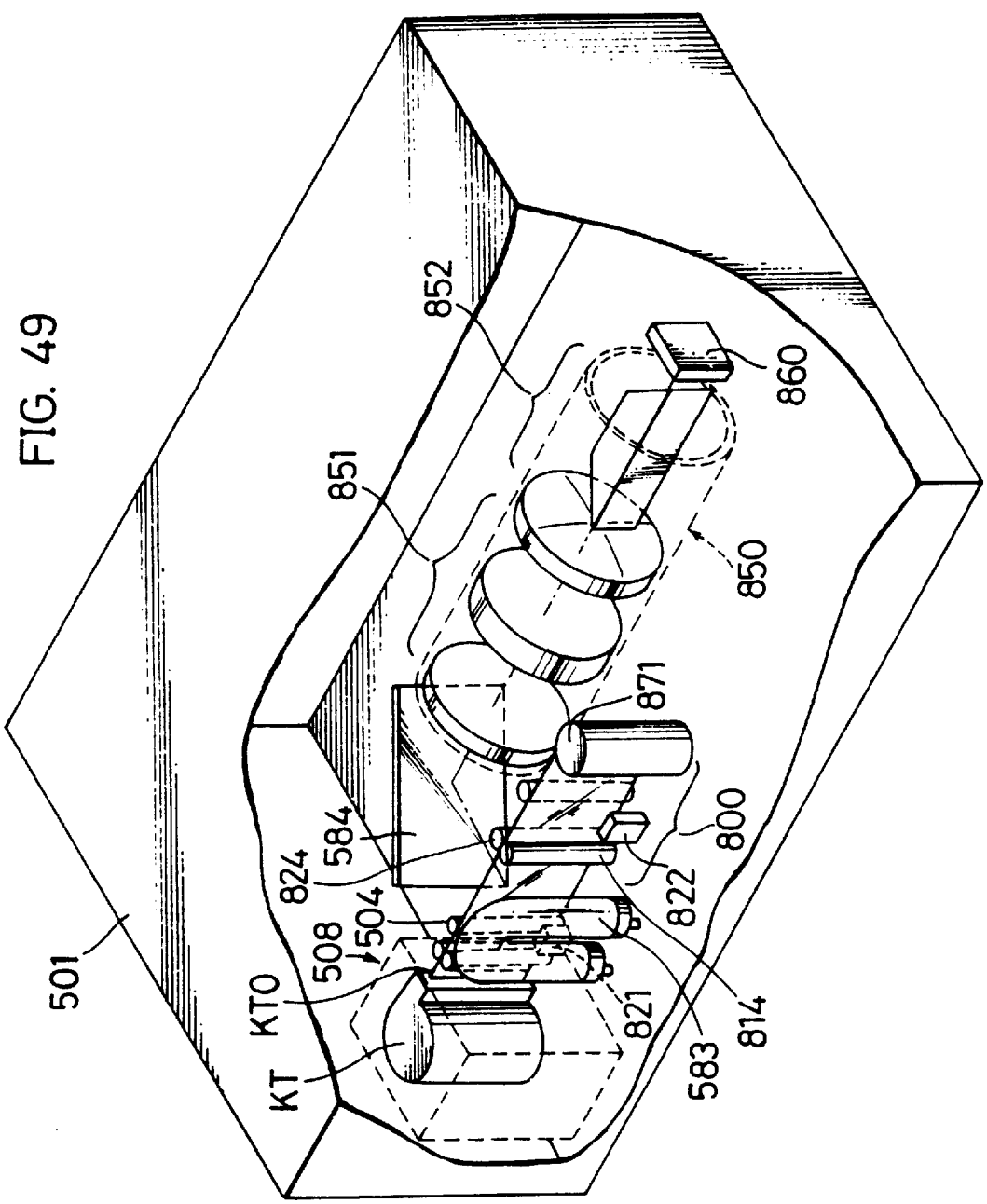
FIG. 49 is a perspective view showing an interior construction of a film cartridge mounting portion of a fifth photographed image reproducing apparatus of the invention.

There will be described a fifth photographed image reproducing apparatus 1 according to the invention next with reference to FIG. 49. It will be appreciated that like or identical reference numerals designate elements having like or identical functions in FIGS. 32 and 49. In the fifth reproducing apparatus, there is provided an image pick-up device 860 including an area image sensor in place of the image pick-up device 586. Further, as a light source 583 is used the one shaped such that it can enlarge an illumination range so as to provide an appropriate amount of light entirely over a frame to be sensed.

A magnification varier 850 includes a taking lens 851, a prism 852, and an unillustrated diaphragm. The taking lens 851 forms each frame of image of a film 504 on the image pick-up device 860 and changes the magnification according to the operation of a zooming button (not shown) provided in an information input portion 507. The prism 852 is adapted for rotating the images of the film 504 so as to convert an image photographed while holding the camera in a vertical posture into an erect image. The image pick-up device 860, including CCDs or the like arranged in matrix, is adapted for sensing an entire image in one frame of the film 504.

Figure 53:
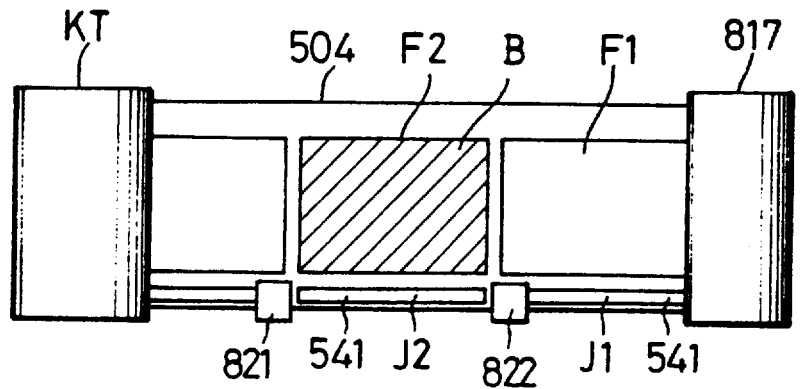
FIG. 53 is a diagram showing an operation state of the fifth reproducing apparatus where a frame of image is sensed.

Magnetic heads 821, 822 are arranged as shown in FIG. 53. Specifically, the magnetic head 821 is located at a leading end position of a frame right upstream from a sensing region B of the image pick-up device 860 with respect to a dispensing direction. The magnetic head 822 is located at a trailing end position of a frame right downstream from the sensing region B with the dispensing direction.

Figure 50:
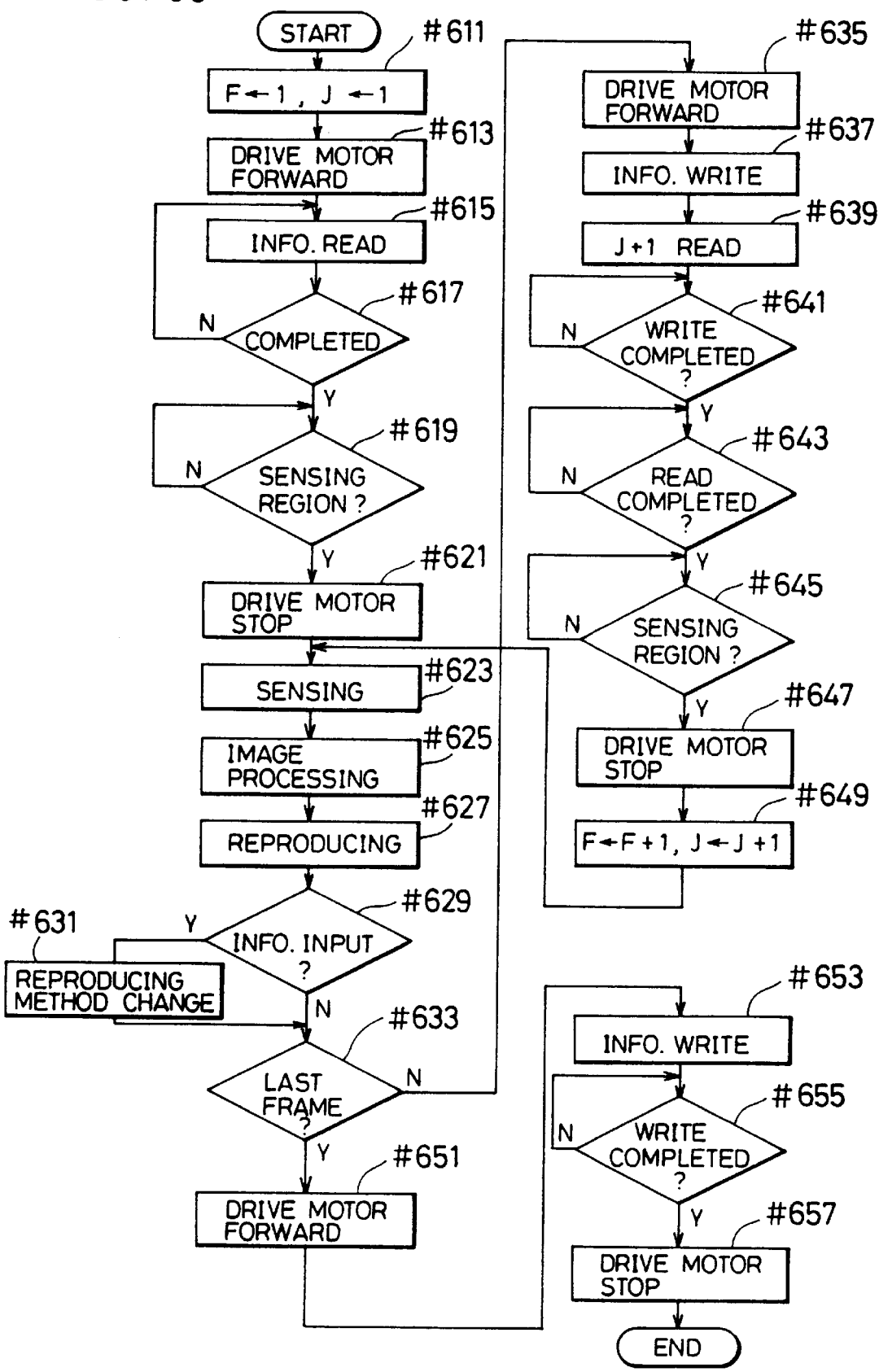
FIG. 50 is a flow chart showing an operation of the fifth reproducing apparatus.
Figure 51:
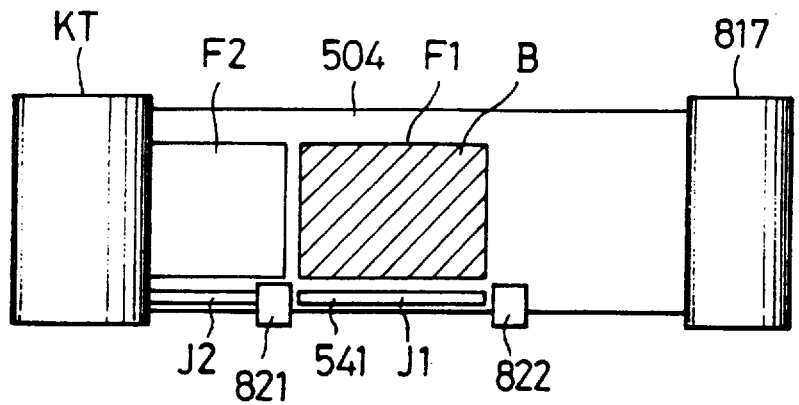
FIG. 51 is a diagram showing an operation state of the fifth reproducing apparatus.
Figure 52:
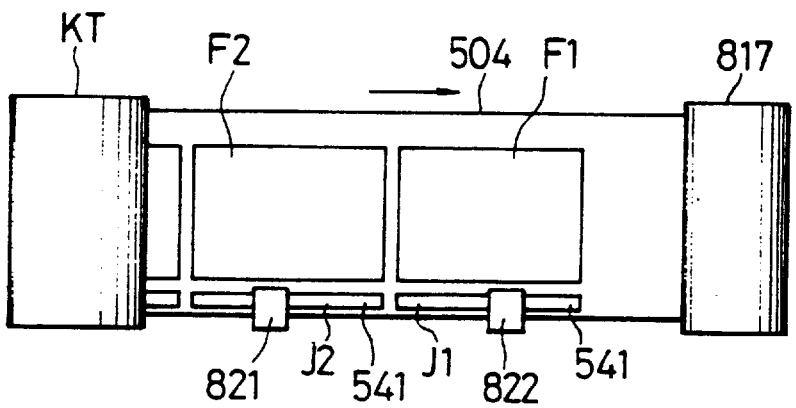
FIG. 52 is a diagram showing an operation state of the fifth reproducing apparatus where information is read and read.

An operation of the third photographed image reproducing apparatus 1 will be described with reference to a flow chart shown in FIG. 50 and action diagrams shown in FIGS. 51 to 53. Description will be given assuming that a first frame is F1 and a second frame is F2.

When a film cartridge KT is mounted into a cartridge mounting portion 505, a variable F indicative of a frame number of the film 504 and a variable J indicative of a number of a magnetic track 541 are both set at "1" (Step #611).

Subsequently, a drive motor 810a is rotated forward (Step #613) and the magnetic head 821 reads information stored on a magnetic track J1 corresponding to the frame F1 (Step #615). When the information is completely read from the magnetic-track J1 (YES in Step #617). it is discriminated whether the frame F1 has reached the sensing region B based on a detection result of a film position detector 513 (Step #613). When the frame F1 reaches the sensing region B as shown in FIG. 51 (YES in Step #619), the drive motor 810a is stopped (Step #621) and an image in the frame F1 is sensed by the image pick-up device 860 (Step #623). The sensed image is processed in accordance with the information read from the magnetic track J1 (Step #625) and is reproduced on a screen 503 of a TV monitor 2 (Step #627).

Subsequently, it is discriminated whether any information concerning a reproducing method for the frame F1 has been input (Step #629). If the information has been input (YES in Step #629), the reproducing method is changed according to the input information (Step #631).

It is then discriminated whether the frame carrying the image being reproduced is the last frame based on the value of the variable F (Step #633). Since the frame F1 is not the last one (NO in Step #633). the drive motor 810a is rotated forward (Step #635) so as to transport the film 504 in an arrow direction in FIG. 52 (in the dispensing direction). Thereafter, the information on the frame F1 is written on the magnetic track J1 (Step #637) and information is read from a magnetic track J2 corresponding to the frame F2 (Step #639). It is noted that the information read in Step #615 is written on the magnetic track J1 as it is or no date is written thereon if no information has been input (NO in Step #629).

When the information is completely written on the magnetic track J1 (YES in Step #641), it is discriminated whether the information has been completely read from the magnetic track J2 corresponding to the frame F2 (Step #643). When the information is completely read from the magnetic track J2 (YES in Step #643), it is discriminated whether the frame F2 has reached the sensing region B (Step #645). When the film 504 is transported until the frame F2 reaches the sensing region B (YES in Step #645), the drive motor 810a is stopped (Step #647) and the variables F, J are incremented (Step #649). Then, this routine returns to Step #623 to reproduce the image in the frame F2.

On the other hand, if the images in all the frames are reproduced (YES in Step #633), the drive motor 810 is rotated forward (Step #651) and the information is written on the magnetic track corresponding to the last frame (Step #653). Subsequently, it is discriminated whether the information has been completely written on the magnetic track corresponding to the last frame (Step #655). This routine ends when the information is completely written on this magnetic track 541 (YES in Step #655).

As described above, the magnetic head 821 reads the information from the magnetic track 541 corresponding to a next frame at the same time the magnetic head 822 writes the information on the magnetic track corresponding to the frame carrying the image being reproduced. This enables to shorten a time required to read and write information. In this embodiment, the magnetic head 821 reads the information from the magnetic track 541 corresponding to the next frame and the magnetic head 822 writes the information on the magnetic track 541 corresponding to the frame carrying the image being reproduced. However, these heads may be spaced away by more than two frames similarly to the fourth reproducing apparatus.

In the fifth reproducing apparatus, the magnetic head 821 may be arranged below the leading end of the sensing region B so that the magnetic heads 821, 822 are spaced apart by one frame. In this case, since the magnetic head 821 is held between the light source 583 and the film 504, it is necessary to arrange the magnetic head 821 lest it should shield the light frame the light source 583.

Although the magnetic track 541 is used as information storage medium in the foregoing embodiments, the information storage medium is not limited to this. For instance, information may be written on an edge of the film 504 by an optical means and the written information may be read optically. Further, in the foregoing embodiments, the magnetic tracks 541 as storage media are provided on the film 504. However, the storage media (magnetic tracks 541) may be provided separately from the film 504.

What is claimed is:

1. An image reproducing apparatus comprising:
   an image reader which reads a plurality of images recorded on a recording medium in an image sequence of said images;
   a reproducing device which reproduces the read images;
   an information reader which reads image information concerning the images recorded on the recording medium; and
   a controller which judges a type of recording order of the plurality of images forming said image sequence of images based on the read image information, and determines a reproducing order of images in accordance with a judged recording order, and controls the reproducing device to reproduce images in accordance with the determined reproducing order.

2. An image reproducing apparatus according to claim 1, wherein the recording medium is a processed photographic film, and the image information is recorded on a magnetic recording portion provided on the photographic film.

3. An image reproducing apparatus according to claim 1, wherein the image information includes date information concerning a date of recording an image.

4. An image reproducing apparatus according to claim 1, wherein the recording medium is a processed photographic film, and the controller judges whether the recording order indicates a first order of recording in which the images are recorded only in a winding direction of the photographic film, a second order of recording in which the images are recorded only in a rewinding direction of the photographic film, and a third order of recording in which the images are recorded both in a winding direction and in a rewinding direction of the photographic film.

5. An image reproducing apparatus according to claim 4, wherein the controller determines a first image to be reproduced based on the image information when the order is judged as the third order.

6. An image reproducing apparatus according to claim 4, further comprising a film feeder which is responsive to the controller and which feeds the photographic film until a determined first image reaches a specified position.

7. An image reproducing apparatus according to claim 4, further comprising a film feeder which is responsive to the controller and which feeds the photographic film until an end of the photographic film reaches a specified position when the controller judges either the first order or the second order.

8. An image reading apparatus comprising:
an image reader which reads a plurality of images recorded on a recording medium in a sequence of images;
an output device which outputs an image signal corresponding to the read images;
an information reader which reads image information concerning the images recorded on the recording medium; and
a controller which judges a type of recording order of the plurality of images forming said image sequence of images based on the read image information, and determines a reading order of images in accordance with a judged recording order, and controls the image reader to read images in accordance with the determined reading order.

9. An image reading apparatus according to claim 8, wherein the recording medium is a processed photographic film, and the image information is recorded on a magnetic recording portion provided on the photographic film.

10. An image reading apparatus according to claim 8, wherein the image information includes date information concerning a date of recording an image.

11. An image reading apparatus according to claim 8, wherein the recording medium is a processed photographic film, and the controller judges whether the recording order indicates a first order of recording in which the images are recorded only in a winding direction of the photographic film, a second order of recording in which the images are recorded only in a rewinding direction of the photographic film, and a third order of recording in which the images are recorded both in a winding direction and in a rewinding direction of the photographic film.

12. An image reading apparatus according to claim 11, wherein the controller determines a first image to be read based on the image information when the order is judged as the third order.

13. An image reading apparatus according to claim 11, further comprising a film feeder which is responsive to the controller and feeds the photographic film until a determined first image reaches a specified position.

14. An image reading apparatus according to claim 11, further comprising a film feeder which is responsive to the controller and which feeds the photographic film until an end of the photographic film reaches a specified position when the controller judges either the first order or the second order.

15. An image reproducing apparatus according to claim 1, wherein said image information comprises image sequence information stored for each of said images, and wherein said controller judges the recording order by comparing sequence information for at least one of said images with sequence information for at least one other of the images.

16. An image reproducing apparatus according to claim 15, wherein said controller forms indicia based on said judged recording order, and records said indicia on said recording medium.

17. An image reproducing apparatus according to claim 15, wherein said sequence information comprises date information stored for each of said images, and wherein said controller judges the recording order by comparing date information for at least the one image with date information for at least the one other image.

18. An image reading apparatus according to claim 8, wherein said image information comprises image sequence information stored for each of said images, and wherein said controller judges the recording order by comparing sequence information for at least one of said images with sequence information for at least one other of said images.

19. An image reading apparatus according to claim 18, wherein said controller forms indicia based on said judged recording order, and records said indicia on said recording medium.

20. An image reading apparatus according to claim 18, wherein said sequence information comprises date information stored for each of said images, and wherein said controller judges the recording order by comparing date information for at least the one image with date information for least the one other image.

21. An image reproducing apparatus capable of reproducing images recorded on a recording medium by a first type of recording apparatus which records images in a predetermined order and a second type of recording apparatus which records images in an order opposite to the predetermined order, said image reproducing apparatus comprising:
an image reader which reads a plurality of images recorded on a recording medium;
a reproducing device which reproduces the read images;
an information reader which reads image information concerning the images recorded on the recording medium; and
a controller which judges a recording order of the plurality of images based on the read image information, and determines a reproducing order of images in accordance with a judged recording order, and controls the reproducing device to reproduce images in accordance with the determined reproducing order.

22. An image reading apparatus capable of reading images recorded on a recording medium by a first type of recording apparatus which records images in a predetermined order and a second type of recording apparatus which records images in an order opposite to the predetermined order, said image reproducing apparatus comprising:

an image reader which reads a plurality of images recorded on a recording medium;

an output device which outputs an image signal corresponding to the read images;

an information reader which reads image information concerning the images recorded on the recording medium; and a controller which judges a recording order of the plurality of images based on the read image information, and determines a reading order of images in accordance with a judged recording order, and controls the image reader to read images in accordance with the determined reading order.

23. An image reproducing apparatus comprising:

an image reader which reads a plurality of images recorded on a recording medium, an order of recording of the plurality of images on the recording medium disagreeing with an order of time of recording the plurality of images;

a reproducing device which reproduces the read images;

an information reader which reads image information concerning the images recorded on the recording medium; and a controller which judges the order of time of recording the images based on the read image information, determines a reproducing order of images in accordance with the judged recording time order, and controls the reproducing device to reproduce images in accordance with the determined reproducing order.

24. An image reproducing apparatus according to claim 23, wherein said image information comprises image sequence information stored for each of the images, and wherein said controller judges the recording time order by comparing the image sequence information for at least one of the images with the image sequence information for at least another of the images.

25. An image reproducing apparatus according to claim 24, wherein said controller forms indicia based on a judged recording time order, and records the indicia on the recording medium.

26. An image reproducing apparatus according to claim 24, wherein said image sequence information comprises date information stored for each of the images, and wherein said controller judges the recording time order by comparing the date information for the one of the images with the date information for the other of the images.

27. An image reading apparatus comprising:

an image reader which reads a plurality of images recorded on a recording medium, an order of recording of the plurality of images on the recording medium disagreeing with an order of time of recording the plurality of images;

an output device which outputs an image signal corresponding to the read images;

an information reader which reads image information concerning the images recorded on the recording medium; and a controller which judges the order of time of recording the images based on the read image information, determines a reading order of images in accordance with the judged recording time order, and controls the image reader to read images in accordance with the determined reading order.

28. An image reading apparatus according to claim 27, wherein said image information comprises image sequence information stored for each of the images, and wherein said controller judges the recording time order by comparing the image sequence information for at least one of the images with the image sequence information for at least another of the images.

29. An image reading apparatus according to claim 28, wherein said controller forms indicia based on the judged recording time order, and records the indicia on the recording medium.

30. An image reading apparatus according to claim 28, wherein said image sequence information comprises date information stored for each of the images, and wherein said controller judges the recording time order by comparing the date information for the one of the images with the date information for the other of the images.

31. An image reproducing apparatus capable of reproducing images recorded on a recording medium even if an order of recording of the images on the recording medium disagrees with an order of time of recording the images, said image reproducing apparatus comprising:

a first reader which reads a plurality of images recorded on a recording medium;

a reproducing device which reproduces the read images;

a second reader which reads information concerning the images recorded on the recording medium; and a controller which judges the order of time of recording the images based on the read information, determines a reproducing order of images in accordance with the judged recording time order, and controls the reproducing device to reproduce images in accordance with the determined reproducing order.

32. An image reproducing apparatus according to claim 31, wherein said information comprises image sequence information stored for each of the images, and wherein said controller judges the recording time order by comparing the image sequence information for at least one of the images with the image sequence information for at least another of the images.

33. An image reproducing apparatus according to claim 32, wherein said controller forms indicia based on the judged recording time order, and records the indicia on the recording medium.

34. An image reproducing apparatus according to claim 32, wherein said image sequence information comprises date information stored for each of the images, and wherein said controller judges the recording time order by comparing the date information for the one of the images with the date information for the other of the images.

35. An image reading apparatus capable of reading images recorded on a recording medium even if an order of recording of the images on the recording medium disagrees with an order of time of recording the images, said image reading apparatus comprising:

a first reader which reads a plurality of images recorded on a recording medium;

an output device which outputs an image signal corresponding to the read images;

a second reader which reads information concerning the images recorded on the recording medium; and a controller which judges the order of time of recording the images based on the read information, determines a reading order of images in accordance with the judged recording time order, and controls the first reader to read images in accordance with the determined reading order.

36. An image reading apparatus according to claim 35, wherein said information comprises image sequence information stored for each of the images, and wherein said controller judges the recording time order by comparing the image sequence information for at least one of the images with the image sequence information for at least another of the images.

37. An image reading apparatus according to claim 36, wherein said controller forms indicia based on a judged recording time order, and records the indicia on the recording medium.

38. An image reading apparatus according to claim 36, wherein said image sequence information comprises date information stored for each of the images, and wherein said controller judges the recording time order by comparing the date information for the one of the images with the date information for the other of the images.

* * * * *